(12) United States Patent
Meine et al.

(10) Patent No.: US 11,746,821 B2
(45) Date of Patent: Sep. 5, 2023

(54) FLAT ROOF MOUNTING DEVICE

(71) Applicant: Solsera, Inc., Phoenix, AZ (US)

(72) Inventors: Shawn J. Meine, Phoenix, AZ (US); Carolyn D. Kitchel, Phoenix, AZ (US)

(73) Assignee: Solsera, Inc., Phoenix, AZ (US)

( * ) Notice: Subject to any disclaimer, the term of this patent is extended or adjusted under 35 U.S.C. 154(b) by 0 days.

(21) Appl. No.: 17/545,952

(22) Filed: Dec. 8, 2021

(65) Prior Publication Data
US 2022/0099136 A1 Mar. 31, 2022

Related U.S. Application Data

(63) Continuation-in-part of application No. 16/930,258, filed on Jul. 15, 2020, which is a continuation of application No. 16/775,543, filed on Jan. 29, 2020, now Pat. No. 10,767,684.

(60) Provisional application No. 62/839,486, filed on Apr. 26, 2019.

(51) Int. Cl.
*F16B 43/00* (2006.01)
*E04D 5/14* (2006.01)
*E04D 15/04* (2006.01)

(52) U.S. Cl.
CPC ............ *F16B 43/001* (2013.01); *E04D 15/04* (2013.01); *E04D 5/145* (2013.01); *E04D 2015/047* (2013.01)

(58) Field of Classification Search
CPC ..... F16B 43/001; E04D 15/04; E04D 15/145; E04D 2015/042; E04D 2015/047; E04D 13/14; E04D 13/1407; E04D 13/1476; E04D 13/1475; E04D 13/1473
See application file for complete search history.

(56) References Cited

U.S. PATENT DOCUMENTS

| | | | |
|---|---|---|---|
| 3,910,588 | A | 10/1975 | Austin |
| 4,026,183 | A | 5/1977 | Bart |
| 4,037,418 | A | 7/1977 | Hannan |
| 4,112,693 | A | 9/1978 | Collin et al. |
| D263,678 | S | 4/1982 | Dewey |
| D263,927 | S | 4/1982 | Dewey |
| D263,928 | S | 4/1982 | Dewey |
| 4,361,997 | A | 12/1982 | DeCaro |

(Continued)

FOREIGN PATENT DOCUMENTS

| | | |
|---|---|---|
| DE | 4416884 A1 | 11/1995 |
| EP | 2006465 A3 | 4/2009 |

(Continued)

OTHER PUBLICATIONS

U.S. Appl. No. 16/390,258, filed Jul. 15, 2020, Shawn J. Meine.

(Continued)

*Primary Examiner* — Kyle J. Walraed-Sullivan
(74) *Attorney, Agent, or Firm* — Thomas W. Galvani, P.C.; Thomas W. Galvani

(57) ABSTRACT

A mounting device for covering a roof penetration in a roof includes a base having a hub, an outer perimeter structure, an open top, an open bottom, and ribs extending from the hub outward to the outer perimeter structure. An internal reservoir in communication with the open top and the open bottom. At least one of the ribs is formed with a bore for receiving a fastener for fastening the mounting device at the roof penetration.

12 Claims, 55 Drawing Sheets

(56) References Cited

U.S. PATENT DOCUMENTS

| | | | |
|---|---|---|---|
| 4,371,293 A | 2/1983 | Wilcox et al. | |
| 4,455,804 A | 6/1984 | Francovitch | |
| D275,452 S | 9/1984 | Payne | |
| 4,476,660 A | 10/1984 | Francovitch | |
| 4,502,256 A | 3/1985 | Hahn | |
| 4,518,282 A | 5/1985 | Wilcox et al. | |
| 4,520,606 A * | 6/1985 | Francovitch | E04D 5/145 52/509 |
| 4,574,551 A | 3/1986 | Giannuzzi | |
| 4,619,094 A | 10/1986 | Yang | |
| 4,620,402 A * | 11/1986 | Beneze | E04D 5/145 52/410 |
| 4,624,092 A | 11/1986 | Baginski | |
| 4,627,207 A * | 12/1986 | Young | E04D 5/143 52/366 |
| 4,630,422 A | 12/1986 | Beneze | |
| 4,631,433 A * | 12/1986 | Stokes | H02K 5/15 310/43 |
| 4,631,887 A | 12/1986 | Francovitch | |
| 4,658,558 A | 4/1987 | Verble | |
| 4,686,808 A | 8/1987 | Triplett | |
| 4,715,756 A | 12/1987 | Danico et al. | |
| 4,726,164 A | 2/1988 | Reinwall et al. | |
| 4,727,699 A | 3/1988 | Sargent | |
| 4,744,187 A * | 5/1988 | Tripp | F16B 37/14 52/410 |
| 4,747,621 A | 5/1988 | Gans et al. | |
| 4,757,662 A | 7/1988 | Gasser | |
| 4,763,456 A | 8/1988 | Giannuzzi | |
| 4,787,188 A | 11/1988 | Murphy | |
| 4,788,807 A | 12/1988 | Whitman | |
| 4,799,845 A * | 1/1989 | Hrysko | E04D 5/143 411/908 |
| 4,860,513 A | 8/1989 | Whitman | |
| 4,860,514 A | 8/1989 | Kelly | |
| 4,890,968 A | 1/1990 | Beach et al. | |
| 4,943,100 A | 7/1990 | Emberson | |
| 4,945,699 A | 8/1990 | Murphy | |
| 4,959,938 A | 10/1990 | Caro | |
| 4,989,911 A | 2/1991 | Order | |
| 4,999,963 A | 3/1991 | Verble | |
| 5,018,329 A | 5/1991 | Hasan et al. | |
| 5,018,748 A | 5/1991 | Schalle | |
| 5,056,853 A | 10/1991 | Order | |
| 5,069,589 A | 12/1991 | Lemke | |
| 5,082,412 A | 1/1992 | Thomas | |
| 5,094,056 A | 3/1992 | Peters | |
| 5,100,274 A | 3/1992 | Hasan et al. | |
| 5,139,379 A | 8/1992 | Hasan et al. | |
| 5,217,339 A | 6/1993 | O'Connor et al. | |
| 5,407,313 A | 4/1995 | Bruins | |
| 5,419,666 A | 5/1995 | Best | |
| 5,557,897 A | 9/1996 | Kranz et al. | |
| 5,562,380 A | 10/1996 | Etai. | |
| 5,628,587 A * | 5/1997 | Lesslie | E21D 21/0086 411/545 |
| 5,797,232 A | 8/1998 | Larson | |
| 5,803,693 A | 9/1998 | Choiniere et al. | |
| 5,829,214 A * | 11/1998 | Hart | E04D 15/04 52/302.1 |
| 5,908,278 A | 6/1999 | Hasan | |
| 5,915,903 A | 6/1999 | Osterie et al. | |
| 5,930,969 A | 8/1999 | Mayle et al. | |
| 5,934,855 A | 8/1999 | Osterle et al. | |
| 6,035,595 A | 3/2000 | Anderson | |
| 6,044,557 A * | 4/2000 | Smith | B21K 23/04 29/DIG. 37 |
| 6,205,730 B1 | 3/2001 | Hasan et al. | |
| 6,233,889 B1 | 5/2001 | Hulsey | |
| 6,250,034 B1 | 6/2001 | Hulsey | |
| D446,319 S * | 8/2001 | Rubenacker | D25/199 |
| 6,282,857 B1 * | 9/2001 | Rubenacker | E04D 5/145 411/537 |
| 6,938,385 B2 | 9/2005 | Lind | |
| D636,503 S * | 4/2011 | Parziale | D25/199 |
| 8,282,108 B2 | 10/2012 | Teng | |
| 8,302,363 B1 | 11/2012 | Johnson | |
| 8,341,895 B2 | 1/2013 | Schwarze et al. | |
| 8,448,407 B1 | 5/2013 | Wiener | |
| D696,931 S * | 1/2014 | Rodenhouse | D8/399 |
| 8,875,455 B1 | 11/2014 | Yang et al. | |
| 8,919,070 B2 * | 12/2014 | Moses | E04F 13/0805 52/704 |
| 8,984,819 B1 | 3/2015 | Yang et al. | |
| 9,080,792 B2 | 7/2015 | Patton et al. | |
| 9,134,044 B2 | 9/2015 | Stearns et al. | |
| 9,496,820 B2 | 11/2016 | Seery et al. | |
| 9,890,807 B1 * | 2/2018 | Rodenhouse | F16B 43/001 |
| 9,945,414 B1 * | 4/2018 | Rodenhouse | F16B 43/001 |
| 10,066,658 B1 * | 9/2018 | LeCompte | F16B 17/008 |
| 10,148,217 B2 | 12/2018 | Meine | |
| 10,171,026 B2 | 1/2019 | Meine | |
| 10,767,684 B1 | 9/2020 | Meine et al. | |
| 10,781,587 B2 | 9/2020 | Meine | |
| 10,982,430 B2 | 4/2021 | Meine | |
| 2002/0066235 A1 | 6/2002 | Stearns et al. | |
| 2002/0108315 A1 | 8/2002 | Wasitis et al. | |
| 2003/0033780 A1 | 2/2003 | Hasan | |
| 2003/0033783 A1 | 2/2003 | Kobetsky | |
| 2004/0040243 A1 | 3/2004 | Yaros | |
| 2004/0115010 A1 | 6/2004 | Robertson et al. | |
| 2004/0148888 A1 | 8/2004 | Kuhn et al. | |
| 2004/0170489 A1 | 9/2004 | Nebesnak et al. | |
| 2005/0121902 A1 | 6/2005 | Hull et al. | |
| 2005/0166503 A1 | 8/2005 | Panasik | |
| 2005/0183261 A1 | 8/2005 | Nebesnak et al. | |
| 2006/0185289 A1 | 8/2006 | Gong et al. | |
| 2007/0137126 A1 | 6/2007 | Sommerhein | |
| 2008/0178556 A1 | 7/2008 | Meeks | |
| 2009/0145078 A1 * | 6/2009 | Herb | F16B 13/141 52/396.02 |
| 2009/0173028 A1 | 7/2009 | Garrigus et al. | |
| 2010/0132305 A1 | 6/2010 | Heckeroth et al. | |
| 2010/0326006 A1 | 12/2010 | Yaros | |
| 2011/0094652 A1 | 4/2011 | Duvekot et al. | |
| 2011/0227298 A1 | 9/2011 | Teng | |
| 2012/0228863 A1 | 9/2012 | Coleman | |
| 2012/0233958 A1 | 9/2012 | Stearns | |
| 2013/0009025 A1 | 1/2013 | Stearns | |
| 2013/0074441 A1 | 3/2013 | Stearns | |
| 2013/0298494 A1 | 11/2013 | Corsi | |
| 2014/0008506 A1 | 1/2014 | Schaefer et al. | |
| 2014/0331594 A1 | 11/2014 | Stearns et al. | |
| 2015/0176434 A1 * | 6/2015 | Gerends | F23R 3/002 411/531 |
| 2015/0244308 A1 | 8/2015 | Patton et al. | |
| 2016/0134230 A1 | 5/2016 | Meine et al. | |
| 2016/0248367 A1 | 8/2016 | Almy et al. | |
| 2016/0248369 A1 | 8/2016 | Almy | |
| 2016/0268957 A1 | 9/2016 | Liptak | |
| 2017/0063300 A1 | 3/2017 | Ash | |
| 2017/0108165 A1 | 4/2017 | Svec | |
| 2017/0279403 A1 | 9/2017 | Seery et al. | |
| 2017/0302222 A1 | 10/2017 | Aliabadi et al. | |
| 2018/0062560 A1 | 3/2018 | Stephan et al. | |
| 2018/0062571 A1 | 3/2018 | Ash | |
| 2019/0093340 A1 | 3/2019 | Meine | |
| 2019/0145453 A1 | 5/2019 | Donald et al. | |
| 2021/0222421 A1 | 7/2021 | Meine | |
| 2021/0230861 A1 | 7/2021 | Meine | |
| 2021/0262222 A1 | 8/2021 | Meine | |

FOREIGN PATENT DOCUMENTS

| | | |
|---|---|---|
| EP | 3181922 | 6/2017 |
| EP | 3181922 B1 | 2/2018 |

(56) References Cited

OTHER PUBLICATIONS

U.S. Appl. No. 17/203,662, filed Mar. 16, 2021, Shawn J. Meine.
U.S. Appl. No. 17/220,730, filed Apr. 1, 2021, Shawn J. Meine.
U.S. Appl. No. 17/315,215, filed May 7, 2021, Shawn J. Meine.

* cited by examiner

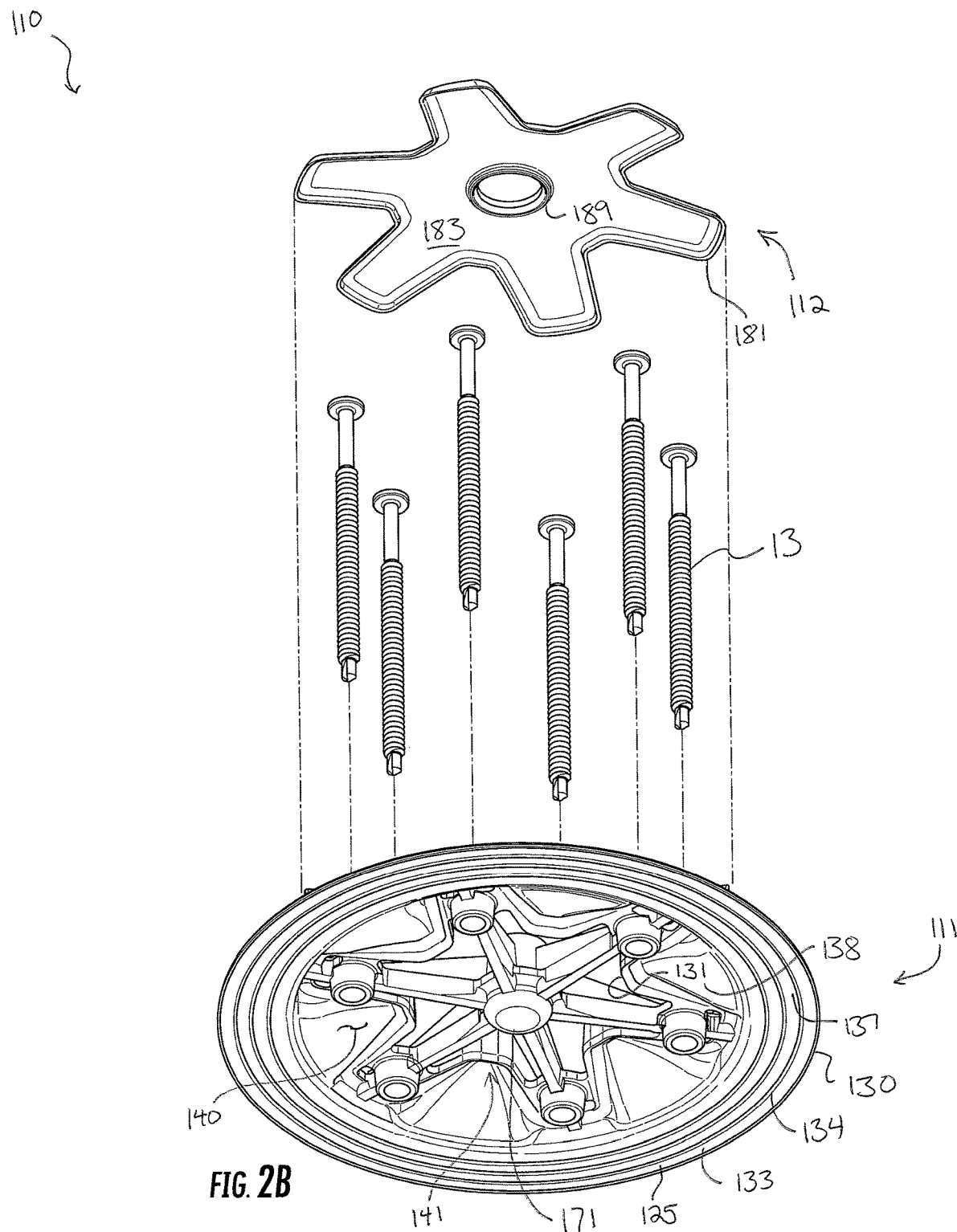

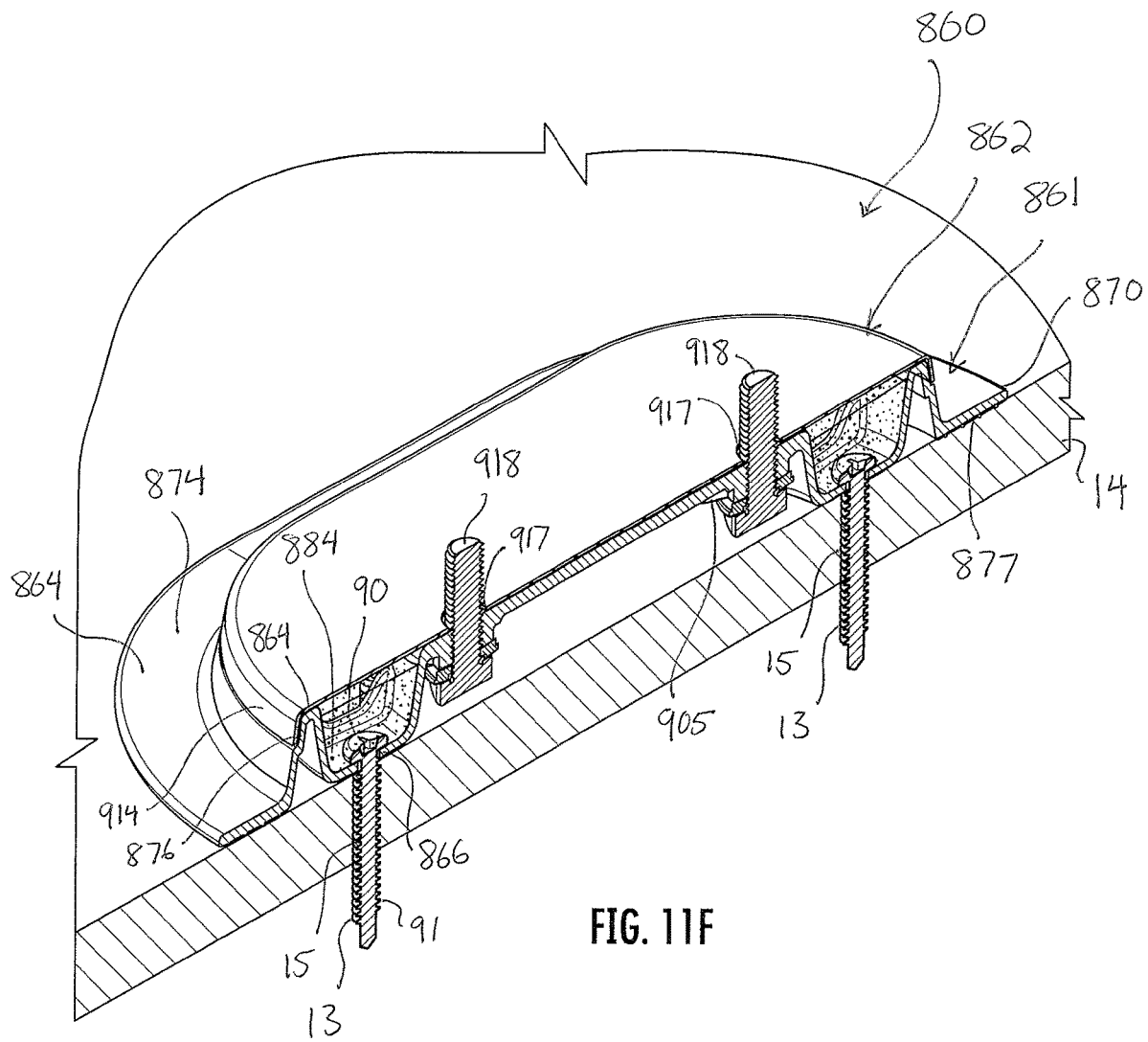

FLAT ROOF MOUNTING DEVICE

CROSS-REFERENCE TO RELATED APPLICATIONS

This application is a continuation-in-part of and claims the benefit of prior U.S. patent application Ser. No. 16/930,258, filed Jul. 15, 2020, which is a continuation of and claims the benefit of prior U.S. patent application Ser. No. 16/775,543, filed Jan. 29, 2020, which claims the benefit of U.S. Provisional Application No. 62/839,486, filed Apr. 26, 2019, all of which are hereby incorporated by reference.

FIELD

The present specification relates generally to construction, and more particularly to roofing construction brackets and mounts.

BACKGROUND

Solar panels, electrical conduit, HVAC units, and other similar equipment are often mounted on the roof of a structure. Frequently, it is necessary to penetrate the roof to secure the equipment to the structure. Generally, a mount is used to connect the equipment—or a rack or framework for the equipment—to the roof at a roof penetration. A mount is placed on the roof, and a fastener or fasteners are driven through the mount and into the roof to secure the mount to the roof. The equipment (or rack therefor) is then secured to the mount, which is uniquely designed to accept the equipment (or rack therefor).

While a secure method for attaching roof-mounted equipment, this has drawbacks. The mounts can be awkward to install. The penetrations must be sealed from the weather. While some mounts use flashing to seal the penetrations, some use sealant (alone or in addition) to flashing. However, most mounts relying on sealant create a mess which is difficult to clean and can become unsightly. Further, if the sealant is not applied correctly, the penetration may not be sealed; some mounts hide the penetration, making it difficult for the installer to determine whether the penetration has been sealed.

An improved mount is needed.

SUMMARY

A mounting device for covering a roof penetration in a roof includes a base having a hub, an outer perimeter structure, an open top, an open bottom, and ribs extending from the hub outward to the outer perimeter structure. An internal reservoir in communication with the open top and the open bottom. At least one of the ribs is formed with a bore for receiving a fastener for fastening the mounting device at the roof penetration.

The above provides the reader with a very brief summary of some embodiments described below. Simplifications and omissions are made, and the summary is not intended to limit or define in any way the disclosure. Rather, this brief summary merely introduces the reader to some aspects of some embodiments in preparation for the detailed description that follows.

BRIEF DESCRIPTION OF THE DRAWINGS

Referring to the drawings:

FIGS. 2A and 2B are top and bottom exploded perspective views of a flat roof mounting device;

FIG. 11D-11F are perspective section views taken along the line 11-11 of FIG. 11A, showing the flat roof mounting device being applied to a roof;

DETAILED DESCRIPTION

Figure 1A:
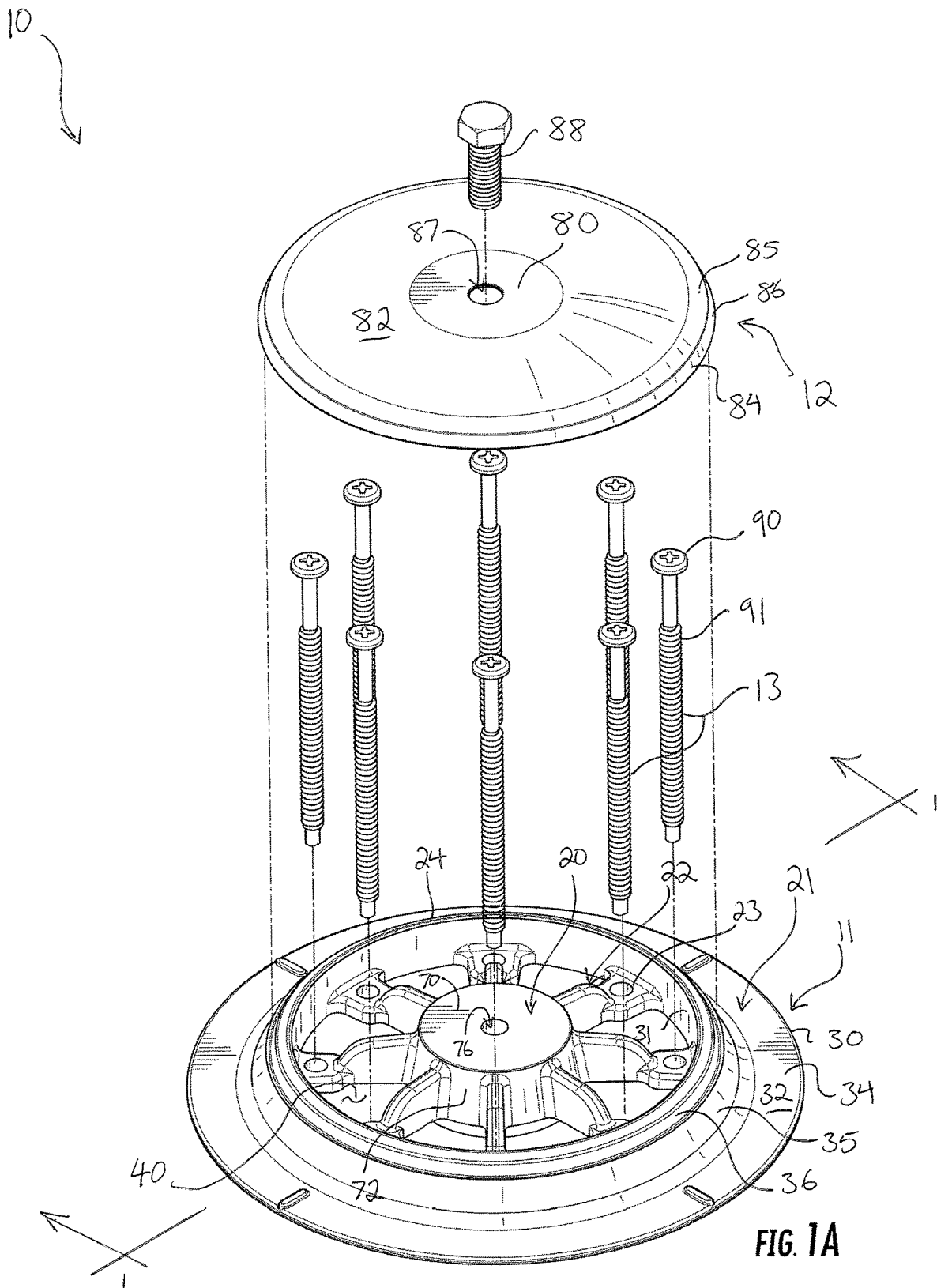
FIGS. 1A and 1B are top and bottom exploded perspective views of a flat roof mounting device.

Reference now is made to the drawings, in which the same reference characters are used throughout the different figures to designate the same elements. Briefly, the embodiments presented herein are preferred exemplary embodiments and are not intended to limit the scope, applicability, or configuration of all possible embodiments, but rather to provide an enabling description for all possible embodiments within the scope and spirit of the specification. Description of these preferred embodiments is generally made with the use of verbs such as "is" and "are" rather than "may," "could," "includes," "comprises," and the like, because the description is made with reference to the drawings presented. One having ordinary skill in the art will understand that changes may be made in the structure, arrangement, number, and function of elements and features without departing from the scope and spirit of the specification. Further, the description may omit certain information which is readily known to one having ordinary skill in the art to prevent crowding the description with detail which is not necessary for enablement. Indeed, the diction used herein is meant to be readable and informational rather than to delineate and limit the specification; therefore, the scope and spirit of the specification should not be limited by the following description and its language choices.

FIG. 1 illustrates a flat roof mounting device 10 (hereinafter "the device 10") for covering a roof penetration with a mount, the device 10 including a base 11 and a cap 12 moveable onto the base 11 for forming an environmental seal around the roof penetration. The device 10 is a mount for a rack, framework, or other apparatus carrying equipment such as a solar panel array (hereinafter identified as a "rack").

The base 11 is wide, round, and has a low profile. The base 11 includes a central hub 20 and an outer perimeter structure 21 coaxially encircling the central hub 20. The hub 20 and perimeter structure 21 are connected, or coupled, to each other by a plurality of ribs 22 extending radially outward from the hub 20 to the perimeter structure 21. Each rib 22 is formed with a bore 23 through which a fastener 13 is passed and secured into the roof, so as to securely fix the base 11 to the roof. The hub 20, perimeter structure 21, and ribs 22 are preferably formed integrally and monolithically, from a single piece of material having strong, rugged, durable, and rigid material characteristics. When the low base 11 is applied over the roof penetration and the fasteners 13 are passed through the bores 23 such that their heads are seated against the ribs 22, the base 11 is securely mounted to the roof at the roof penetration. With the base 11 securely mounted to the roof, the base 11 is a stable, secure, and strong mount for the rack. The base has a top 24 and an opposed bottom 25; the bottom 25 is mounted on the roof and the top 24 is directed away from the roof Both the top 24 and bottom 25 are open, that is to say, openings are formed at both the top 24 and bottom 25. It is noted briefly here that, while the description may refer to "a roof penetration," the embodiment of FIGS. 1A-1F actually has several roof penetrations—one for each of eight fasteners 13. However, in some cases, only a single penetration may be made or used (and so only a single fastener 13 may be used), while in other cases only two or three penetrations through the roof may be made or used. The phrase "roof penetration" is therefore meant to include single and multiple penetrations through a roof in a local area, such as under the footprint of one device 10.

Referring now primarily to FIGS. 1A and 1, like the base 11, the perimeter structure 21 is wide, round, and has a low profile. The perimeter structure 21 has an outer edge 30 and an opposed inner edge 31, both of which are circular in the embodiment shown in FIGS. 1A-1F. The outer edge 30 is a radially-directed annular edge, while the inner edge 31 is an upstanding flat edge or wall. The perimeter structure 21 also has an upper face 32 and an opposed lower face 33. The upper and lower faces 32 and 33 meet at the outer and inner edges 30 and 31. The perimeter structure 21 includes a flat annulus 34 or ring extending inwardly from the outer edge 30 and along a plane at the bottom 25 of the base 11. The annulus 34 terminates at an upstanding ridge 35; the ridge 35 rises obliquely from the annulus 34 toward the top 24 of the base 11 at the inner edge 31. The upper face 32, along the ridge 35, has several differently-angled pitches, and proximate the top 24, the ridge 35 is formed with an inset seat 36. The seat 36 is an annular depression extending into the ridge 35 from the upper face 32 thereof; the seat 36 is sized and shaped to snugly receive the cap 12 when applied to the base 11. The seat 36 terminates radially inwardly at the top 24 and at the inner edge 31. The inner edge 31 extends vertically downward toward, but not entirely to, the bottom 25 of the base, generally perpendicular to the plane at the bottom 25.

Figure 1B:
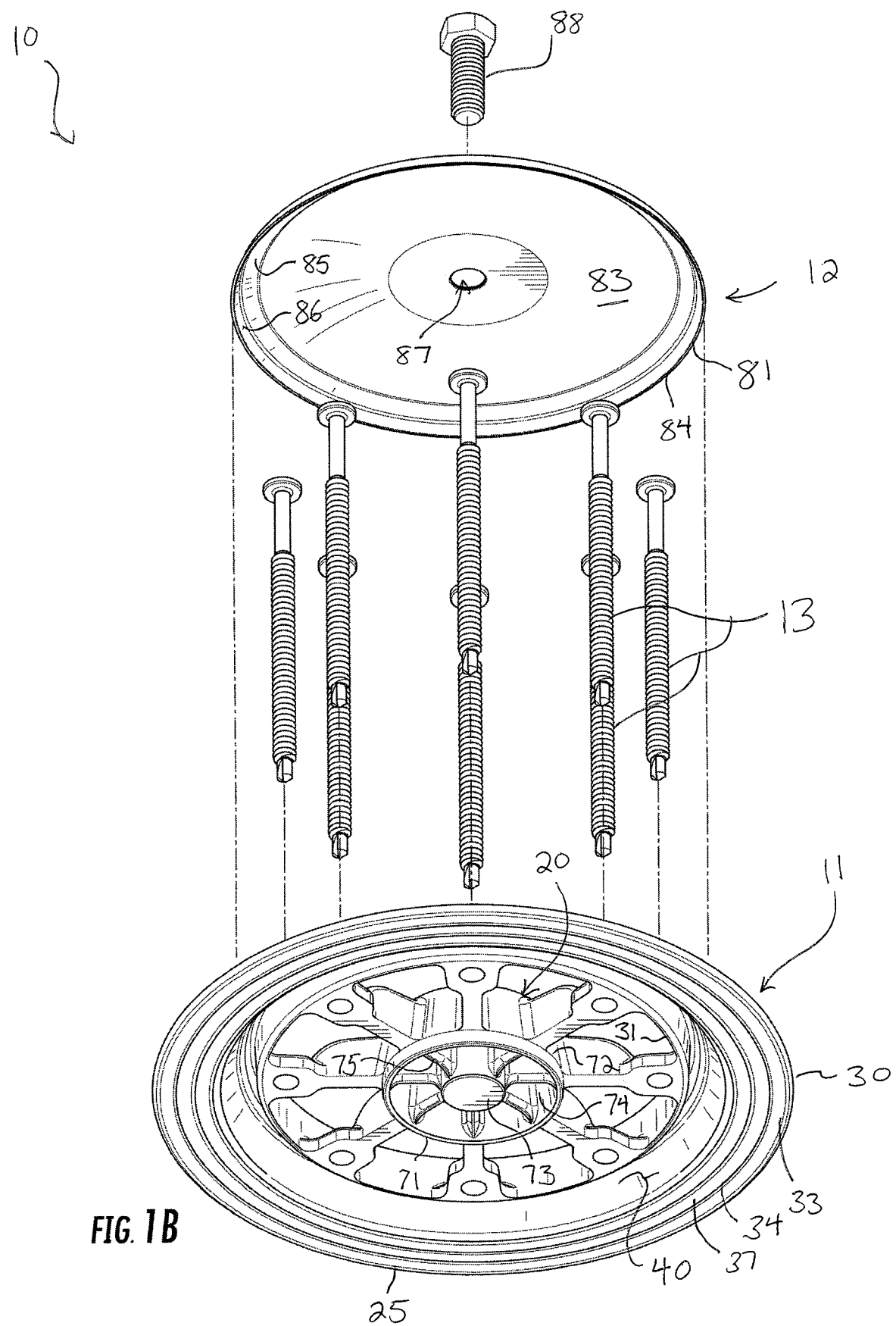

Referring primarily to FIG. 1B, where the underside of the base 11 is illustrated well, the base 11 is partially hollow. The lower face 33 of the base 11 is contoured. At the annulus 34, proximate the outer edge 30, the lower face 33 is flat. Just slightly inboard, however, the flat lower face 33 is interrupted by a coaxial channel 37 extending upward into the base 11. The channel 37 has a generally rectangular cross-section (though other shapes may be suitable) for receiving an o-ring, foam ring, adhesive sealant, or other form of gasket or sealing member to be compressed between the base 11 and the roof. The lower face 33 extends from the channel 37, along the plane at the bottom 25, to the underside of the upstanding ridge 35, at which point the lower face 33 rises upward toward the top 24 of the base 11. The lower face 33 then drops back down toward the bottom 25 along the inner edge 31. The inner edge 31 extends from the top 24 of the base 11 toward the bottom 25 of the base 11, but it stops above the bottom 25. The inner edge 31 projects downwardly from the top 24 approximately two-thirds of the distance between the top 24 and the bottom 25.

Figure 1C:
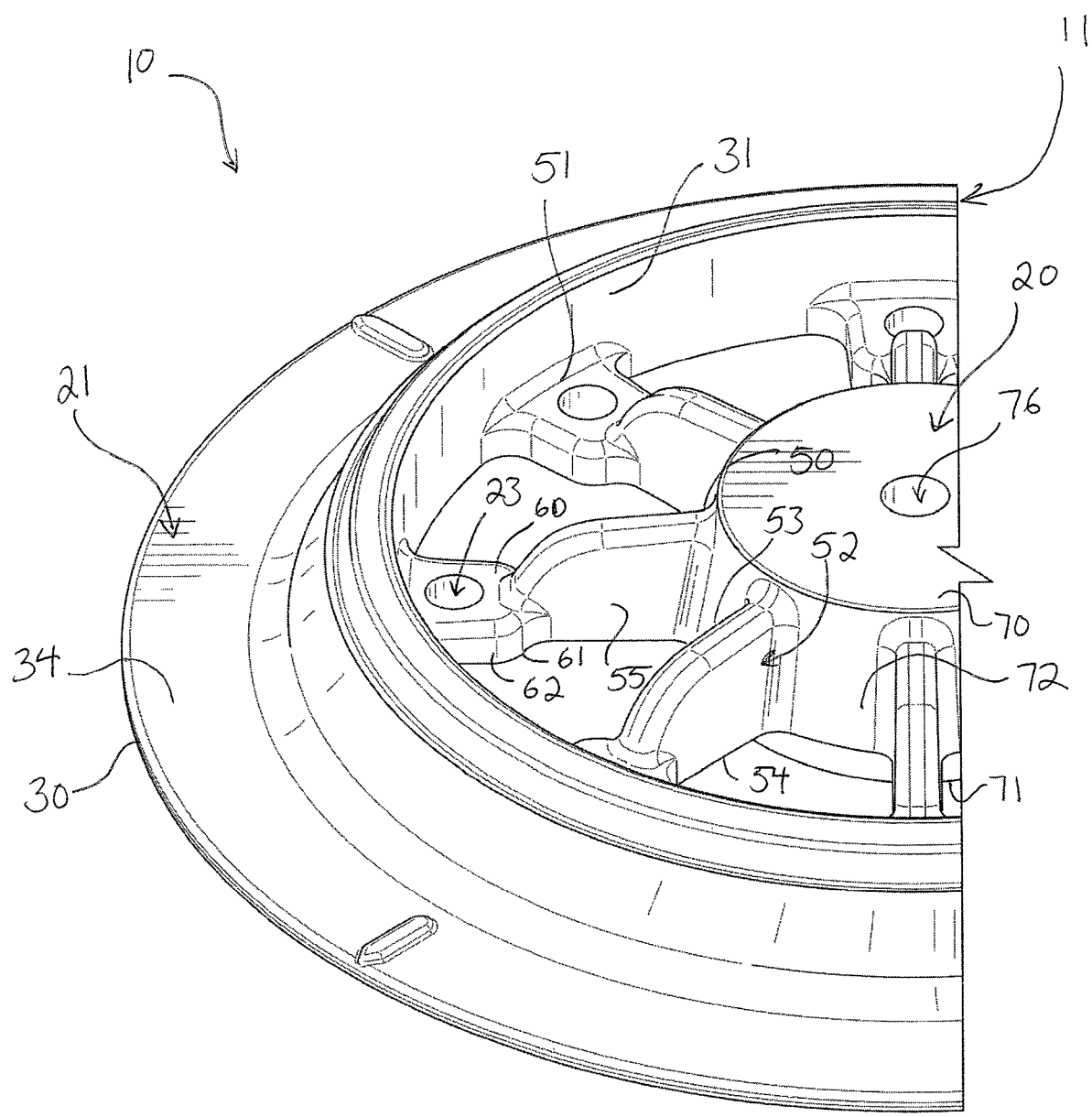
FIG. 1C is an enlarged partial view of the device of FIG. 1A.
Figure 1D:
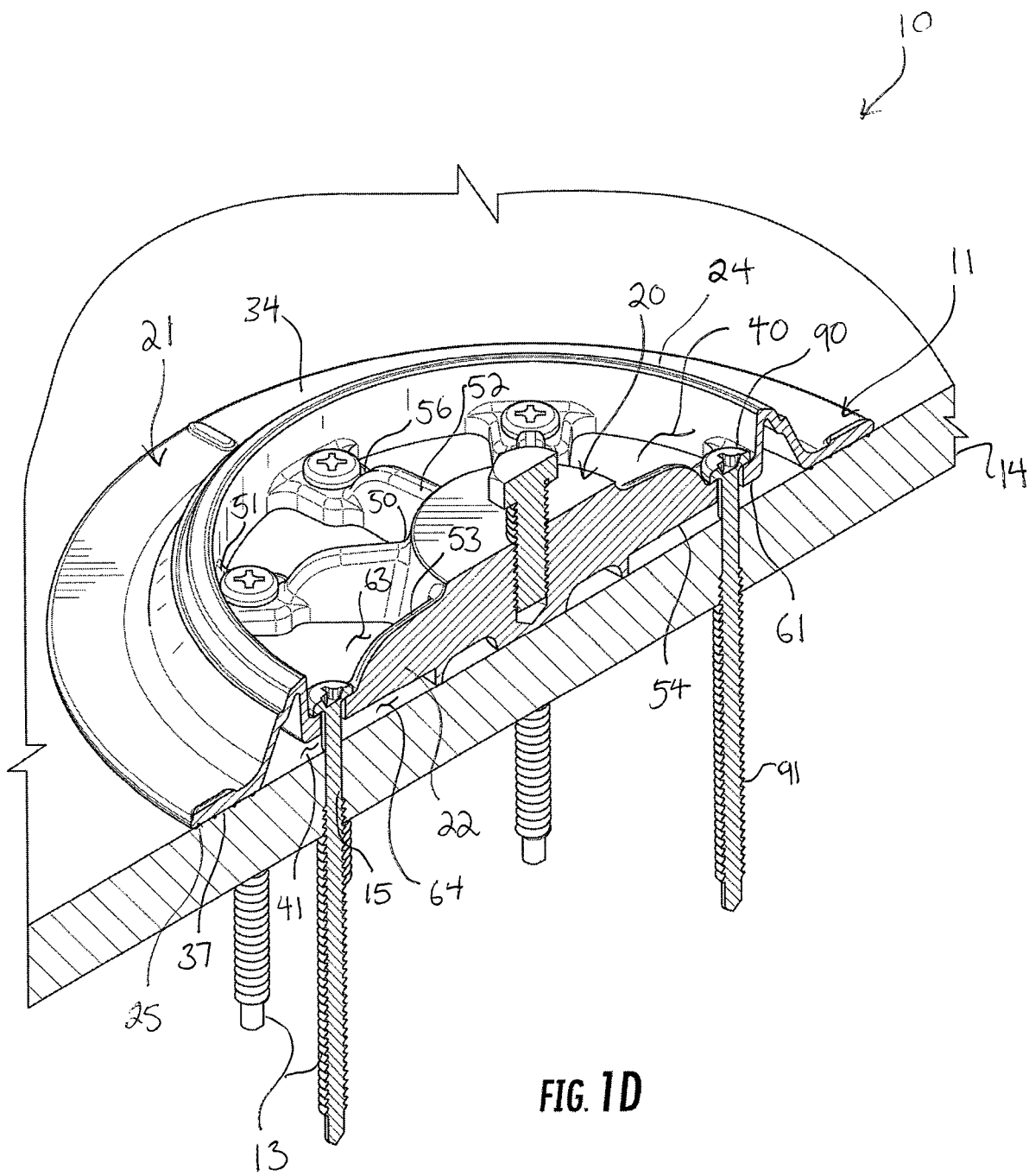
FIGS. 1D-1F are section views taken along the line 1-1 in FIG. 1A, showing a sequence of steps applying the device to a roof.

The upper and lower faces 32 and 33 cooperate to bound a hold of the base 11. The hold 40 is an inner space of the base 11. The hold 40 is hereinafter identified as a reservoir 40 with respect to this embodiment because, when the device 10 is applied to a roof structure, the hold 40 cooperates with the roof structure to define a reservoir 40 configured to receive, hold, and contain a flowable sealant applied thereto. As such, the hold 40 is the reservoir 40. Indeed, in all embodiments presented herein, the hold is a reservoir and will be referred to as such. The reservoir 40 is open to both the top 24 and the bottom 25 of the base 11, and it extends between the hub 20 and the perimeter structure 21 and is unsevered by the ribs 22. In operation, as discussed below, the reservoir 40 is filled with the flowable sealant to ensure an environmental seal against the roof and around the roof penetration. The inner edge 31 defines a gap 41 below the ridge 35 at the inner edge 31; this gap 41 is best seen in FIG. 1D. The presence of the gap 41 prevents the inner edge 31 from separating the reservoir 40 into an outer ring (under the ridge 35) and an inner ring (between the ridge 35 and the hub 20). This gap 41 allows sealant to flow radially throughout the reservoir 40.

The perimeter structure 21 is formed integrally and monolithically to each of the ribs 22. Turning now primarily to FIG. 1C, five ribs 22 are visible. The device 10 preferably has eight ribs 22, as shown in these drawings, but may suitably have a fewer or greater number of ribs 22 depending on the needs of the application. Moreover, the ribs 22 are identical in every respect, and so discussion of the various structural elements and features of the ribs 22 will be made without reference to one rib 22 in particular, and the reader should understand that the discussion applies to all the ribs 22 equally.

The rib 22 has an inner end 50 proximate the hub 20 and an outer end 51 proximate the perimeter structure 21. The rib 22 has an arm 52 projecting outward from the inner end 50 toward the outer end 51. The arm 52 is tall and narrow. It has a top 53, a bottom 54, and opposed sides 55. The side 55 are flat, parallel, and tall between the top 53 and bottom 54. The bottom 54 is generally flat, parallel to the plane at the bottom 25 of the base 11 but elevated above it. The top 53 is highest proximate the inner end 50 and tapers down slightly toward the bottom 54. The arm 52 extends about two-thirds of the distance between the inner end 50 and the outer end 51. The arm 52 terminates at its outer end at a seat 56.

The seat 56 is a flat extension of the arm 52. It has a flat top 60, a flat bottom 61, and short sides 62. The tall sides 55 of the arm 52 transition to the short sides 62 of the seat 56, and the narrow top 53 and bottom 54 of the arm 52 transition to the wider, flat top 60 and bottom 61 of the seat 56. Formed centrally and entirely through the seat 56 from the top 60 to the bottom 61 is the bore 23 mentioned above. The bore 23 is preferably a cylindrical, unthreaded hole formed transversely through the seat 56. The seat 56 terminates at its outer end at the outer end 51 of the rib 22, which is formed continuously to the inner edge 31 of the perimeter structure 21. Thus, the rib 22, extending from the inner end 50, to the arm 52, to the seat 56, and finally to the outer end 51, is a single form, connected integrally and monolithically to both the hub 20 and the perimeter structure 21.

Referring now to FIG. 1D, the top 53 of the rib 22 is below the top 24 of the base 11 and is below the top of the hub 20. The seat 56 is also below the top 24 and below the top of the hub 20. Since the top 53 of the rib 22 descends from proximate the hub 20 to the seat 56, the entirety of the rib 22 is below the open top 24 of the base 11. With the rib 22 disposed apart from the open top 24, a cavity 63 is defined above the rib 22. The bottom 54 of the arm 52 is contiguous with and coplanar to the bottom 61 of the seat 56, such that the arm 52 has a single, straight, planar bottom extending entirely from the inner end 50 to the outer end 51. This bottom—formed by the bottoms 54 and 61—is elevated above the bottom 25 of the base 11. With the rib 22 disposed apart from the bottom 25 of the base 11, a cavity 64 is defined below the rib 22 and above the plane including the bottom 25 of the base 11. Both cavities 63 and 64 above and below the rib 22 form part of the reservoir 40. In this way, the rib 22 does not sever the reservoir 40, because the rib 22 does not separate the reservoir 40 into separate portions or parts among which the sealant cannot flow. Rather, the sealant can flow through the entire reservoir 40 despite the ribs 22, because the ribs 22 do not sever the reservoir 40.

Referring again to FIGS. 1A-1C, the ribs 22 all extend radially outward from the central hub 20. The hub 20 is located centrally, arranged coaxially with respect to the perimeter structure 21. The hub 20 is a cylindrical block, having a top 70, an opposed bottom 71, and an outer cylindrical sidewall 72 extending between the top 70 and bottom 71. The inner end 50 of each rib 22 is formed to the outer sidewall 72. The sidewall 72 has a slight taper to it, so that the sidewall 72 is slightly reduced in outer diameter proximate the top 70 compared to proximate the bottom 71. The top 70 of the hub 20 is coplanar with the top of the upstanding ridge 35, and these two tops are coplanar with the open top 24 of the base 11.

As shown best in FIG. 1B, the hub 20 has a central solid body 73. The solid body 73 is separated from the sidewall 72 by an annular void 74. A plurality of short ribs 75 extend from the solid body 73 to the sidewall 72 and are registered in alignment with the ribs 22. Both the sidewall 72 and the solid body 73 extend downward entirely to the bottom 71, while the bottoms of the ribs 75 are raised slightly with respect to the bottom 71. However, when the base 11 is applied to the roof, the sidewall 72 is preferably in continuous contact with the roof and isolates the void 74 from the reservoir 40. The void 74 extends up to the top 70.

The top 70 is flat, circular, smooth, and planar. A threaded bore 76 is formed in the geometric center of the top 70. The bore 76 extends into the solid body 73 of the hub 20 from the top 70, normal to the flat top 70, and terminates before the bottom 71, such that the bore 76 is blind. When the cap 12 is placed over the base 11, the bore 76 is registered with a hole in the cap 12.

Referring now to FIGS. 1A and 1, the cap 12 is wide, round, and has a very low-profile dome shape. The cap 12 has a top 80 and an opposed bottom 81, and opposed upper and lower surfaces 82 and 83. The cap 12 is thin between the upper and lower surfaces 82 and 83, defining a shell. The upper surface 82 is convex, and the lower surface 83 is concave, because the cap 12 curves downward from the flat top 80 to an annular, downwardly-projecting lip 84 at the bottom 81. The lip 84 also defines the outer edge of the cap 12 at its outer dimension. The lip 84 includes an inner first pitch 85 and an outer second pitch 86 (as best seen in FIG. 1F); the second pitch 86 is steeper than the first pitch 85.

At the top 80 of the cap 12 is a hole 87. The hole 87 is formed entirely through the cap 12 from the upper surface 82 to the lower surface 83. The hole 87 is located centrally on the top 80 and on the cap 12, such that when the cap 12 is moved onto the base 11, the hole 87 is registered with the threaded bore 76 in the hub 20. This allows a rugged bolt 88 to be passed through the hole 87 in the cap 12 and be threadably applied to the bore 76 in the hub 20 when the device 10 is used.

Figure 1E:
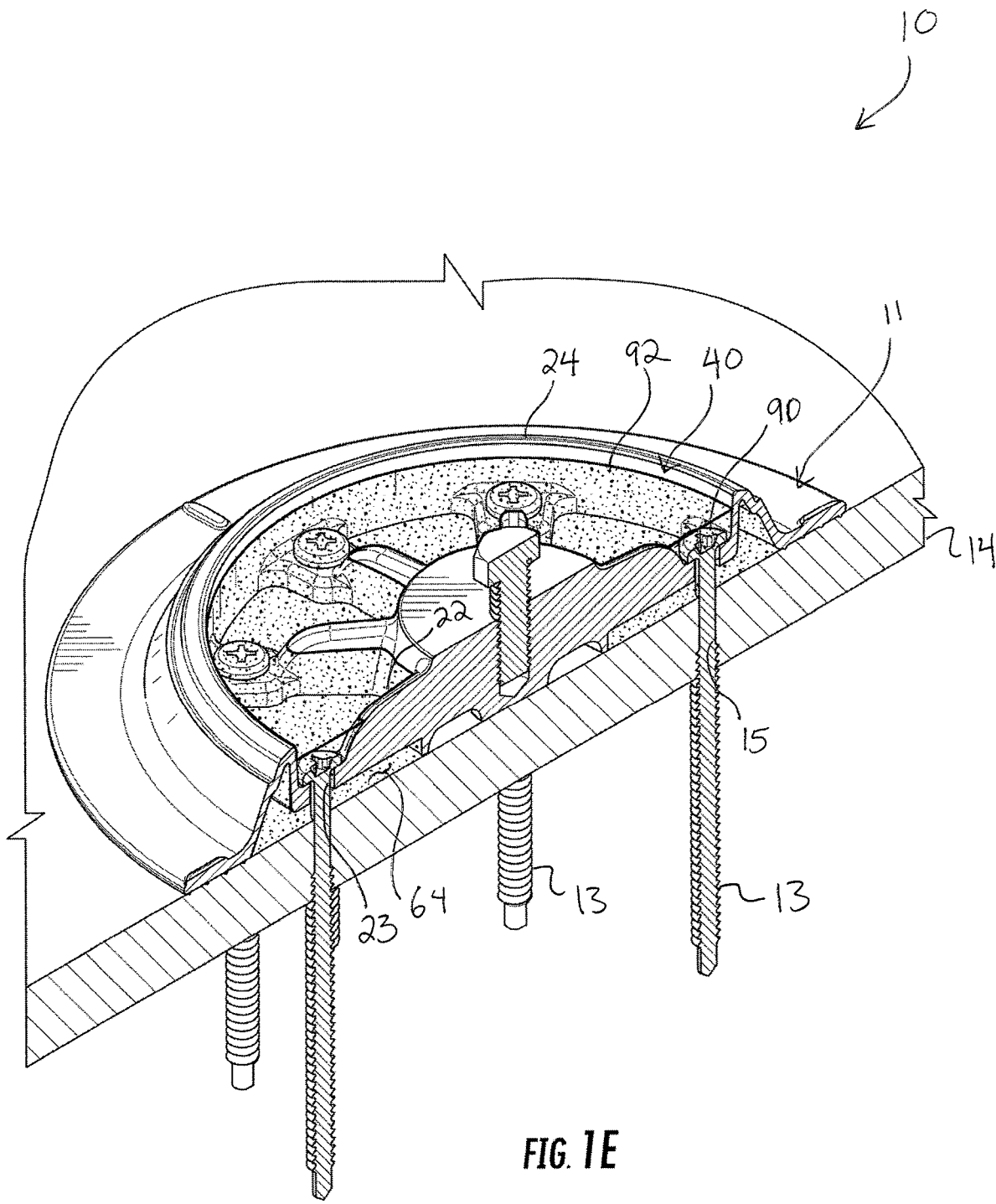
Figure 1F:
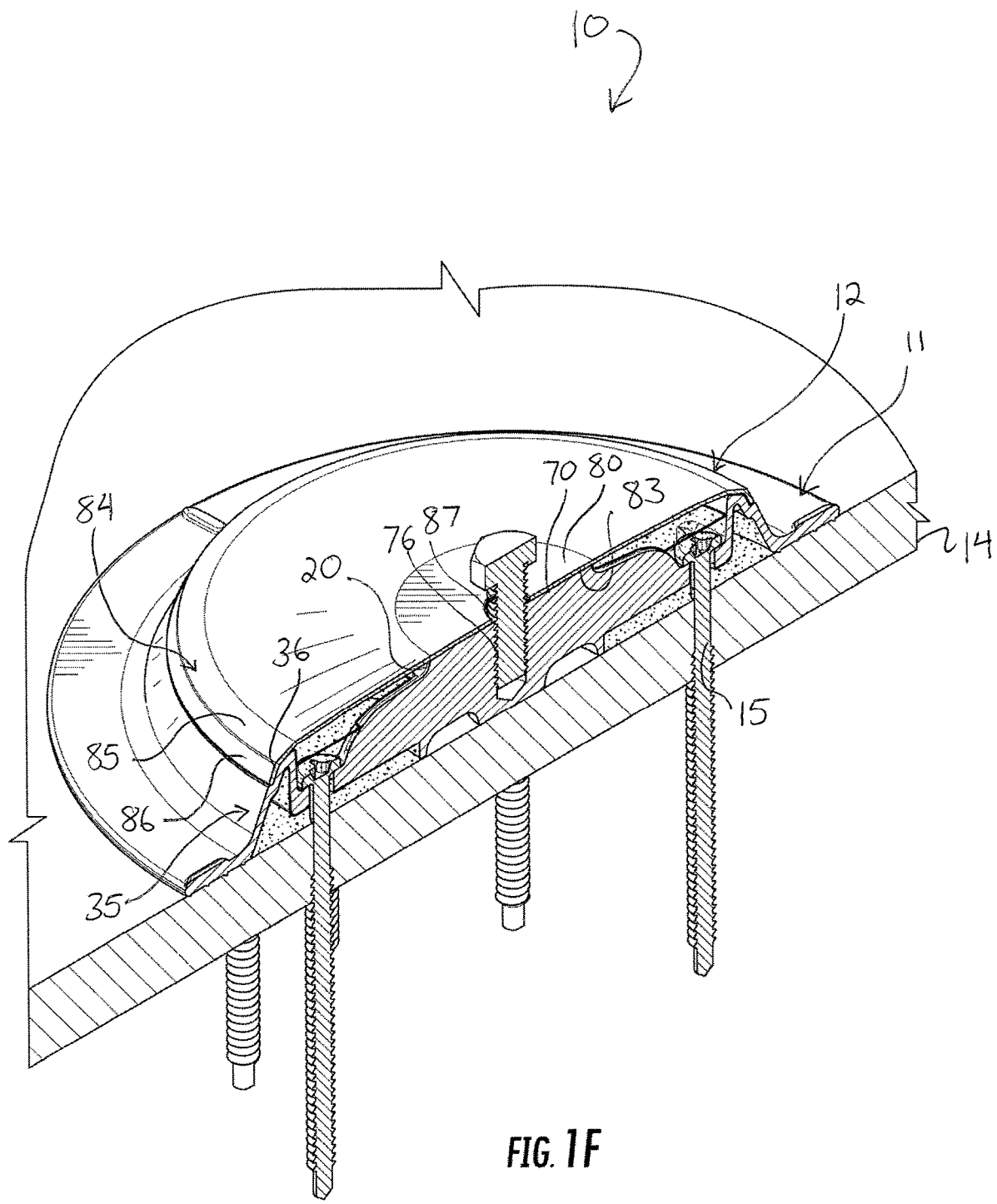

Turning now to FIGS. 1D-1F, in operation, the device 10 is useful for providing a mount for a rack on a roof 14 and for sealing roof penetration 15 made through the roof 14, which are necessary to securely attach the device 10 to the roof 14. The roof penetrations 15 are formed, such as with a drill, through the roof 14 and potentially other roof structures (shingles, underlayment, wood decking, moisture barriers, rafters, and other structures are collectively simplified here as the roof 14). If there are several roof penetrations 15, a pattern is used to ensure each is located properly with respect to the other. Once the roof penetrations 15 are formed, the base 11 is placed atop the roof, as in FIG. 1D. The base 11 is aligned so that each bore 23 in a rib 22 is registered with a respective roof penetration 15. The fasteners 13 are then applied to the bores 23. In other embodiments, the fasteners 13 are self-tapping or self-drilling fasteners, and it is not necessary to drill holes; rather, the base 11 is placed over a desired location on the roof 14 and then the fasteners 13 are applied into the roof 14. Each fastener 13 has a head 90 and a long shank 91. Each fastener 13 is threadably engaged with the roof 14 until the head 90 is seated in the seat 56 of the rib 22 and the shank 91 passes below the seat 56, penetrating the roof 14 and forming into the roof penetration 15. The head 90 is seated in flush and direct contact with the top 60 of the seat 56, and an unthreaded portion of the shank 91 just below the head 90 fills the bore 23 snugly. When all fasteners 13 are engaged in this manner, the base 11 is securely fixed to the roof 14.

In some embodiments, an o-ring, foam ring, adhesive sealant, or other form of gasket or sealing member is applied to the channel 37 on the underside of the base 11 before the base 11 is secured according to the above. This gasket creates a first seal between the base 11 and the roof 14, just inboard from the outer edge 30. This first seal is effective at preventing water, moisture, and other environmental ingress at the annulus 34. Use of a gasket is optional, however, and not necessary to ensure an environmental seal between the base 11 and the roof 14.

Turning now to FIG. 1E, once the base 11 is securely fixed to the roof 14, a flowable sealant 92 is applied to the reservoir 40. The sealant 92 is slowly applied to the reservoir 40 until the sealant 92 nearly reaches the top 24 of the base 11. By slowly filling the sealant 92, the sealant 92 can flow across the portion of the roof 14 covered by the base 11, surrounding the roof penetrations 15. Because the roof penetrations 15 are under the bores 23 in the ribs 22, the roof penetrations 15 are under the ribs 22. However, the cavities 64 defined below the ribs 22 are in fluid communication with, and indeed, form part of, the reservoir 40, and so sealant 92 moves into the cavities 64 and surrounds the fasteners 13 and the roof penetrations 15. The sealant 92 entirely fills the bottom of the reservoir 40, flowing through the cavities 63 and 64 and through the gaps 41. This forms an environmental seal between the base 11 and the roof 14 which prevents environmental ingress through the roof 14.

By filling the sealant 92 to just below the top 24, the heads 90 of the fasteners 13 are covered. Because the seats 56 are disposed below the top 24 of the base 11, the seats 56 and the heads 90 and shanks 91 of the fasteners 13 received in them are covered. This increases the surety of the environmental seal. Further, by filling the reservoir with sealant 92 until the heads 90 are covered, the installer performing the work receives visual confirmation: when the heads 90 are no longer visible, the installer can be sure the reservoir 40 is adequately filled.

The above defines an installed condition of the device 10. This installed condition is sufficient to form an environmental seal over the roof penetrations 15. Some installers may choose to apply the bolt 88 to the central hub 20 and then immediately begin installing racks. However, an additional step may also be completed. FIG. 1F illustrates the cap 12 applied to the base 11. The installer registers the cap 12 with the base 11, so that the lip 84 is registered with the seat 36 at the top of the ridge 35 of the base 11, and then moves the cap 12 downward onto the base 11 so that the lip 84 is snugly received in the seat 36. When so placed, the lower surface 83 of the top 80 of the cap 12 is received in direct and continuous contact with the flat top 70 of the hub 20, and the hole 87 and the bore 76 are aligned. The bolt 88 is then passed through the hole 87 and is threadably engaged with the bore 76. When the bolt 88 is tightened in the bore 76, the cap 12 is compressed onto the base 11, and the lip 84 and seat 36 form an environmental seal preventing moisture and other ingress into the device 10. The cap 12 also serves to deflect rain, snow, and other moisture onto the ridge 35 and annulus 34, from which it will flow onto the roof 14. In these ways, when the cap 12 is moved onto the base 11, the cap 12 and the perimeter structure 21 of the base 11 cooperate to form an environmental seal around the roof penetrations 15.

Embodiment of FIGS. 2A-2D

Figure 2A:
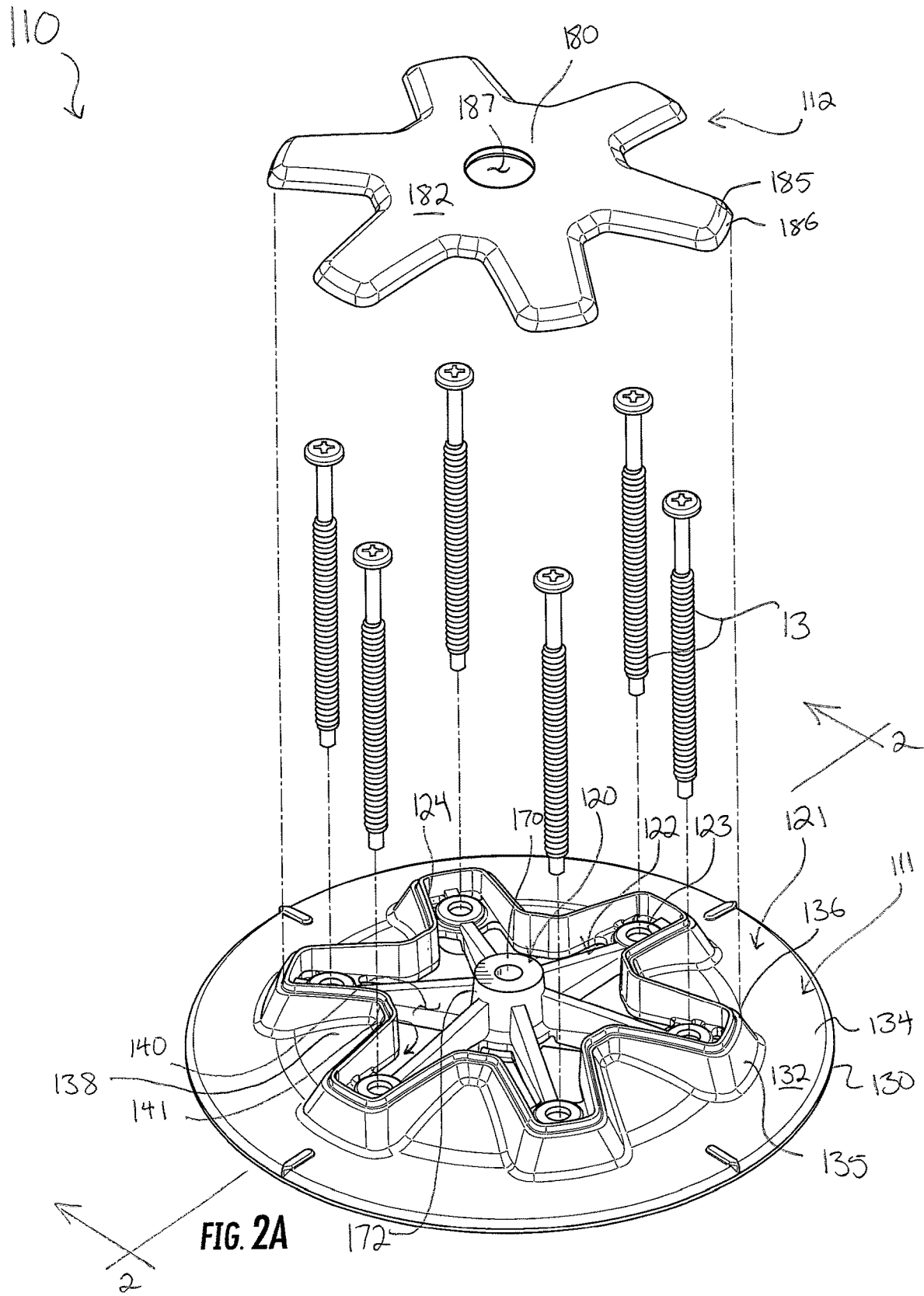

FIG. 2A illustrates a flat roof mounting device 110 (hereinafter "the device 110") for covering a roof penetration with a mount, the device 110 including a base 111 and a cap 112 moveable onto the base 111 for forming an environmental seal around the roof penetration. The device 110 is a mount for a rack.

The base 111 is wide, round, and has a low profile. The base 111 includes a central hub 120 and an outer perimeter structure 121 encircling the central hub 120. The hub 120 and perimeter structure 121 are connected, or coupled, to each other by a plurality of ribs 122 extending radially outward from the hub 120 to the perimeter structure 121. Each rib 122 is formed with a bore 123 through which a fastener 13 is passed and secured into the roof, so as to securely fix the base 111 to the roof. The hub 120, perimeter structure 121, and ribs 122 are preferably formed integrally and monolithically, from a single piece of material having strong, rugged, durable, and rigid material characteristics. When the low base 111 is applied over the roof penetration and the fasteners 13 are passed through the bores 123 such that their heads are seated against the ribs 122, the base 111 is securely mounted to the roof at the roof penetration. With the base 111 securely mounted to the roof, the base 111 is a stable, secure, and strong mount for the rack. The base has a top 124 and an opposed bottom 125; the bottom 125 is mounted on the roof and the top 124 is directed away from the roof Both the top 124 and bottom 125 are open, that is to say, openings into the base 111 are formed at both the top 124 and bottom 125.

It is noted briefly here that, while the description may refer to "a roof penetration," the embodiment of FIGS. 2A-2D actually has several roof penetrations—one for each of six fasteners 13. However, in some cases, only a single penetration may be made or used (and so only a single fastener 13 may be used), while in other cases only two or three penetrations through the roof may be made or used. The phrase "roof penetration" is therefore meant to include single and multiple penetrations through a roof in a local area, such as under the footprint of one device 110.

Referring now primarily to FIGS. 2A and 2B, like the base 111, the perimeter structure 121 is wide, round, and has a low profile. The perimeter structure 121 has a circular outer edge 130 and a star-shaped opposed inner edge 131. The outer edge 130 is a low edge, while the inner edge 131 is an upstanding flat edge. The perimeter structure 121 also has an upper face 132 and an opposed lower face 133. The upper and lower faces 132 and 133 meet at the outer and inner edges 130 and 131. The perimeter structure 121 includes a flat annulus 134 or ring extending inwardly from the outer edge 130 and along a plane at the bottom 125 of the base 111. The annulus 134 terminates at a star-shaped, upstanding ridge 135; the ridge 135 rises obliquely from the annulus 134 toward the top 124 of the base 111 at the inner edge 131. The upper face 132, along the ridge 135, has several differently-angled pitches, and proximate the top 124, the ridge 135 is formed with an inset seat 136. The seat 136 is an annular depression extending around and into the ridge 135 from the upper face 132 thereof; the seat 136 is sized and shaped to snugly receive the cap 112 when applied to the base 111. The seat 136 terminates inwardly at the top 124 and at the inner edge 131. The inner edge 131 extends vertically downward toward, but not entirely to, the bottom 125 of the base, generally perpendicular to the plane at the bottom 125.

Referring primarily to FIG. 2B, where the underside of the base 111 is illustrated well, the base 111 is partially hollow. The lower face 133 of the base 111 is contoured. At the annulus 134, proximate the outer edge 130, the lower face 133 is flat. Just slightly inboard, however, the flat lower face 133 is interrupted by a coaxial channel 137 extending upward into the base 111. The channel 137 has a generally rectangular cross-section (though other shapes may be suitable) for receiving an o-ring, foam ring, adhesive sealant, or other form of gasket or sealing member to be compressed between the base 111 and the roof. The lower face 133 extends from the channel 137, along the plane at the bottom 125, to the underside of the upstanding ridge 135, at which point the lower face 133 rises upward toward the top 124 of the base 111. The lower face 133 then drops back down toward the bottom 125 along the inner edge 131.

The upstanding ridge 135 and the inner edge 131 wrap around the central hub 120 in a star pattern with six legs. The ridge 135 and edge 131 project radially outward around each bore 123, forming a long leg of the star around the rib 122 and its bore 123. Then, between adjacent ribs 122, the ridge 135 and edge 131 cut inward toward the hub 120, thereby decreasing the volume of an internal reservoir 140 of the base 111. The annulus 134 extends inward in these places to form wedge-shaped dome portions 138. These dome portions 138 curve slightly upwardly toward the top 124 but stop short thereof. At the inner ends of the dome portions 138, the inner edge 131 projects downwardly from the top 124 approximately two-thirds of the distance between the top 124 and the bottom 125. In other words, in those areas, the inner edge 131 extends from the top 124 of the base 111 toward the bottom 125 of the base 111, but it stops above the bottom 125.

The upper and lower faces 132 and 133 cooperate to bound the continuous internal reservoir 140 of the base 111. The reservoir 140 is open to both the top 124 and the bottom 125 of the base 111, and it extends between the hub 120 and the perimeter structure 121. The reservoir 140 is unsevered by the ribs 122 because, as will be explained, there are gaps above and below the ribs 122. Further, there are gaps below the dome portions 138, so that the reservoir 140 is continuous. The reservoir 140 is an inner space or hold, which, when the device 110 is applied to a roof structure, cooperates with the roof structure to receive, hold, and contain the flowable sealant applied to the reservoir 40. In operation, as discussed below, the reservoir 140 is filled with the flowable sealant to ensure an environmental seal against the roof and around the roof penetration. As seen in FIGS. 2B and 2B, the inner edge 131 defines a gap 141 below the ridge 135 at the inner edge 131. The presence of the gap 141 prevents the inner edge 131 from separating the reservoir 140 into an outer ring (under the ridge 135) and an inner ring (between the ridge 135 and the hub 120). This gap 141 allows sealant to flow radially throughout the reservoir 140.

Figure 2C:
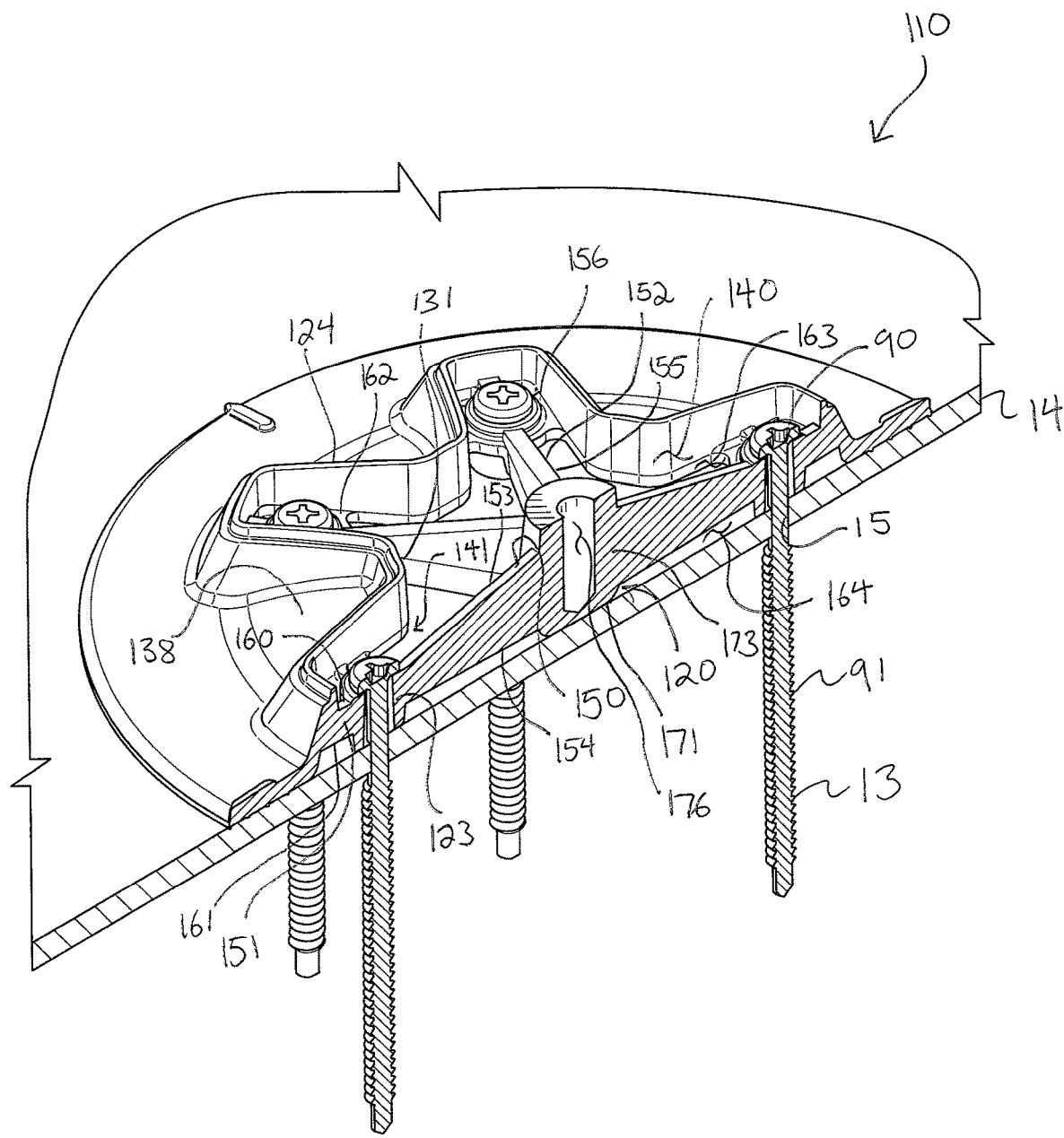
FIGS. 2C and 2D are section views taken along the line 2-2 in FIG. 2A, showing a sequence of steps applying the device to a roof.

The perimeter structure 121 is formed integrally and monolithically to each of the ribs 122. Turning now primarily to FIG. 2C, four ribs 122 are visible. The device 110 preferably has six ribs 122, as shown in these drawings, but may suitably have a fewer or greater number of ribs 122 depending on the needs of the application. Moreover, the ribs 122 are identical in every respect, and so discussion of the various structural elements and features of the ribs 122 will be made without reference to one rib 122 in particular, and the reader should understand that the discussion applies to all the ribs 122 equally.

The rib 122 has an inner end 150 proximate the hub 120 and an outer end 151 proximate the perimeter structure 121. The rib 122 has an arm 152 projecting outward from the inner end 150 toward the outer end 151. The arm 152 is tall and narrow. It has a top 153, a bottom 154, and opposed sides 155. The side 155 are flat, parallel, and tall between the top 153 and bottom 154. The bottom 154 is generally flat, parallel to the plane at the bottom 125 of the base 111 but elevated above it. The top 153 is highest proximate the inner end 150 and tapers down slightly toward the bottom 154. The arm 152 extends about two-thirds of the distance between the inner end 150 and the outer end 151. The arm 152 terminates at its outer end at a seat 156.

The seat 156 is a flat extension of the arm 152. It has a flat top 160, a flat bottom 161, and short sides 162. The tall sides 155 of the arm 152 transition to the short sides 162 of the seat 156, and the narrow top 153 and bottom 154 of the arm 152 transition to the wider, flat top 160 and bottom 161 of the seat 156. The seat 156 is tall; the bottom 161 projects downwardly entirely to the plane of the bottom 125 of the base 111, such that it contacts the top of the roof. Formed centrally and entirely through the seat 156 from the top 160 to the bottom 161 is the bore 123 mentioned above. The bore 123 is preferably a cylindrical, unthreaded hole formed transversely through the seat 156. The seat 156 terminates at its outer end at the outer end 151 of the rib 122, which is formed continuously to the inner edge 131 of the perimeter structure 121. Thus, the rib 122, extending from the inner end 150, to the arm 152, to the seat 156, and finally to the outer end 151, is a single form, connected integrally and monolithically to both the hub 120 and the perimeter structure 121.

The seat 156 is coupled the inner edge 131 at three places. Each of the sides 162 of the seat 156 extends laterally outward as an extension formed to the inner edge 131 proximate the dome portions 138. Further, the distal or outer end of the seat 156 extends radially outward as an extension formed to the inner edge 131 at the distal end of one of the legs of the inner edge 131.

Referring still to FIG. 2C, the top 153 of the rib 122 is below the top 124 of the base 111 and is below the top of the hub 120. The seat 156 is also below the top 124 and below the top of the hub 120. Since the top 153 of the rib 122 descends from proximate the hub 120 to the seat 156, the entirety of the rib 122 is below the open top 124 of the base 111. With the rib 122 disposed apart from the open top 124, a cavity 163 is defined above the rib 122. The bottom 154 of the arm 152 is above the bottom 161 of the seat 156. The arm 152 has a single, straight, planar bottom 154 extending entirely from the inner end 150 to the seat 156, which has a lower bottom 161, and the bottom 154 of the arm 152 then rises slightly back up at the outer end 151. This bottom 154 is elevated above the bottom 125 of the base 111. With the rib 122 disposed apart from the bottom 125 of the base 111, a cavity 164 is defined below the rib 122 and above the plane including the bottom 125 of the base 111. Both cavities 163 and 164 above and below the rib 122 form part of the reservoir 140. In this way, the rib 122 does not sever the reservoir 140, because the rib 122 does not separate the reservoir 140 into separate portions or parts among which the sealant cannot flow. Rather, the sealant can flow through the entire reservoir 140 despite the ribs 122, because the ribs 122 do not sever the reservoir 140.

Referring again to FIGS. 2A-2C, the ribs 122 all extend radially outward from the central hub 120. The hub 120 is located centrally, arranged coaxially with respect to the perimeter structure 121. The hub 120 is a cylindrical block, having a top 170, an opposed bottom 171, and an outer cylindrical sidewall 172 extending between the top 170 and bottom 171. The inner end 150 of each rib 122 is formed to the outer sidewall 172. The sidewall 172 has a slight taper to it, so that the sidewall 172 is slightly reduced in outer diameter proximate the top 170 compared to proximate the bottom 171. The top 170 of the hub 120 is coplanar with the top of the upstanding ridge 135, and these two tops are coplanar with the open top 124 of the base 111.

As shown best in FIG. 2C, the hub 120 has a central solid body 173. The top 170 of the hub 120 is flat, circular, smooth, and planar. A threaded bore 176 is formed in the geometric center of the top 170. The bore 176 extends into the solid body 173 of the hub 120 from the top 170, normal to the flat top 170, and terminates before the bottom 171, such that the bore 176 is blind. When the cap 112 is placed over the base 111, the bore 176 is registered coaxially with a hole in the cap 112. Indeed, when the cap 112 is placed over the base 11, the entire hub 120 is registered with the hole in the cap 112, as will be explained.

Referring now to FIGS. 2A and 2B, the cap 112 is wide and has a very low-profile, domed, star shape with six legs. The cap 112 has a top 180 and an opposed bottom 181, and opposed upper and lower surfaces 182 and 183. The cap 112 is thin between the upper and lower surfaces 182 and 183, defining a shell. The upper surface 182 is convex, and the lower surface 183 is concave, because the cap 112 curves downward from the flat top 180 to an downwardly-projecting star-shaped lip 184 at the bottom 181. The lip 184 also defines the outer edge of the cap 112. The lip 184 includes an inner first pitch 185 and an outer second pitch 186; the second pitch 186 is steeper than the first pitch 185.

At the top 180 of the cap 112 is a hole 187, surrounded by an downwardly-projecting lip 189. The hole 187 is formed entirely through the cap 112 from the upper surface 182 to the lower surface 183. The hole 187 is wide and is located centrally on the top 180 and on the cap 112, such that when the cap 112 is moved onto the base 111, the hole 187 receives the top 170 of the hub 120. The lip 189 snugly receives the sidewall 172 of the hub 120 proximate the top 180, and the bottom of the lip 189 is in contact with the tops 153 of the ribs 122. A rugged bolt, similar to the bolt 88 used with the device 10, can then be threadably applied to the bore 176 in the hub 120 when the device 110 is used.

Figure 2D:
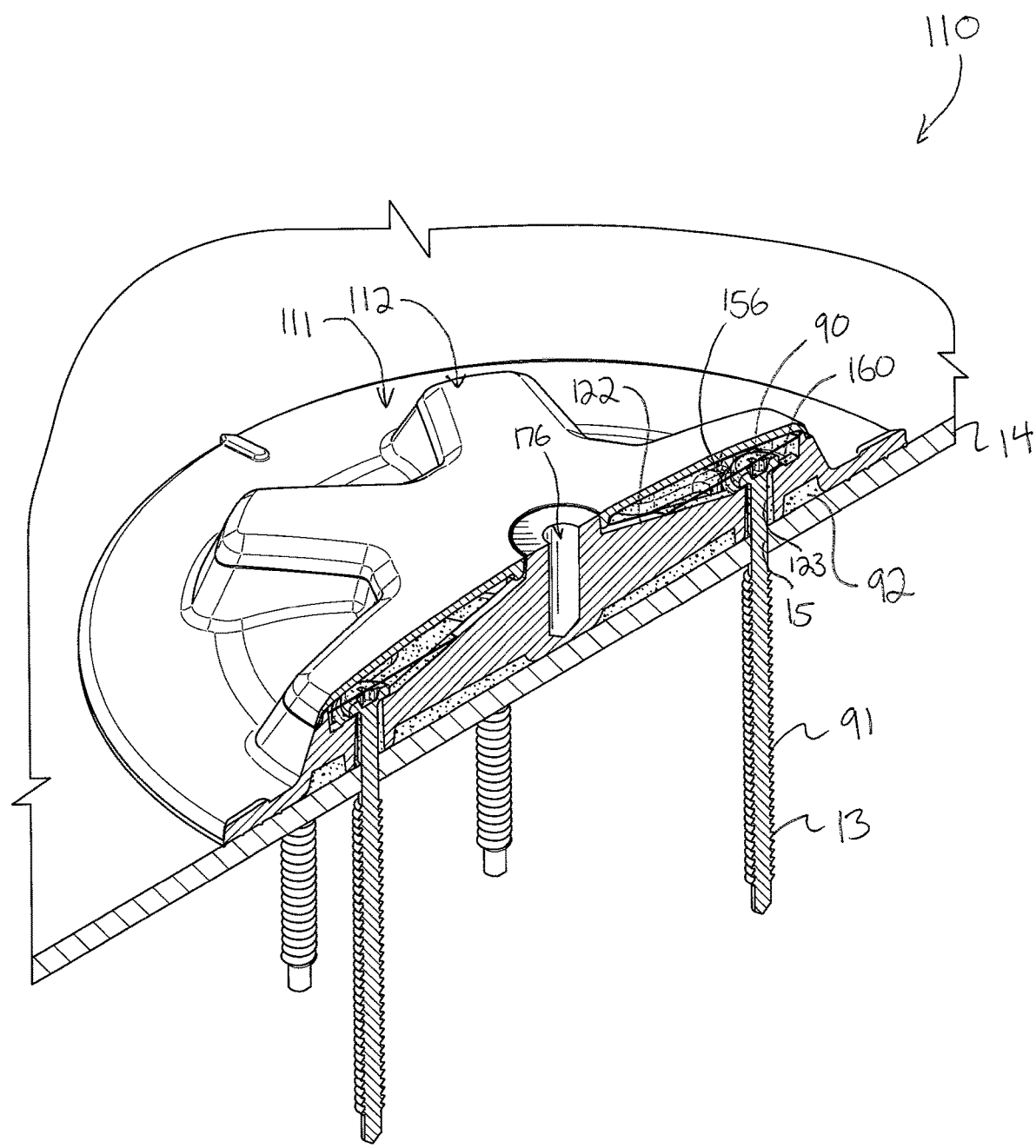

Turning now to FIGS. 2C and 2D, in operation, the device 110 is useful for providing a mount for a rack on a roof 14 and for sealing a roof penetration 15 which is made through the roof 14 and which is necessary to securely attach the device 110 to the roof 14. The roof penetrations 15 are formed, such as with a drill, through the roof 14 and potentially other roof structures (shingles, underlayment, wood decking, moisture barriers, rafters, and other structures are collectively simplified here as the roof 14). If there are several roof penetrations 15, a pattern is used to ensure each is located properly with respect to the other. Once the roof penetrations 15 are formed, the base 111 is placed atop the roof 14, as in FIG. 2C. The base 111 is aligned so that each bore 123 in a rib 122 is registered with a respective roof penetration 15. The fasteners 13 are then applied to the bores 123. In other embodiments, the fasteners 13 are self-tapping or self-drilling fasteners, and it is not necessary to drill holes; rather, the base 111 is placed over a desired location on the roof 14 and then the fasteners 13 are applied into the roof 14. Each fastener 13 has a head 90 and a long shank 91. Each fastener 13 is threadably engaged with the roof 14 until the head 90 is seated in the seat 156 of the rib 122 and the shank 91 passes below the seat 156 into the roof penetration 15. The head 90 is seated in flush and direct contact with the top 160 of the seat 156, and an unthreaded portion of the shank 91 just below the head 90 fills the bore 123 snugly. When all fasteners 13 are engaged in this manner, the base 111 is securely fixed to the roof 14.

In some embodiments, an o-ring, foam ring, adhesive sealant, or other form of gasket of sealing member is applied to the channel 137 on the underside of the base 111 before the base 111 is secured according to the above. This gasket creates a first seal between the base 111 and the roof 14, just inboard from the outer edge 130. This first seal is effective at preventing water, moisture, and other environmental ingress at the annulus 134. Use of a gasket is optional, however, and not necessary to ensure an environmental seal between the base 111 and the roof 14.

Turning now to FIG. 2D, once the base 111 is securely fixed to the roof 14, a flowable sealant 92 is applied to the reservoir 140. The sealant 92 is slowly applied to the reservoir 140 until the sealant 92 nearly reaches the top 124 of the base 111. By slowly filling the sealant 92, the sealant 92 can flow across the portion of the roof 14 covered by the base 111, surrounding the roof penetrations 15. The cavities 64 defined below the ribs 122 are in fluid communication with, and indeed, form part of, the reservoir 140, and so sealant 92 moves into the cavities 64 and surrounds the seat 156 and the fasteners 13 in the roof penetrations 15. The sealant 92 entirely fills the bottom of the reservoir 140, flowing through the cavities 163 and 164 and through the gaps 141. This forms an environmental seal between the base 111 and the roof 14 which prevents environmental ingress through the roof 14.

By filling the sealant 92 to just below the top 124, the heads 90 of the fasteners 13 are covered. Because the seats 156 are disposed below the top 124 of the base 111, the seats 156 and the heads 90 and shanks 91 of the fasteners 13 received in them are covered. This increases the surety of the environmental seal. Further, by filling the reservoir with sealant 92 until the heads 90 are covered, the installer performing the work receives visual confirmation: when the heads 90 are no longer visible, the installer can be sure the reservoir 140 is adequately filled.

The above defines an installed condition of the device 110. This installed condition is sufficient to form an environmental seal over the roof penetrations 15. Some installers may choose to apply the bolt to the central hub 120 and then immediately begin installing racks. However, an additional step may also be completed. FIG. 2D illustrates the cap 112 applied to the base 111. The installer registers the cap 112 with the base 111, so that the lip 184 is registered with the seat 136 at the top of the ridge 135 of the base 111 and the lip 189 around the hole 187 is registered with the sidewall 172 of the hub 120, and then moves the cap 112 downward onto the base 111 so that the lip 184 is snugly received in the seat 136. When so placed, the bottom of the lip 189 is received in direct contact with the tops 153 of the ribs 122, and the hole 187 is coaxially aligned around the bore 176. A bolt can then be passed through the hole 187 and threadably engaged with the bore 176. The cap 112 serves to deflect rain, snow, and other moisture onto the ridge 135, annulus 134, and dome portions 138, from which it will flow onto the roof 14. In these ways, when the cap 112 is moved onto the base 111, the cap 112 and the perimeter structure 121 of the base 111 cooperate to form an environmental seal around the roof penetrations 15.

Embodiment of FIGS. 3A-3D

Figure 3A:
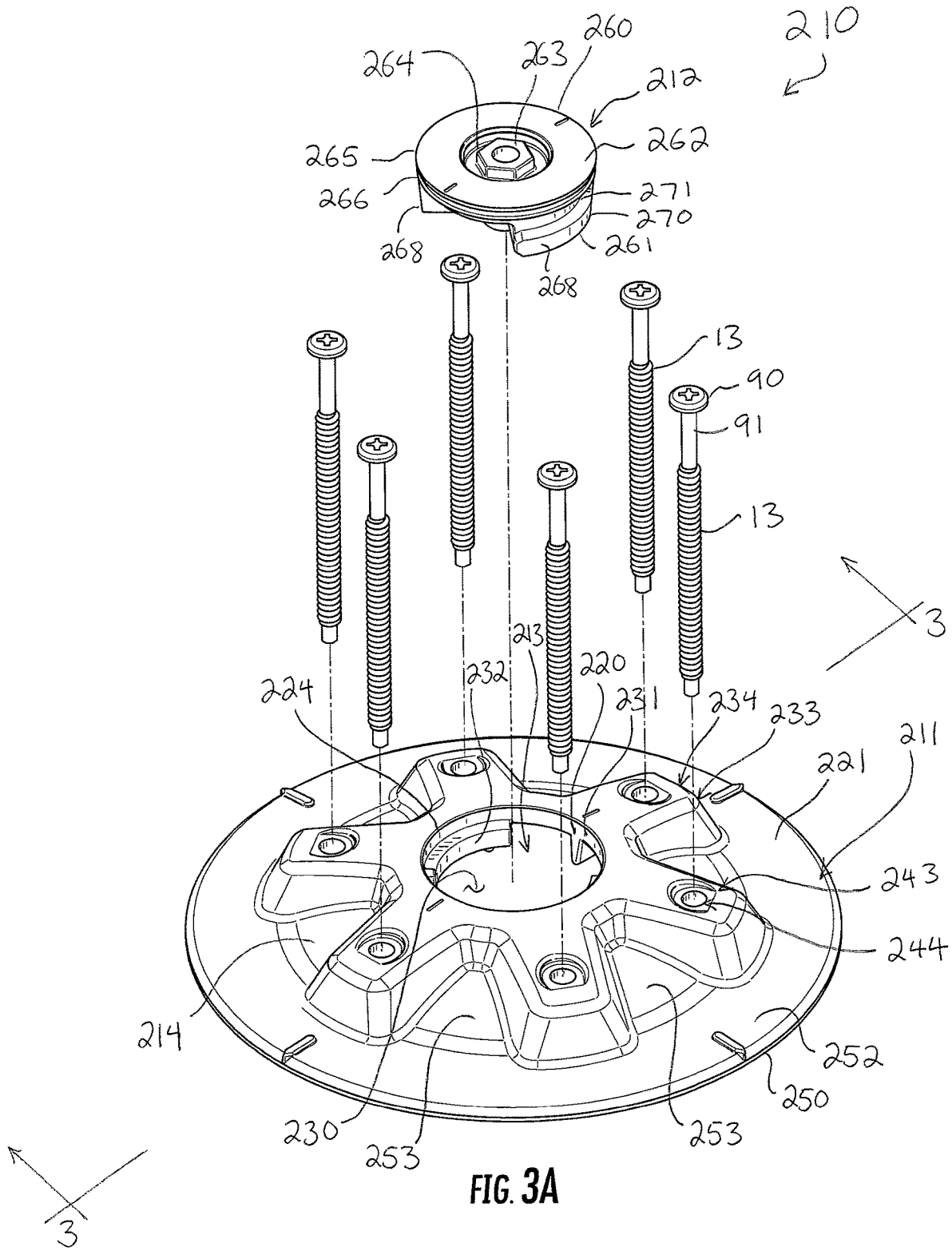
FIGS. 3A and 3B are top and bottom exploded perspective views of a flat roof mounting device.

FIG. 3A illustrates a flat roof mounting device 210 (hereinafter "the device 210") for covering a roof penetration with a mount, the device 210 including a base 211 for forming an environmental seal around the roof penetration. The device 210 is a mount for a rack, framework, or other apparatus carrying equipment such as a solar panel array (hereinafter identified as a "rack"). A key 211 is inserted into the base 211 to close a wide opening or keyway 213 in a central hub 220 at the top of the base 211.

The base 211 is wide, round, and has a low profile. The base 211 includes the hub 220 and an outer perimeter structure 221 encircling the hub 220. The hub 220 and perimeter structure 221 are connected, or coupled, to each other by a monolithic, integral, one-piece sheet 214 of material molded into the form of the base 211, which sheet 214 includes the hub 220, the perimeter structure 221, and the various structures therebetween. The sheet 214 is preferably constructed from a single piece of material having strong, rugged, durable, and rigid material characteristics. When the low base 211 is applied over the roof penetration and fasteners 13 are passed through the base 211 and into the roof, the base 211 is securely mounted to the roof at the roof penetration. With the base 211 securely mounted to the roof, the base 211 is a stable, secure, and strong mount for the rack.

The base 211 has a top 224 and a bottom 225. Both the top 224 and bottom 225 are open, that is to say, openings into the base 211 are formed at both the top 224 and bottom 225. A continuous internal reservoir 230 is defined between the top 224 and bottom 225. The reservoir 230 is an inner space or hold, which, when the base 211 is applied to the roof, cooperates with the roof to receive, hold, and contain a flowable sealant. The key 212 is applied to the keyway 213 to enclose the reservoir 230 and seal the roof penetration.

The central hub 220 depends from the open top 224. The hub 220 is a generally round cylindrical structure depending into the reservoir 230. The hub 220 includes a smooth, vertical sidewall or inner edge 231 bounding the open keyway 213. The inner edge 231 also defines a radially-inward termination of the sheet 214 about the keyway 213. Formed on the inner edge 231 below the top 224 are two separated, opposed inward flanges 232. The flanges 232 are spaced apart by two circumferential voids and extend inwardly below the top 224. The flanges 232 are engaged by complemental flanges on the key 212 when the key 212 is applied to the keyway 213, as is explained later.

From the top 224, the sheet 214 extends downwardly into a star-shaped dome 233. The dome 233 includes a plurality of spaced-apart legs 234, each extending from the central hub 220 radially outward to the perimeter structure 221 and also downward from the top 224. Together, the legs 234 form the dome 233.

Each leg 234 is identical, and the discussion here will be made without reference to one leg 234 in particular, and the reader should understand that the discussion applies to all the legs 234 equally. Referring primarily to FIG. 3C, the leg 234 has an inner end 235 and an opposed outer end 236. The leg 234 has a top 237 which is nearly flat, depending downwardly from the inner end 235 slightly to the outer end 236. The leg 234 has two opposed sides 238 extending from the inner end 235 to the outer end 236, and a sidewall 239 extends downward from the top 237 around the sides 238 and the sidewall 239. The sidewall 239 is nearly vertical.

Figure 3B:
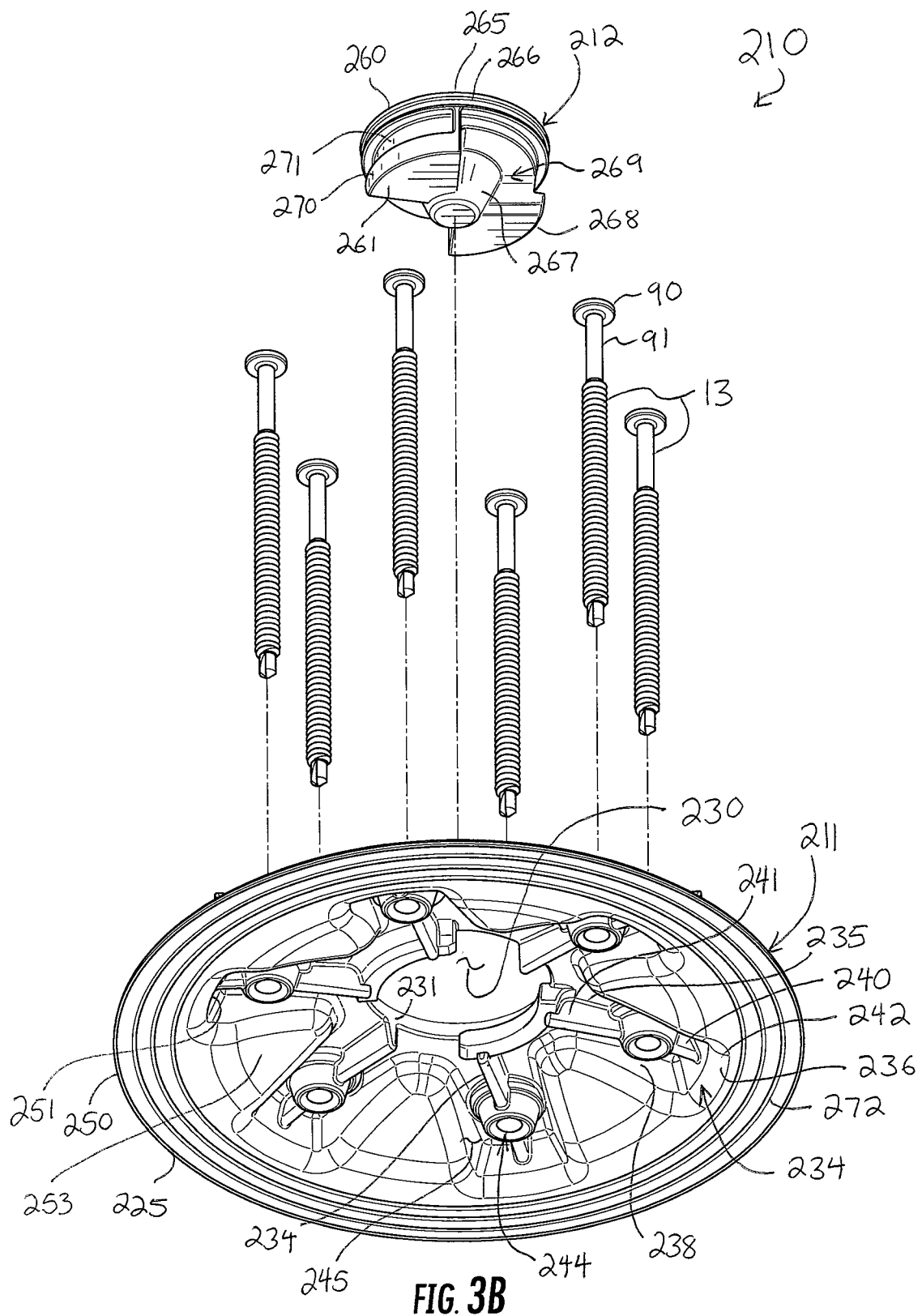
Figure 3C:
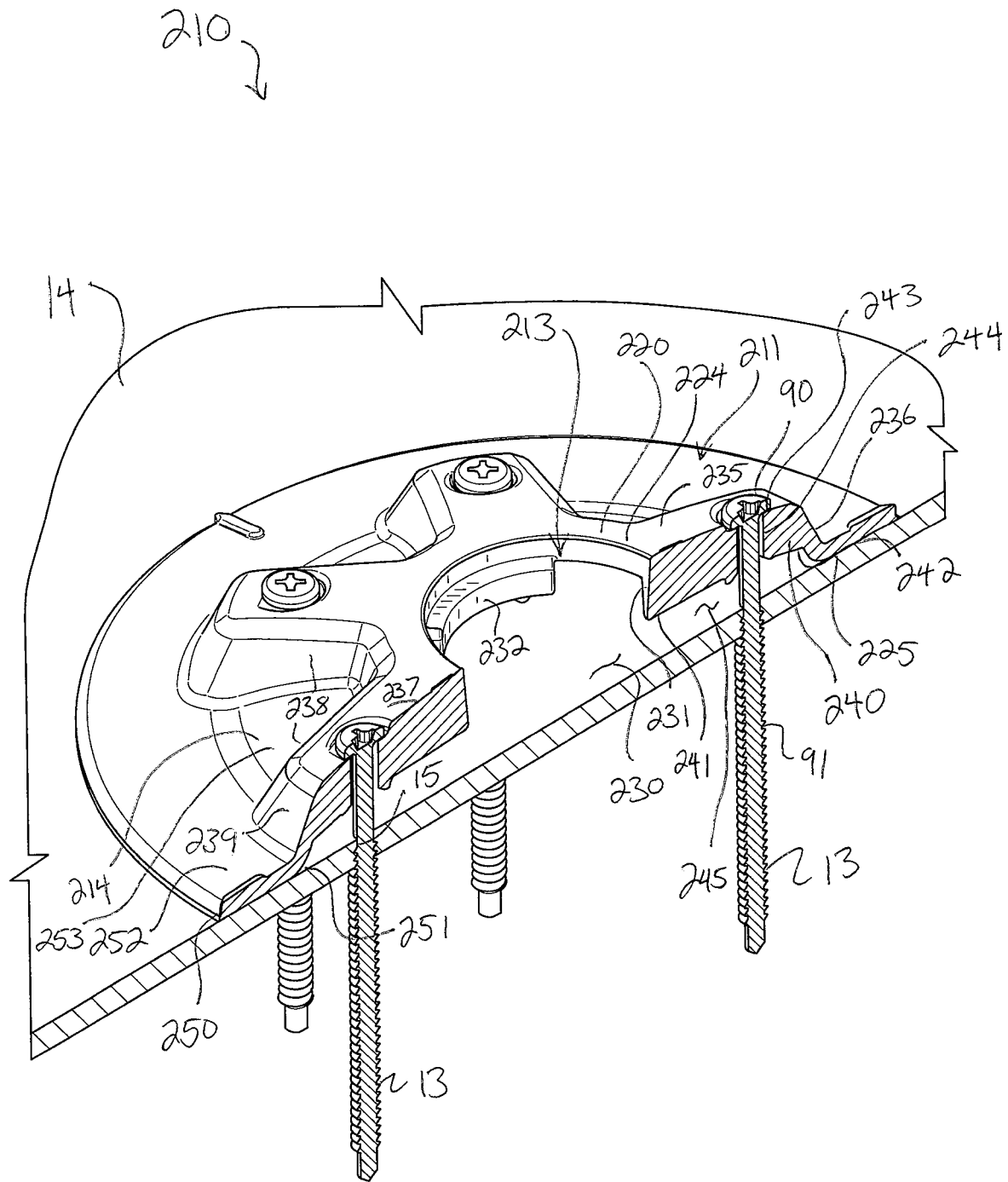
FIGS. 3C and 3D are section views taken along the line 3-3 in FIG. 3A, showing a sequence of steps applying the device to a roof.

The leg 234 has an underside, seen best in FIG. 3B. As an integrally-molded piece of the sheet 214, the leg 234 is generally hollow at its underside, between the sides 238. Partially filling that hollow, however, is a rib 240 which extends from the outer end 236 to the inner end 235 of the leg 234. The rib 240 has an inner end 241 terminating at the inner edge 231 and an opposed outer end 242 terminating on the underside or inner surface of the leg 234 at its outer end 236. The rib 240 is narrow and tall, depending from the underside of the leg 234. The rib 240 structurally supports the leg 234 and resists flexion and deflection of the leg 234.

Formed in the leg 234, approximately one-third of the distance from the outer end 236 to the inner end 235 of the leg 234, is a seat 243. The seat 243 has a flat top which is exposed on top of the base 211 and is parallel to the open bottom 225 of the base 211. Below the top 237 of the leg 234, the seat 243 includes a rugged, cylindrical protrusion in the rib 240. This protrusion extends outward from the rib 240 and is formed around a bore 244. The bore 244 extends entirely vertically through this protrusion to the seat 243, such that is a through-bore. The bore 244 is preferably a cylindrical, unthreaded hole formed transversely through the seat 243 and perpendicular to the bottom 225 of the base 211. The bore 244 closely receives a fastener 13.

The leg 234 and the rib 240 depend from the top 224 of the base 211 and do not extend entirely to the bottom 225. Instead, they terminate just above, so as to define a bifurcated cavity 245 below the leg 234. The cavity 245 is bifurcated but not severed by the rib 240; the cavity 245 is large and occupies nearly the entire volume under the leg 234, but the rib 240 extending through the middle of the leg 234 bifurcates the cavity 245 into left and rights sides, though those sides are not entirely separated and do nonetheless remain in fluid communication with each other. The cavity 245 forms part of the reservoir 230, and indeed, the cavities 245 of all legs 234 are coupled in fluid communication.

The internal reservoir 230 occupies the volume under the dome 233, including the keyway 213 and the volume under the keyway 213. The reservoir 230 terminates radially at the perimeter structure 221. Referring to FIG. 3A-3C, the perimeter structure 221 is wide, round, and has a low profile. The perimeter structure 221 has a circular outer edge 250 and a star-shaped inner edge 251. The outer edge 250 is a low edge, while the inner edge 251 is an upstanding edge which transitions into the sidewalls 239 of the legs 234 of the dome 233. The perimeter structure 221 includes a flat annulus 252 or ring extending inwardly from the outer edge 250 and along a plane at the bottom of the base 211. The annulus 252 terminates just inboard of the outer ends 236 of the legs 234; the dome 233 overlaps the annulus 252 slightly. The annulus 252 is integrally formed to the dome 233, and between the legs 234, the annulus 252 is integrally formed to wedge-shaped dome portions 253. These dome portions 253 curve slightly upwardly toward the top 224 but stop well short thereof. Each dome portion 253 terminates at the union of two adjacent legs 234, just outside the central hub 220.

The key 212 is applicable to the base 211. Referring now primarily to FIGS. 3A and 3B, the key 212 is a generally round, cylindrical plug. It has a top 260 and an opposed bottom 261. The top 260 of the key 212 is flat and includes an outer annulus 262, an inner, inset nut 263, and a depressed annular channel 264 therebetween. The annulus 262 is a wide, flat, annular structure at the outer edge of the key 212. It terminates radially inwardly at the channel 264, which extends downward into the key 212. The nut 263 then rises back up, such that its top is coplanar with the flat top of the annulus 262. The annulus 262 and the nut 263 are both formed integrally and monolithically to the key 212, which is preferably a single, solid piece of material.

The annulus 252 terminates radially outward at a lip 265, which is formed with an inwardly-directed channel 266 suitable for holding an o-ring, gasket, or the like. Below the lip 265, a coaxial core 267 extends downwardly to the bottom 261 of the key 212. The core 267 is conical, having a taper such that its top is wider than its bottom. Flanking the core 267 are two opposed flanges 268, circumferentially spaced-apart by two circumferential voids 269. Each flange 268 includes an outwardly-projecting lug 270 and an inwardly-directed channel 271 just above the lug 270, which channel 271 is just below the lip 265 of the key 212.

Figure 3D:
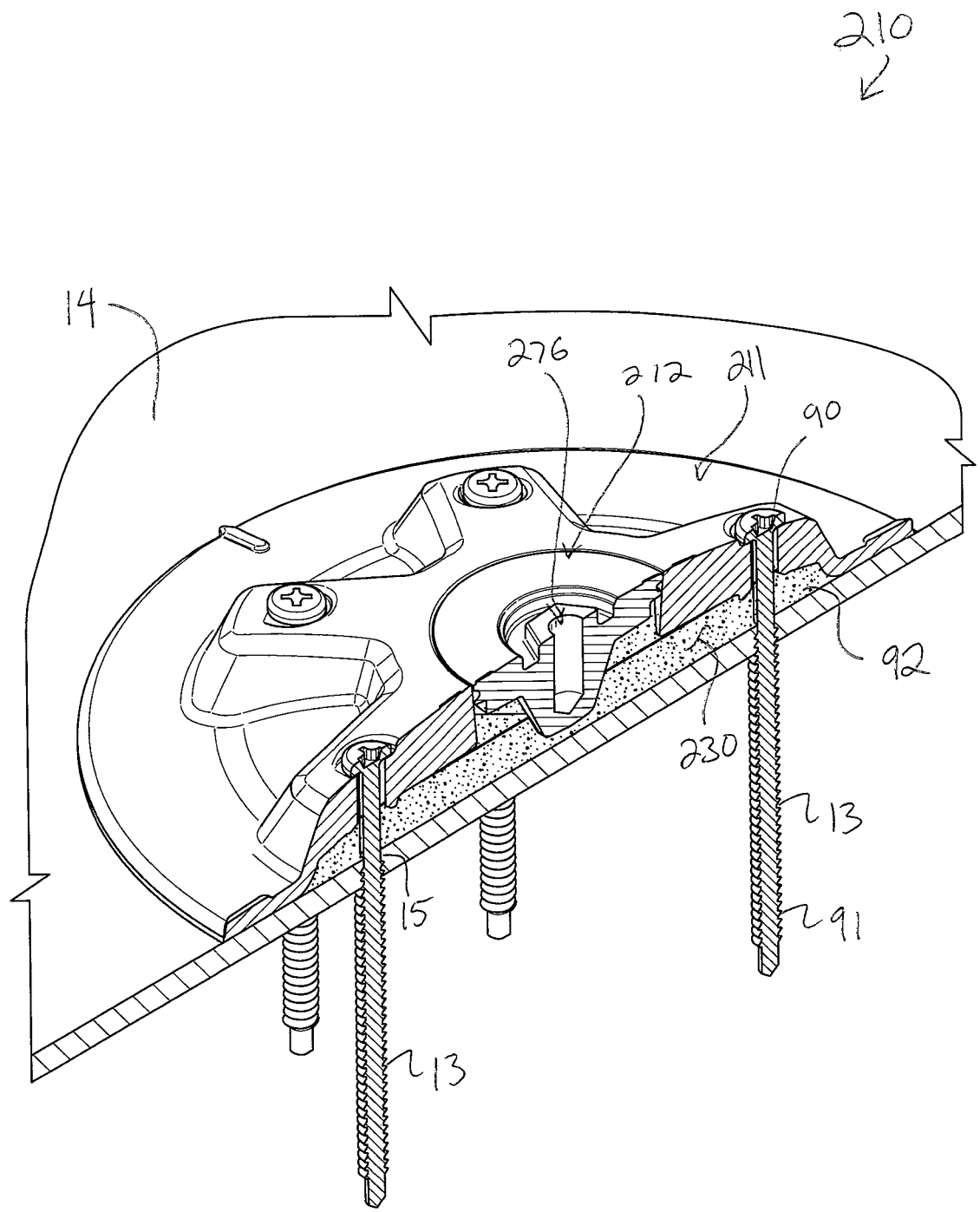

In operation, the key 212 is applied to the base 211 to close the open top 224 of the base 211, enclose the reservoir 230, and cooperate with the perimeter structure 221 to form an environmental seal around the roof penetration. Turning now to FIGS. 3C and 3D, in operation, the device 210 is useful for providing a mount for a rack on a roof 14 and for sealing a roof penetration 15 which is made through the roof 14 and which is necessary to securely attach the device 210 to the roof 14. Roof penetrations 15 are formed, such as with a drill, through the roof 14 and potentially other roof structures (shingles, underlayment, wood decking, moisture barriers, rafters, and other structures are collectively simplified here as the roof 14). If there are several roof penetrations 15, a pattern is used to ensure each is located properly with respect to the other. Once the roof penetrations 15 are formed, the base 211 is placed atop the roof 14, as in FIG. 3C. The base 211 is aligned so that each bore 244 in a leg 234 is registered with a respective roof penetration 15. The fasteners 13 are then applied to the bores 244. In other embodiments, the fasteners 13 are self-tapping or self-drilling fasteners, and it is not necessary to drill holes; rather, the base 211 is placed over a desired location on the roof 14 and then the fasteners 13 are applied into the roof 14. Each fastener 13 has a head 90 and a long shank 91. Each fastener 13 is threadably engaged with the roof 14 until the head 90 is seated in the seat 243 and the shank 91 passes below the seat 243 into the roof penetration 15. The head 90 is seated in flush and direct contact with the seat 243, and an unthreaded portion of the shank 91 just below the head 90 fills the bore 244 snugly. When all fasteners 13 are engaged in this manner, the base 211 is securely fixed to the roof 14.

In some embodiments, an o-ring, foam ring, adhesive sealant, or other form of gasket of sealing member is applied to a channel 272 on the underside of the base 211 before the base 211 is secured according to the above. This gasket creates a first seal between the base 211 and the roof 14, just inboard from the outer edge 250. This first seal is effective at preventing water, moisture, and other environmental ingress at the annulus 252. Use of a gasket is optional, however, and not necessary to ensure an environmental seal between the base 211 and the roof 14.

Turning now to FIG. 3D, once the base 211 is securely fixed to the roof 14, a flowable sealant 92 is applied to the reservoir 230. The sealant 92 is slowly applied to the reservoir 230 until the sealant 92 nearly reaches the top 224 of the base 211. By slowly filling the sealant 92, the sealant 92 can flow across the portion of the roof 14 covered by the base 211, surrounding the roof penetrations 15. The cavities 245 defined below the ribs 122 are in fluid communication with, and indeed, form part of, the reservoir 230, and so sealant 92 moves into the cavities 245 and surrounds the fasteners 13 in the roof penetrations 15. The sealant 92 entirely fills the bottom of the reservoir 230. This forms an environmental seal between the base 211 and the roof 14 which prevents environmental ingress through the roof 14.

By filling the sealant 92 to just below the top 224, the shanks 91 of the fasteners 13 inside the reservoir 230 are covered, the roof penetrations 15 are covered, and the bores 244 are covered from below. This increases the surety of the environmental seal. Further, by filling the reservoir with sealant 92 until nearly the top 224 of the base 211, the installer performing the work receives visual confirmation.

Once sealant 92 is applied to the base 211 in the manner above, the key 212 is applied to the base 211. The key 212 is taken up, such as by hand, and registered with the keyway 213 in the hub 220, with the bottom 261 directed toward the keyway 213. The installer ensures that the circumferential voids 269 on the key 212 are registered with the flanges 232 on the inner edge 231 of the hub 220, so that the key 212 can be directly inserted into the keyway 213. The key 212 is then moved downward into the keyway 213. The conical core 267 pushes sealant away from the advancing key 212. Some sealant 92 may spill out of the keyway 213 and out onto the top 237; that sealant 92 will need to be cleaned up before installation is complete. The key 212 is pushed into the keyway 213 until the tops of the inward flanges 232 are against the underside of the lip 265 of the key 212. This prevents further downward movement of the key 212 into the keyway 213, and also arranges the top 260 of the key 212 flush with the top 224 of the base 211. The key 212 now needs to be rotated to lock the key 212 in the base 211.

The nut 263 formed in the key 212 is suitable to be grasped a turned with a wrench. In the embodiments shown in FIGS. 3A-3D, the nut 263 is a hex nut, but it has other shapes in other embodiments. The channel 264 surrounding the nut 263 allows the nut 263 to be gripped by a wrench, socket driver, or similar tool. The installer takes up such a tool, fits it to the nut 263, and rotates the tool and nut 263 by ninety degrees. Doing so causes the lugs 270 on the key 212 to slip under the flanges 232 on the hub 220 and the channels 271 on the key 212 to snugly receive the flanges 232. This engagement prevents inadvertent removal of the key 212 from the base 211. As the sealant 92 cures, the adhesive engagement between the sealant 92 and the key 212 will also operate to prevent inadvertent removal of the key 212. The above defines an installed condition of the device 210, which is sufficient to form an environmental seal over the roof penetrations 15.

The key 212 has a threaded bore 276 formed in the geometric center of the top 260 of the key 212. The bore 276 extends into the solid body of the key 212, normal to the flat top 260, and terminates above the bottom 261, such that the bore 276 is blind. When the key 212 is secured in the keyway 213 as described above, bore 276 is centered coaxially with respect to the perimeter structure 221. A rugged bolt, similar to the bolt 88 used with the device 10, can then be threadably applied to the bore 276 to provide a mount for a rack.

Figure 4A:
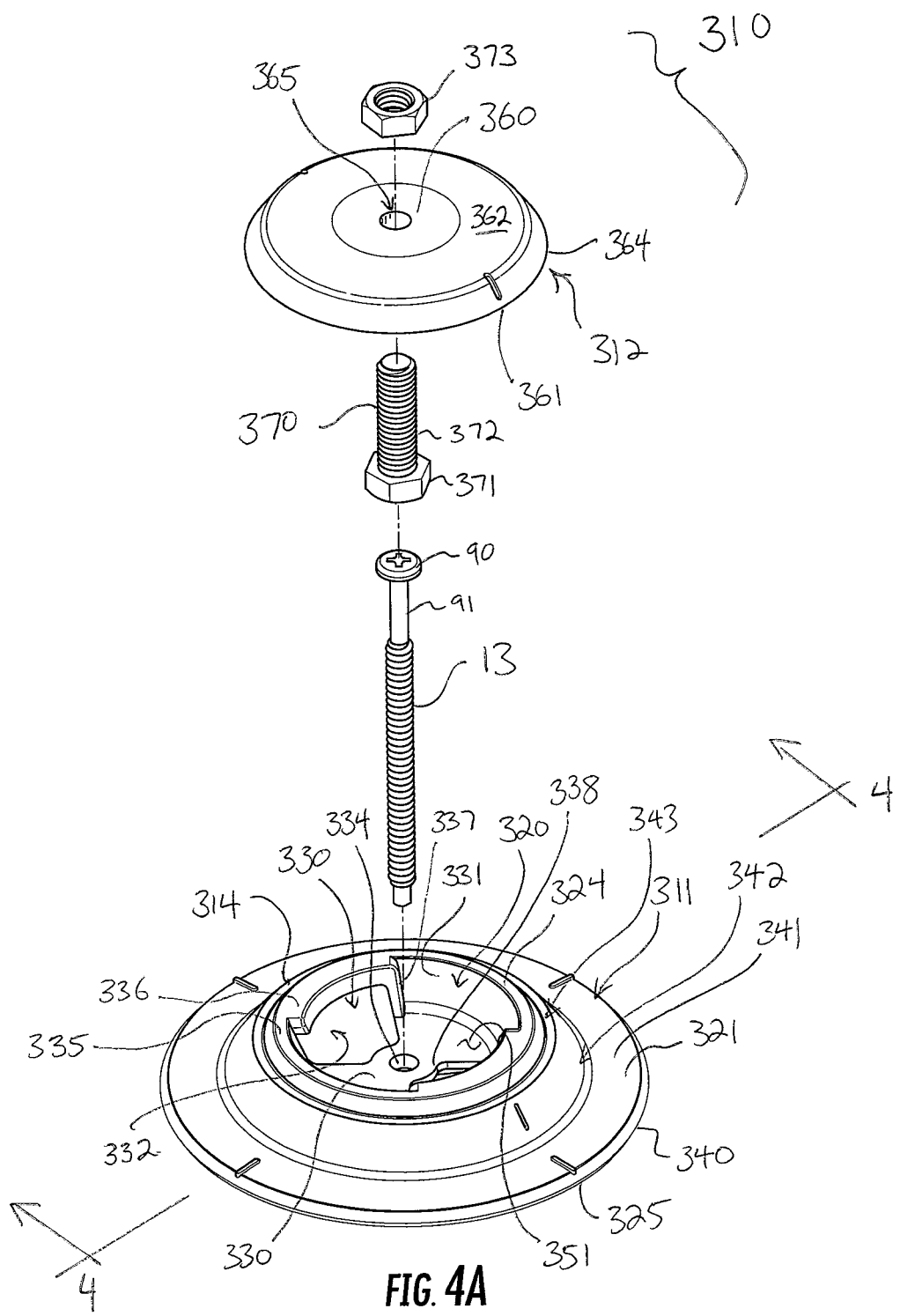
FIGS. 4A and 4B are top and bottom exploded perspective views of a flat roof mounting device.
Figure 4B:
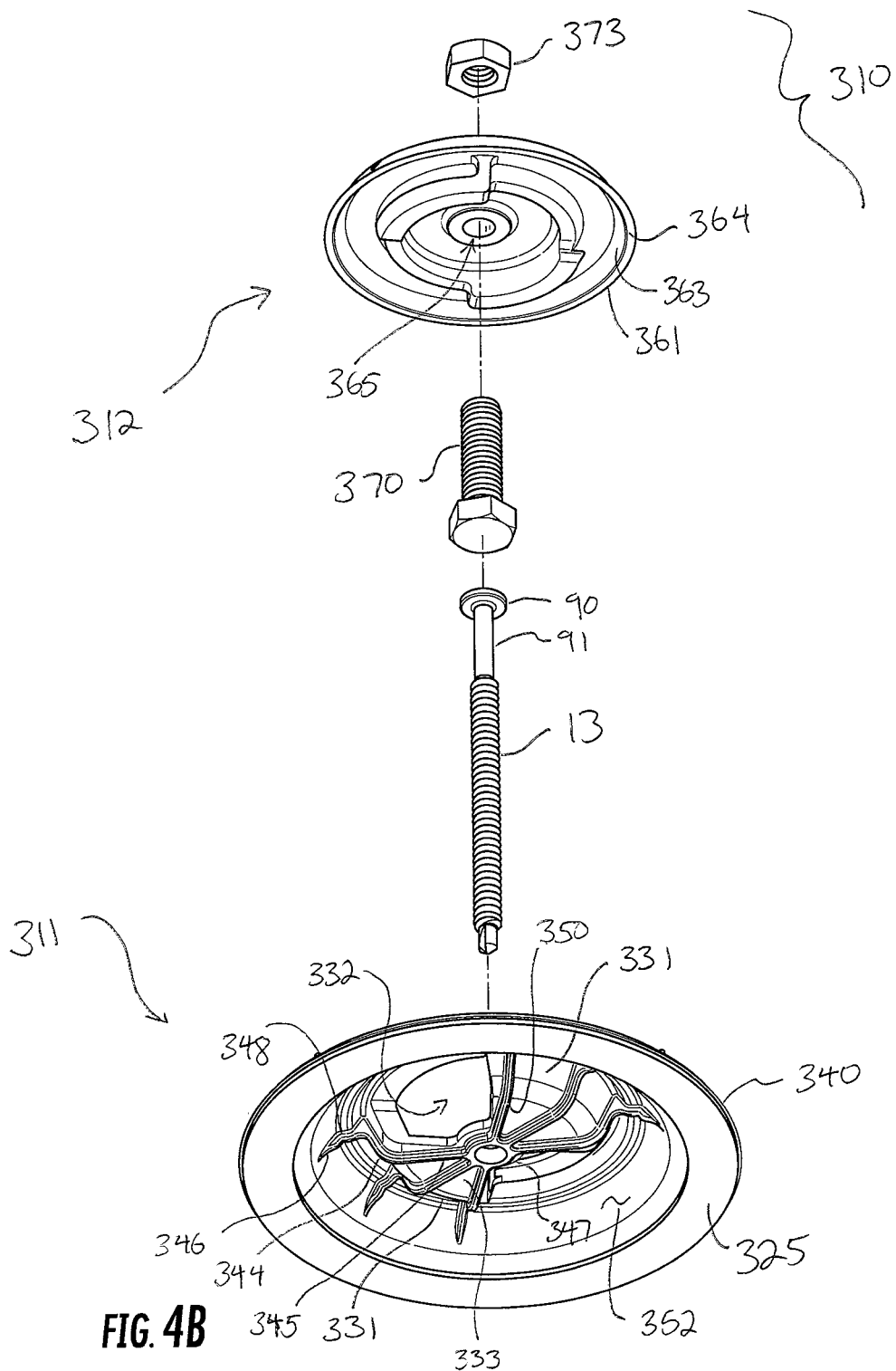
Figure 4C:
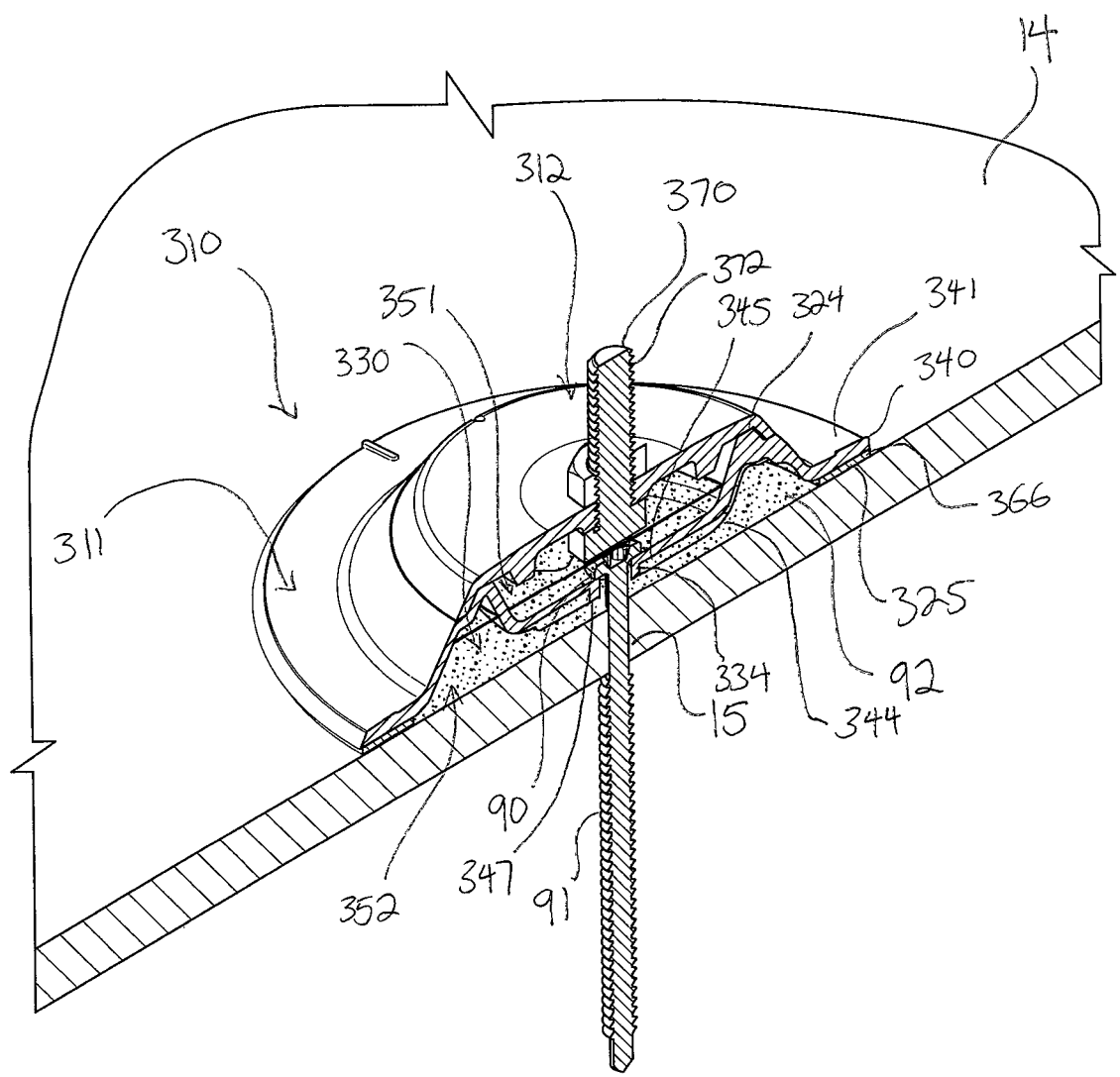
FIG. 4C is a section view taken along the line 4-4 in FIG. 4A, showing the device being applied to a roof.

Embodiment of FIGS. 4A-4C

FIG. 4A illustrates a flat roof mounting device 310 (hereinafter "the device 310") for covering a roof penetration with a mount, the device 310 including a base 311 and a cap 312 moveable onto the base 311 for forming an environmental seal around the roof penetration. The device 310 is a mount for a rack.

The base 311 is wide, round, and has a low profile. The base 311 includes a central depressed socket 320 and an outer perimeter structure 321 encircling the socket 320. The socket 320 and perimeter structure 321 are connected, or coupled, to each other by a monolithic, integral, one-piece sheet 314 of material molded into the form of the base 311, which sheet 314 includes the socket 320, the perimeter structure 321, and the various structures therebetween. The sheet 314 is preferably constructed from a single piece of material having strong, rugged, durable, and rigid material characteristics. When the low base 311 is applied over the roof penetration and a fastener 13 is passed through the base 311 and into the roof, the base 311 is securely mounted to the roof at the roof penetration. With the base 311 securely mounted to the roof, the base 311 is a stable, secure, and strong mount for the rack.

The base 311 has a top 324 and a bottom 325. Both the top 324 and bottom 325 are open, that is to say, openings into the base 311 are formed at both the top 324 and bottom 325. A continuous internal reservoir 330 is defined between the top 324 and bottom 325. The reservoir 330 is an inner space or hold, which, when the base 311 is applied to the roof, cooperates with the roof structure to receive, hold, and contain a flowable sealant; the cap 312 is then applied over the open top 324 to enclose the reservoir 330 and cooperate with the base 311 to seal the roof penetration.

The central socket 320 depends from the open top 324. The socket 320 is a truncated, generally conical structure depending into the reservoir 330, such that the socket 320 is wider near the top 324 than at its bottom. The socket 320 includes two opposed arcuate sidewalls 331 circumferentially spaced apart by two openings 332. The sidewalls 331 are angled to define the conical shape of the socket 320. They extend downwardly and inwardly toward each other in a converging fashion, terminating at a flat bottom 333 of the socket 320. The bottom 333 extends from one sidewall 331 to the other and is formed at its center with a bore 334 suitable for receiving the fastener 13. The bore 334 is preferably cylindrical and unthreaded, and it extends transversely through the bottom 333. The bottom 333 does encircle the bore 334 with a circular structure, defining a seat 338 in which the bore 334 is formed.

The socket 320 includes engagement structure for engaging with and holding the cap 312. The engagement structure overhangs the openings 332. At the top 324, the base 311 has a flat rim 335, characterized as a thin annulus surrounding the socket 320. The rim 335 has a larger width, extending radially inward slightly to form an overhanging lip 336 above each opening 332. This lip 336 terminates, in a clockwise-direction (when the base 311 is viewed from above), with a leading edge 337 that extends downward to the bottom 333. The leading edge 337 is formed on and parallels the sidewall 331, and extends radially inward therefrom. Thus, the engagement structure overhanging each opening 332 is the lip 336, which defines a catch for corresponding structure on the cap 312, and the edge 337, which defines a stop for corresponding structure on the cap 312.

Like the base 311, the perimeter structure 321 is wide, round, and has a low profile. The perimeter structure 321 has an outer edge 340, and opposed to the outer edge 340 is the rim 335, both of which are circular in the embodiment shown in FIGS. 4A-4C. The outer edge 340 is a low, flat edge. The perimeter structure 321 includes a flat annulus 341 or ring extending inwardly from the outer edge 340 and along a plane at the bottom of the base 311. The annulus 341 terminates at an upstanding ridge 342; the ridge 342 rises obliquely from the annulus 341 to the rim 335 at the top 324 of the base 311. The ridge 342 has several differently-angled pitches, and proximate the top 324, the ridge 342 is formed with an inset seat 343. The seat 343 is an annular depression extending into the ridge 342; the seat 343 is sized and shaped to snugly receive the cap 312 when applied to the base 311. The seat 343 terminates radially inwardly at the top 324 and at the rim 335.

Attention is now directed primarily to FIG. 4B, where the underside of the base 311 is illustrated well. The underside of the annulus 341 is flat. The underside of the upstanding ridge 342 rises upward from the annulus 341 toward the top 324 of the base 311 until it meets the rim 335, at which point the underside of the socket 320 drops down to the bottom 333. The bottom 333 of the socket 320 is disposed above the bottom 325 of the base 311.

The underside of the socket 320 is formed integrally with a plurality of ribs 344, each extending from an inner end 345 to an outer end 346. There are preferably six ribs 344, as shown in these drawings, but other embodiments of the device 310 have a fewer or greater number of ribs 344 depending on the needs of the application. The ribs 344 are identical in every respect, and so discussion of the various structural elements and features of the ribs 344 will be made without reference to one rib 344 in particular, and the reader shoulder understand that the discussion applies to all of the ribs 344 equally.

The inner end 345 of the rib 344 terminates at a ring 347 formed on the underside of the bottom 333, surrounding the bore 334. The ring 347 is a low wall, projecting downward from the bottom 333 and continuously encircling the bore 334 such that it lengthens the depth of the bore 334 and thus also reinforces the bore 334. The inner end 345 of the rib 344 is formed integrally and monolithically to the ring 347. The rib 343 is formed on and parallels the bottom 333 and the sidewall 331 and extends downward therefrom. Thus, the rib 344 is a single form, connected integrally and monolithically to the sheet 314, the socket 320, and the perimeter structure 321.

The rib 344 has an arm 348 projecting radially outward from the inner end 345 toward the outer end 346. The arm has a bottom 350 and opposed sides; the sides are flat and parallel between the underside of the socket 320 and the bottom 350. The bottom 350 is smooth and undulates with the curvature of the base 311. The arm 348 extends approximately two-thirds of the distance between the bore 334 at the center of the base 311 and the outer edge 340 of the perimeter structure 321. The arm 348 terminates outwardly at its outer end 346 on the underside of the upstanding ridge 342.

The bottom 333 of the socket 320, and the bottom 350 of each rib 344, is disposed between the open top 324 and the open bottom 325 of the base 311. Moreover, the bottom 333 of the socket 320, and the bottom 350 of each rib 344, is disposed below the open top 324 and also above the open bottom 325 of the base 311, such that they are vertically spaced apart from the top 324 and bottom 325. The sidewalls 331 and bottom 333 of the socket 320 therefore define an upper cavity 351 above the socket 320, and the socket 320, rim 335, and ridge 342 define a lower cavity 352 opposed from the upper cavity 351. The upper cavity 351 extends upward from the socket 320 to the open top 324; the lower cavity 352 extends downward to the open bottom 325. The upper and lower cavities 351 and 352 are formed in communication with each other through the openings 332 in the socket 320 and through the bore 334, and they cooperate to define the internal reservoir 330 of the base 311. Moreover, because the bottom 333 and bottoms 350 of the ribs 344 are above the bottom 325 of the base 311, when the base 311 is mounted on a roof, sealant applied to the base 311 flows vertically, radially, and circumferentially in the upper and lower cavities 351 and 352 without interruption or blockage. In this way, the socket 320 does not sever the reservoir 330, because the socket 320 does not separate the reservoir 330 into separate portions or parts among which the sealant cannot flow. Rather, the sealant can flow through the entire reservoir 330 despite the socket 320, because the socket 320 does not sever the reservoir 330. Referring now to FIGS. 4A and 4B, the cap 312 is wide, round, and has a very low-profile dome shape. The cap 312 has a top 360 and an opposed bottom 361, and it opposed upper and lower surfaces 362 and 363. The cap 312 is thin between the upper and lower surfaces 362 and 363, defining a shell. The upper surface 362 is convex, and the lower surface 363 is concave, because the cap 312 curves downward from the flat top 360 to an annular, downwardly-projecting lip 364 at the bottom 361. The lip 364 also defines the outer edge of the cap 312 at its outer dimension.

At the top 360 of the cap 312 is a hole 365. The hole 365 is formed entirely through the cap 312 from the upper surface 362 to the lower surface 363. The underside of the cap 312 is reinforced, and has a greater thickness around the hole 365 than do other parts of the cap 312. The hole 365 is located centrally on the top 360 of the cap 312.

Turning now to FIG. 4C, in operation, the device 310 is useful for providing a mount for a rack on a roof 14 and for sealing a roof penetration 15 which is made through the roof 14 and which is necessary to securely attach the device 310 to the roof 14. The roof penetration 15 is formed, such as with a drill, through the roof 14 and potentially other roof structures (shingles, underlayment, wood decking, moisture barriers, rafters, and other structures are collectively simplified here as the roof 14). Once the roof penetration 15 is formed, the base 311 is placed atop the roof. The base 311 is aligned so that its bore 334 is registered with the roof penetration 15. Preferably, an o-ring, foam ring, adhesive sealant, or other form of gasket or sealing member 366 is compressed between the base 11 and the roof 14; the sealing member 366 is placed just under the annulus 341. This sealing member 366 creates a first seal between the base 311 and the roof 14, just inboard from the outer edge 340. This first seal is effective at preventing water, moisture, and other environmental ingress at the annulus 341. Use of a sealing member 366 is optional, however, and not necessary to ensure an environmental seal between the base 311 and the roof 14.

The fastener 13 is applied to the bore 334. In other embodiments, the fastener 13 is a self-tapping or self-drilling fastener, and it is not necessary to drill a hole through the roof 14; rather, the base 311 is placed over a desired location on the roof 14 and then the fastener 13 is applied through the base 311 and into the roof 14. The fastener 13 is threadably engaged with the roof 14 until the head 90 is seated in the seat 338 surrounding the bore 334 and the shank 91 passes below the seat 338 into the roof penetration 15. The head 90 is seated in flush and direct contact with the top of the seat 338, and an unthreaded portion of the shank 91 just below the head 90 fills the bore 334 snugly. When the fastener 13 is engaged in this manner, the base 311 is securely fixed to the roof 14.

Once the base 311 is securely fixed to the roof 14, a flowable sealant 92 is applied to the reservoir 330. With a tool such as a caulking gun, the sealant 92 is slowly applied through the open top 324 to the reservoir 330 until the sealant 92 nearly reaches the top 324 of the base 311. By slowly filling the sealant 92, the sealant 92 can flow across the portion of the roof 14 covered by the base 311, surrounding the roof penetration 15. Because the roof penetration 15 is under the bore 334, the roof penetrations 15 is under the bottom 333 of the socket 320 and under the ring 347 at the inner ends 345 of the ribs 344. However, the lower cavity 352 defined below the ribs 344 is in fluid communication with, and indeed, forms part of, the reservoir 330, and so sealant 92 moves into the lower cavity 352 and surrounds the fastener 13 and the roof penetration 15. The sealant 92 entirely fills the lower cavity 352 of the reservoir 330, flowing through under each of the ribs 344. Then, the sealant 92 fills from the lower cavity 352, through the openings 332 in the socket 320, and into the upper cavity 351. This forms an environmental seal between the base 311 and the roof 14 which prevents environmental ingress through the roof 14.

By filling the sealant 92 to just below the top 324, the head 90 of the fastener 13 is covered. Because the bore 334 and seat 338 are disposed below the top 324 of the base 311, the bore 334, the seat 338, and the head 90 and shank 91 of the fastener 13 received in them are covered. This increases the surety of the environmental seal. Further, by filling the reservoir with sealant 92 until the head 90 is covered, the installer performing the work receives visual confirmation: when the head 90 is no longer visible, the installer can be sure the reservoir 330 is adequately filled.

Next, the installer applies a rugged bolt 370 through the hole 365 in the cap 312. The bolt 370 is inverted, such that its head 371 is below the cap 312 and its shank 372 passes upward through it, exposing a portion of the shank 372 above the top 360 of the cap 312. A nut 373 is threaded tightly onto the shank 372 until the head 371 and the nut 373 are drawn snugly toward each other on either side of the cap 312.

The cap 312 is then registered with the base 311, so that the lip 364 is registered with the seat 343 at the top of the ridge 342 of the base 311, and the installer then moves the cap 312 downward onto the base 311 so that the lip 364 is snugly received in the seat 343. When so placed, the lower surface 363 at the top 360 of the cap 312 is above the socket 320, and a gap may be formed between the top of filled sealant 92 and the lower surface 363 of the cap 312. Otherwise, if the sealant 92 has been filled to the top 324 of the base 311, excess sealant 92 may spill out of the base 311 when the cap 312 is applied. This should be cleaned up by the installer.

In this manner, the lip 364 and the seat 343 form an environmental seal preventing moisture and other ingress into the device 310. The cap 312 also serves to deflect rain, snow, and other moisture onto the ridge 342 and annulus 341, where it will flow onto the roof 14. In these ways, when the cap 312 is moved onto the base 311, the cap 312 and the perimeter 21 of the base 311 cooperate to form an environmental seal over and around the roof penetrations 15. Further, the shank 370 of the bolt 370 is available for the installer to apply the rack.

Figure 5A:
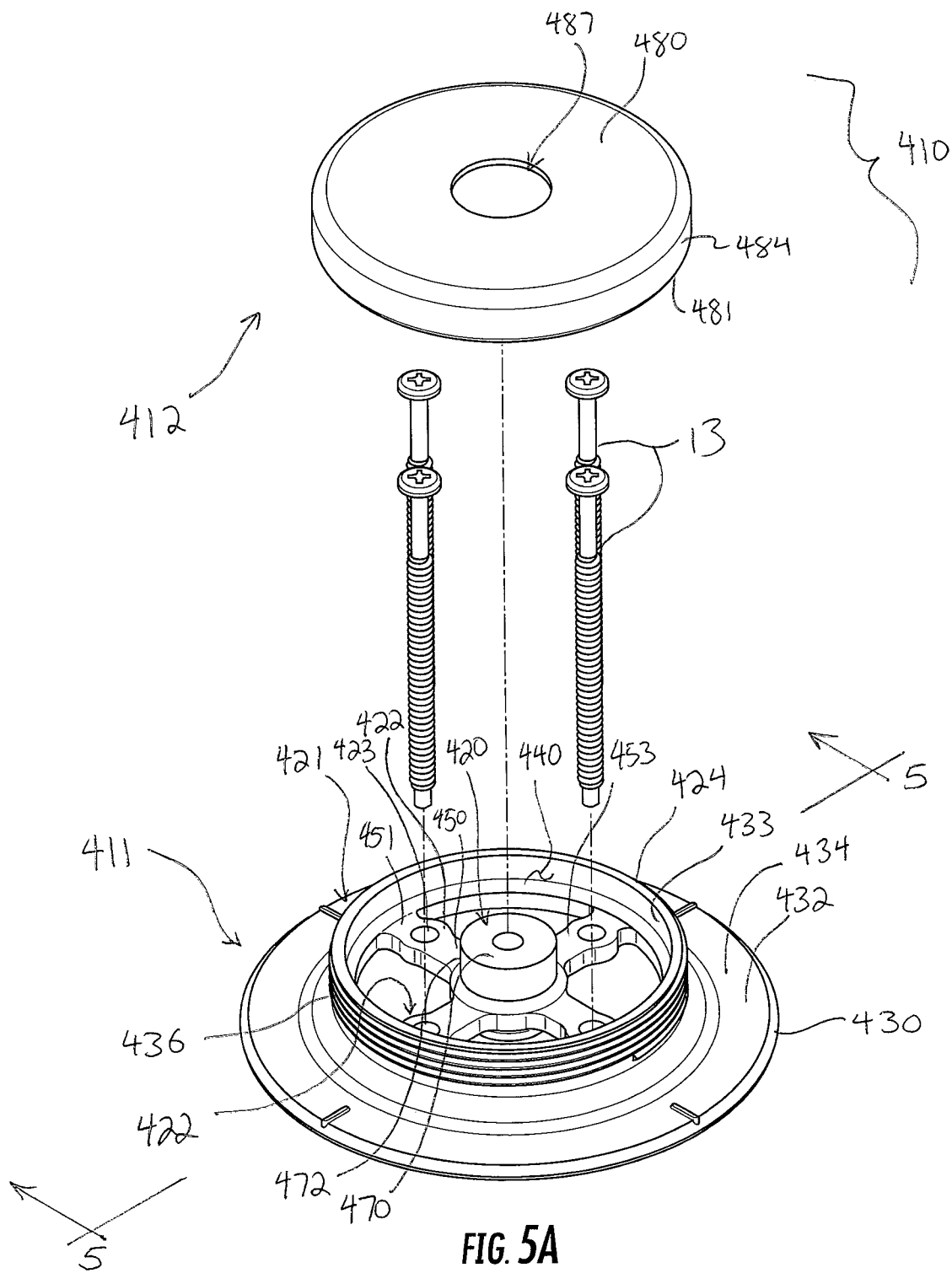
FIGS. 5A and 5B are top and bottom exploded perspective views of a flat roof mounting device.
Figure 5B:
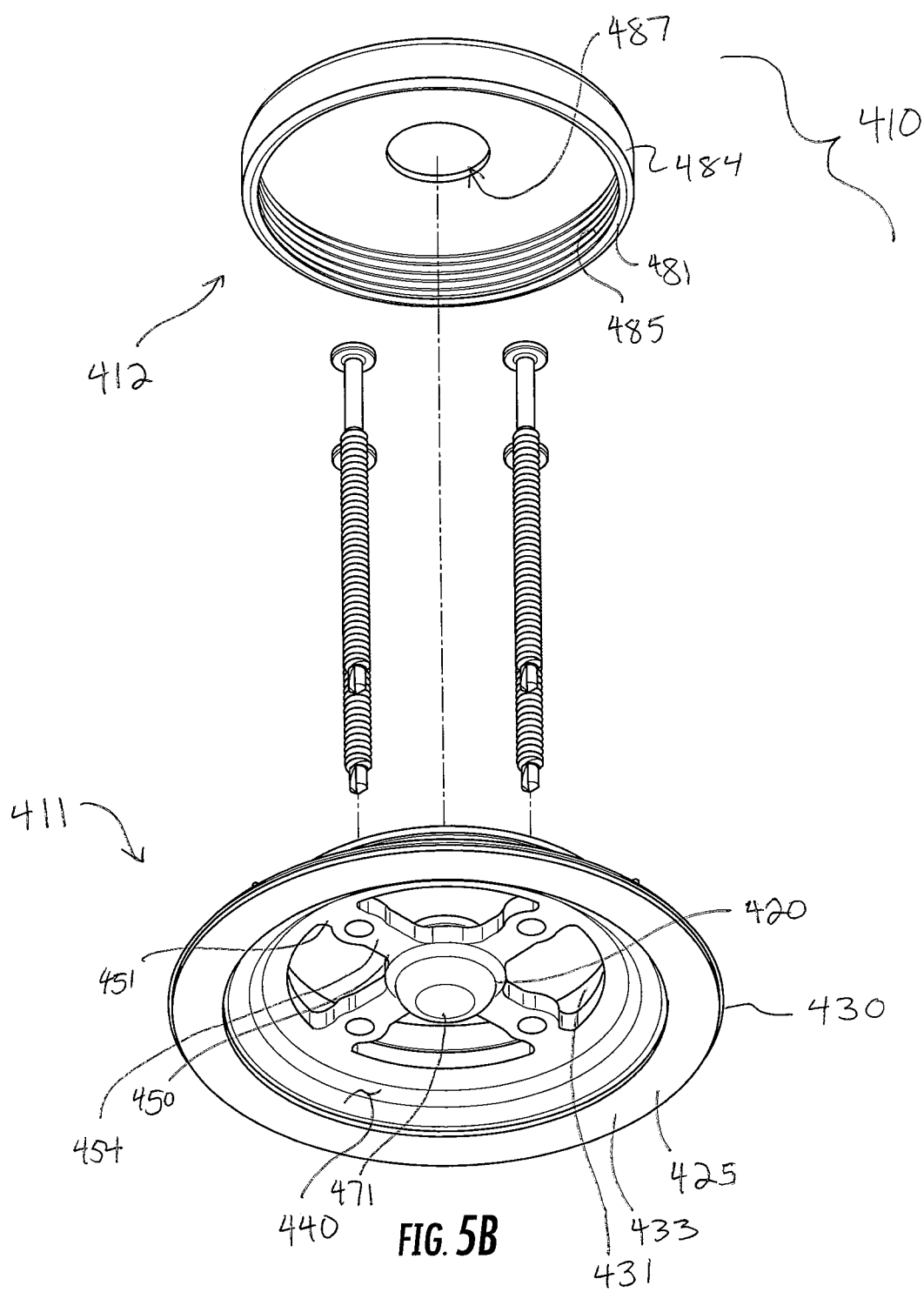
Figure 5C:
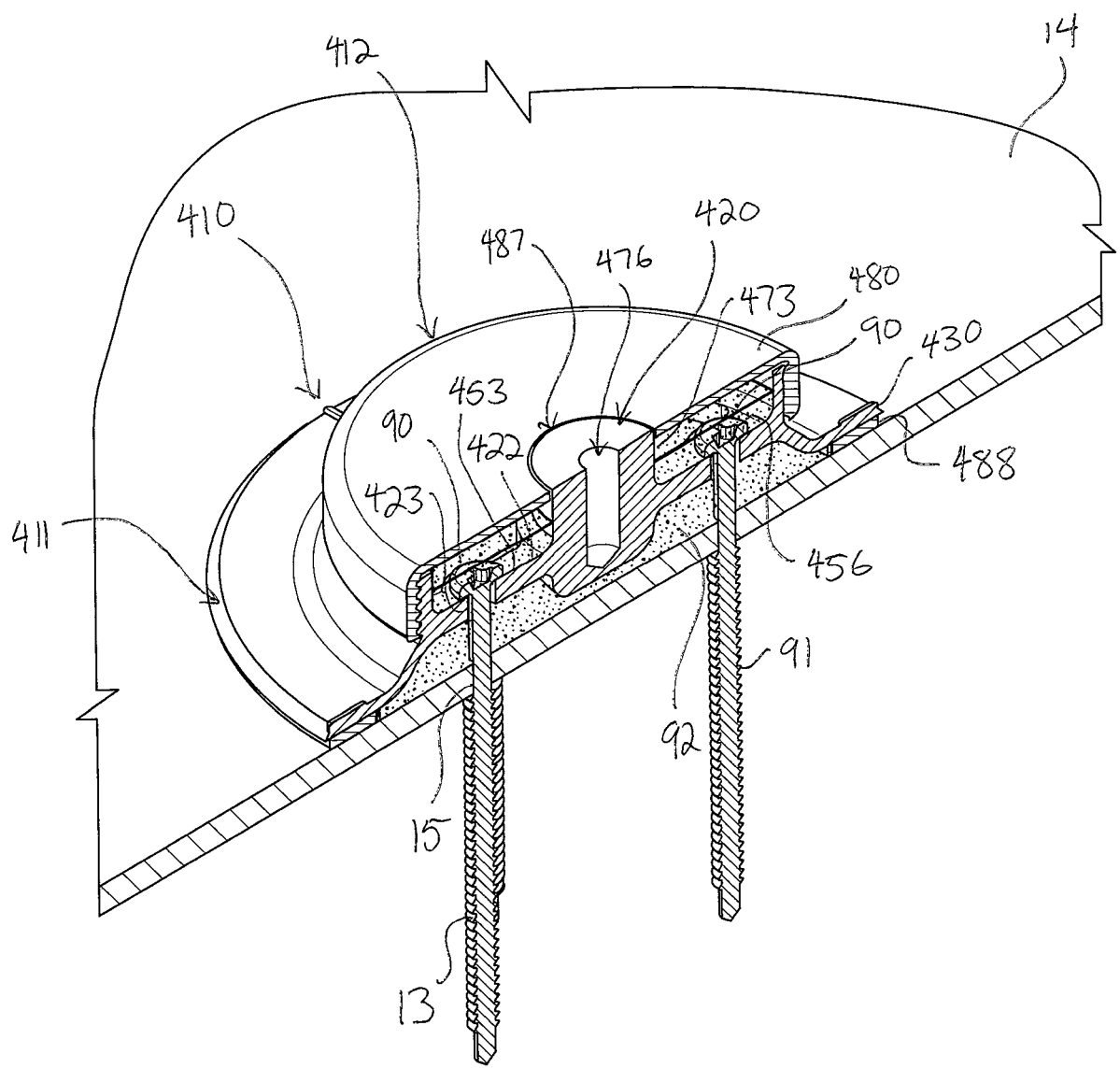
FIG. 5C is a section view taken along the line 5-5 in FIG. 5A, showing the device being applied to a roof.

Embodiment of FIGS. 5A-5C

FIGS. 5A-5C illustrates a flat roof mounting device 410 (hereinafter "the device 410") for covering a roof penetration 15 with a mount. The device 410 includes a base 411 and a cap 412 moveable onto the base 411 for forming an environmental seal around the roof penetration 15, so that a rack can be mounted on the device 410.

The base 411 is wide, round, and has a low profile. The base 411 includes a central hub 420 and an outer perimeter structure 421 coaxially encircling the central hub 420. The hub 420 and perimeter structure 421 are connected, or coupled, to each other by a plurality of ribs 422 extending radially outward from the hub 420 to the perimeter structure 421. Each rib 422 is formed with a bore 423 through which a fastener 13 is passed and secured into the roof 14, so as to securely fix the base 411 to the roof 14. The hub 420, perimeter structure 421, and ribs 422 are preferably formed integrally and monolithically, from a single piece of material having strong, rugged, durable, and rigid material characteristics. When the low base 411 is applied over the roof penetration and the fasteners 13 are passed through the bores 423 such that their heads are seated against the ribs 422, the base 411 is securely mounted to the roof 14 at the roof penetration 15. With the base 411 securely mounted to the roof, the base 411 is a stable, secure, and strong mount for the rack.

The base 411 has a top 424 and an opposed bottom 425; the bottom 425 is mounted on the roof and the top 424 is directed away from the roof Both the top 424 and bottom 425 are open, that is to say, openings into the base 411 are formed at both the top 424 and bottom 425. It is noted briefly here that, while the description of this embodiment refers to "a roof penetration," the embodiment of FIGS. 5A-5C actually has several roof penetrations—one for each of four fasteners 13. However, in some cases, only a single penetration may be made or used (and so only a single fastener 13 may be used), while in other cases only two or three penetrations through the roof may be made or used. The phrase "roof penetration" is therefore meant to include single and multiple penetrations through a roof 14 in a local area, such as under the footprint of one device 410.

Referring now primarily to FIGS. 5A and 5B, like the base 411, the perimeter structure 421 is wide, round, and has a low profile. The perimeter structure 421 has an outer edge 430 and an opposed inner edge 431, both of which are circular in the embodiment shown in FIGS. 5A-5C. The outer edge 430 is a low edge, while the inner edge 431 is an upstanding flat edge. The perimeter structure 421 also has an outer or upper face 432 and an opposed inner or lower face 433. The upper and lower faces 432 and 433 meet at the outer and inner edges 430 and 431. The perimeter structure 421 includes a flat annulus 434 or ring extending inwardly from the outer edge 430 and along a plane at the bottom 425 of the base 411. The annulus 434 terminates at an upstanding wall 435; the wall 435 rises vertically from the annulus 434 toward the top 424 of the base 411, and the inner face of the wall 435 is the inner edge 431. The inner edge 431 extends vertically downward from the top 424 toward, but not entirely to, the bottom 425 of the base 411, generally perpendicular to the plane at the bottom 425. The inner edge 431 extends from the top 424 of the base 411 toward the bottom 425 of the base 411, but it stops above the bottom 425. The inner edge 431 projects downwardly from the top 424 approximately two-thirds of the distance between the top 424 and the bottom 425. The upper face 432, along the wall 435, is formed with outwardly-directed threads for engaging with the cap 412.

Referring primarily to FIG. 5B, where the underside of the base 411 is illustrated well, the base 411 is partially hollow. At the annulus 434, proximate the outer edge 430, the lower face 433 of the base 411 is flat. At the inner edge of the annulus 434, the lower face 433 turns upwardly with two sets of annular shoulders, each of decreasing inner diameter, until the lower face 433 meets the inner edge 431. The inner edge 431 rises upwardly to the top 424, bounding and defining an internal reservoir 440 of the base 411 in cooperation with the lower face 433. The reservoir 440 is an inner space or hold, which, when the device 410 is applied to a roof structure, cooperates with the roof structure to receive, hold, and contain a flowable sealant applied to the reservoir 440. The reservoir 440 is open to both the top 424 and the bottom 425 of the base 411, and it extends between the hub 420 and the perimeter structure 421 and is unsevered by the ribs 422. In operation, as discussed below, the reservoir 440 is filled with the flowable sealant to ensure an environmental seal against the roof 14 and around the roof penetration 15.

The perimeter structure 421 is formed integrally and monolithically to each of the ribs 422. With continuing reference to FIGS. 5A and 5B, four ribs 422 are visible. The device 410 preferably has four ribs 422, as shown in these drawings, but may suitably have a fewer or greater number of ribs 422 depending on the needs of the application. Moreover, the ribs 422 are identical in every respect, and so discussion of the various structural elements and features of the ribs 422 will be made without reference to one rib 422 in particular, and the reader should understand that the discussion applies to all the ribs 422 equally.

The rib 422 has an inner end 450 proximate the hub 420 and an outer end 451 proximate the perimeter structure 421. The rib 422 has an arm 452 projecting outward from the inner end 450 toward the outer end 451. The arm 452 is wide, straight, flat, extending laterally from the inner end 450 toward the outer end 451 without rising or dropping. It has a top 453, a bottom 454, and opposed sides. The bottom 454 is flat, parallel to the plane at the bottom 425 of the base 411, but elevated above it. The arm 452 extends about two-thirds of the distance between the inner end 450 and the outer end 451. The arm 452 terminates at its outer end at a seat 456.

The seat 456 is a flat extension of the arm 452. It therefore shares the top 453 and bottom 454 of the arm 452. The seat 546 also opposed sides which bulge outwardly from the sides of the arm 452 to encircle the seat 456. Formed centrally and entirely through the seat 456 from the top 453 to the bottom 454 is the bore 423. The bore 423 is preferably a cylindrical, unthreaded hole formed transversely through the seat 456. The seat 456 terminates at its outer end at the outer end 451 of the rib 422, which is formed continuously to the inner edge 431 of the perimeter structure 421. Thus, the rib 422, extending from the inner end 450, to the arm 452, to the seat 456, and finally to the outer end 451, is a single form, connected integrally and monolithically to both the hub 420 and the perimeter structure 421.

The top 453 of the rib 422 is below both the top 424 of the base 411 and the top of the hub 420. The seat 456 is thus also below the top 424 and below the top of the hub 420. Since the rib 422 is flat, the entirety of the rib 422 is below the open top 424 of the base 411. With the rib 422 disposed apart from the open top 424, an upper cavity 463 is defined above the rib 422. The bottom 454 of the arm 452 is contiguous with and coplanar to the bottom of the seat 456, such that the arm 452 has a single, straight, planar bottom extending entirely from the inner end 450 to the outer end 451. This bottom 454 is elevated above the bottom 425 of the base 411. With the rib 422 disposed apart from the bottom 425 of the base 411, a lower cavity 464 is defined below the rib 422 and above the plane including the bottom 25 of the base 11. The upper and lower cavities 463 and 464 extend entirely around the hub 420 and separated by the ribs 422, but are nonetheless in fluid communication with each other and together, above and below the rib 422, form part of the reservoir 440. In this way, the rib 422 does not sever the reservoir 440, because the rib 422 does not separate the reservoir 440 into separate portions or parts among which the sealant cannot flow. Rather, the sealant can flow through the entire reservoir 440 despite the ribs 422, because the ribs 422 do not sever the reservoir 440.

Referring still to FIGS. 5A and 5B, the ribs 422 all extend radially outward from the central hub 420. The hub 420 is located centrally, arranged coaxially with respect to the perimeter structure 421. The hub 420 is a cylindrical block, having a top 470, an opposed bottom 471, and an outer cylindrical sidewall 472 extending between the top 470 and bottom 471. The inner end 450 of each rib 422 is formed to the outer sidewall 472. Above the ribs 422, the sidewall 472 is vertical, but below the ribs 422, the sidewall is semi-spherical. The top 470 of the hub 420 projects just slightly above the top of the upstanding wall 435 of the perimeter structure 421.

As shown best in FIG. 5C, the hub 420 has a central solid body 473. The top 470 is flat, circular, smooth, and planar, but a threaded bore 476 is formed in the geometric center of the top 470, extending into the solid body 473 of the hub 420 from the top 470, normal to the flat top 470, and terminates before the bottom 471, such that the bore 476 is blind. When the cap 412 is placed over the base 411, the hub 420 is registered with a hole in the cap 412, exposing this bore 476.

Referring back to FIGS. 5A and 5B, the cap 412 is wide, round, and has a very low-profile disc shape. The cap 412 has a top 480 and an opposed bottom 481, as well as opposed upper and lower surfaces. The cap 412 is thin between the upper and lower surfaces, defining a shell. The flat top 480 of the cap 412 extends outward to an annular, downwardly-projecting lip 484 which extends down to the bottom 481. The inner surface of the lip 484 is formed with inwardly-directed threads 485 which correspond to and are complemental with the threads 436 on the wall 435 of the base 411.

At the top 480 of the cap 412 is a large hole 487. The hole 487 is formed entirely through the cap 412 from the upper surface to the lower surface. The hole 487 is located centrally on the top 480 and on the cap 412, such that when the cap 412 is moved onto the base 411, the hole 487 is registered with the hub 420. This allows a rugged bolt to be passed through the hole 487 in the cap 412 and be threadably applied to the bore 476 in the hub 420 when the device 410 is used.

Turning now primarily to just FIG. 5C, in operation, the device 410 is useful for providing a mount for a rack on a roof 14 and for sealing a roof penetration 15 which is made through the roof 14 and which is necessary to securely attach the device 410 to the roof 14. The roof penetrations 15 are formed, such as with a drill, through the roof 14 and potentially other roof structures (shingles, underlayment, wood decking, moisture barriers, rafters, and other structures are collectively simplified here as the roof 14). If there are several roof penetrations 15, a pattern is used to ensure each is located properly with respect to the other. Once the roof penetrations 15 are formed, the base 411 is placed atop the roof. The base 411 is aligned so that each bore 423 in a rib 422 is registered with a respective roof penetration 15. The fasteners 13 are then applied to the bores 423. In other embodiments, the fasteners 13 are self-tapping or self-drilling fasteners, and it is not necessary to drill holes; rather, the base 411 is placed over a desired location on the roof 14 and then the fasteners 13 are applied into the roof 14. Each fastener 13 is threadably engaged with the roof 14 until the head 90 is seated in the seat 456 of the rib 422 and the shank 91 passes below the seat 456 into the roof penetration 15. The head 90 is seated in flush and direct contact with the top 453 of the seat 456, and an unthreaded portion of the shank 91 just below the head 90 fills the bore 423 snugly. When all fasteners 13 are engaged in this manner, the base 411 is securely fixed to the roof 14.

In some embodiments, an o-ring, foam ring, adhesive sealant, or other form of gasket 488 or sealing member is applied to the lower face 433 of the annulus 434 before the base 411 is secured according to the above. This gasket 488 creates a first seal between the base 411 and the roof 14, just inboard from the outer edge 430. This first seal is effective at preventing water, moisture, and other environmental ingress at the annulus 434. Use of a gasket 488 is optional, however, and not necessary to ensure an environmental seal between the base 411 and the roof 14.

Once the base 411 is securely fixed to the roof 14, a flowable sealant 92 is applied to the reservoir 440. The sealant 92 is slowly applied to the reservoir 440 until the sealant 92 nearly reaches the top 424 of the base 411. By slowly filling the sealant 92, the sealant 92 can flow across the portion of the roof 14 covered by the base 411, surrounding the roof penetrations 15. Because the roof penetrations 15 are under the bores 423 in the ribs 422, the roof penetrations 15 are under the ribs 422. However, the lower cavity 464 defined below the ribs 422 is in fluid communication with, and indeed, forms part of, the reservoir 440, and so sealant 92 moves into the lower cavity 464 and surrounds the fasteners 13 and the roof penetrations 15. The sealant 92 entirely fills the bottom of the reservoir 440, flowing upward from the lower cavity 464 to the upper cavity 463. This forms an environmental seal between the base 411 and the roof 14 which prevents environmental ingress through the roof 14.

By filling the sealant 92 to just below the top 424, the heads 90 of the fasteners 13 are covered. Because the seats 456 are disposed below the top 424 of the base 411, the seats 456 and the heads 90 and shanks 91 of the fasteners 13 received in them are covered. This increases the surety of the environmental seal. Further, by filling the reservoir with sealant 92 until the heads 90 are covered, the installer performing the work receives visual confirmation: when the heads 90 are no longer visible, the installer can be sure the reservoir 440 is adequately filled.

The above defines an installed condition of the device 410. This installed condition is sufficient to form an environmental seal over the roof penetrations 15. Some installers may choose to apply a rugged bolt to the bore 476 in the central hub 420 and then immediately begin installing racks. However, an additional step may also be completed. FIG. 1F illustrates the cap 412 applied to the base 411. The installer registers the cap 412 with the base 411, so that the lip 484 is registered with the wall 435 of the base 411, and then moves the cap 412 downward onto the base 411, rotating the cap 412 so as to threadably engage the threads 485 on the lip 484 with the threads 436 on the base 411. The cap 412 is rotated completely. When so engaged, the hub 420 extends through the hole 487 in the cap 412 and is snugly received therein, and the top 470 of the hub 420 is flush with the top 480 of cap 412.

A rugged bolt, similar to the bolt 88 in FIGS. 1D-1F, is then threadably engaged with the bore 476. The cap 412 serves to deflect rain, snow, and other moisture onto the wall 435 and annulus 434, from which it will flow onto the roof 14. In these ways, when the cap 412 is moved onto the base 411, the cap 412 and the perimeter structure 421 of the base 411 cooperate to form an environmental seal around the roof penetrations 15.

Figure 6A:
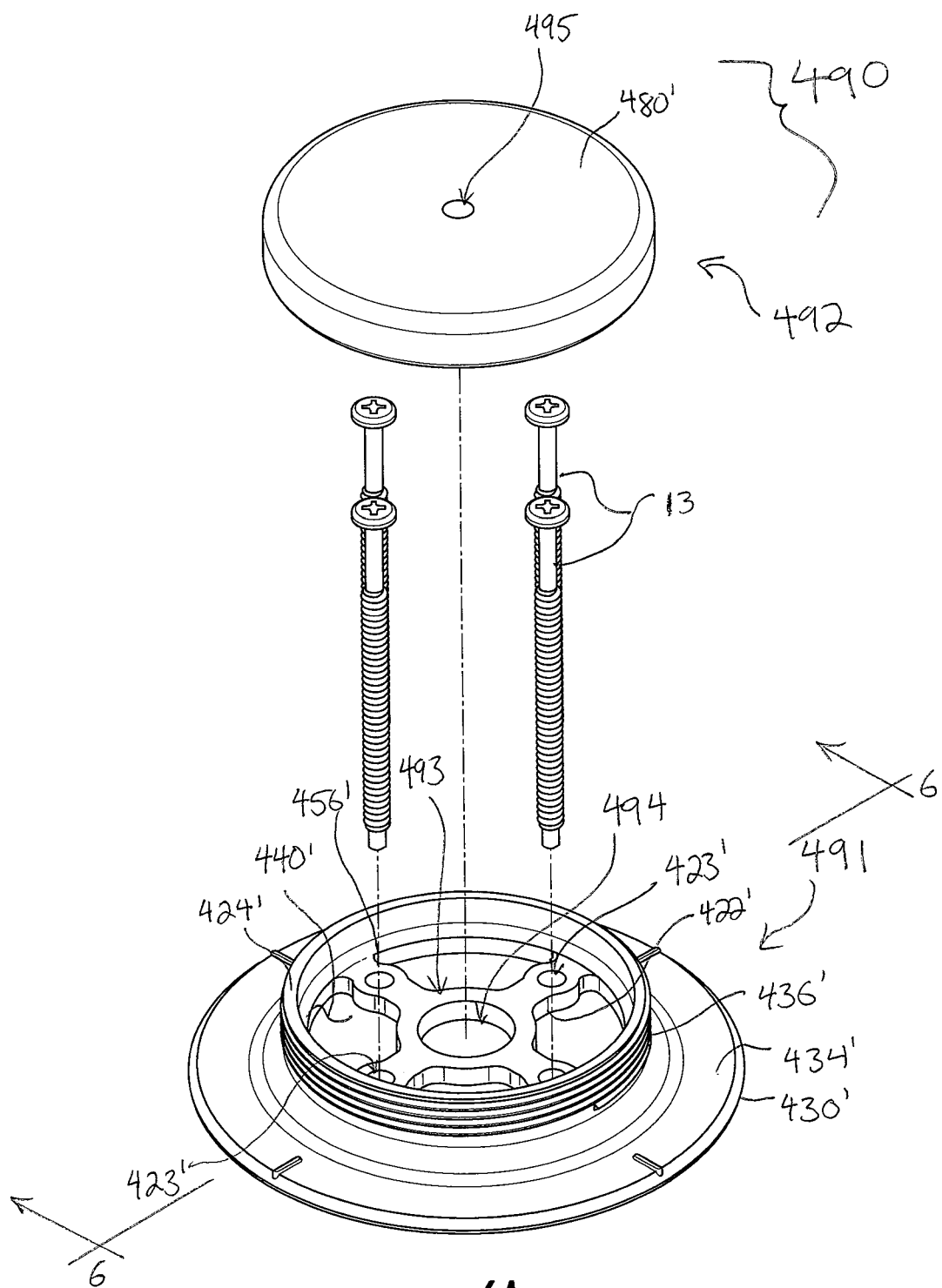
FIGS. 6A and 6B are top and bottom exploded perspective views of a flat roof mounting device.
Figure 6B:
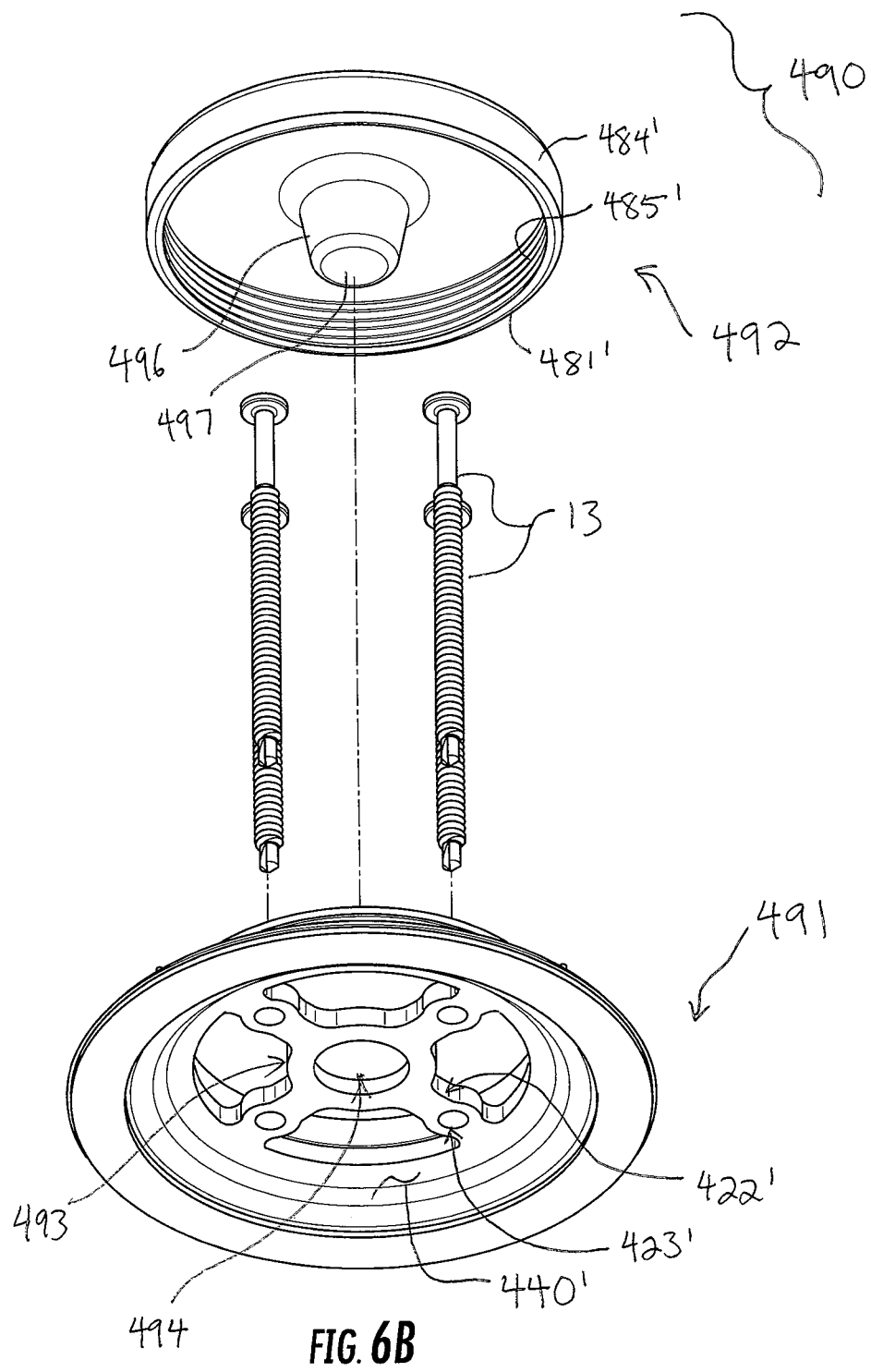
Figure 6C:
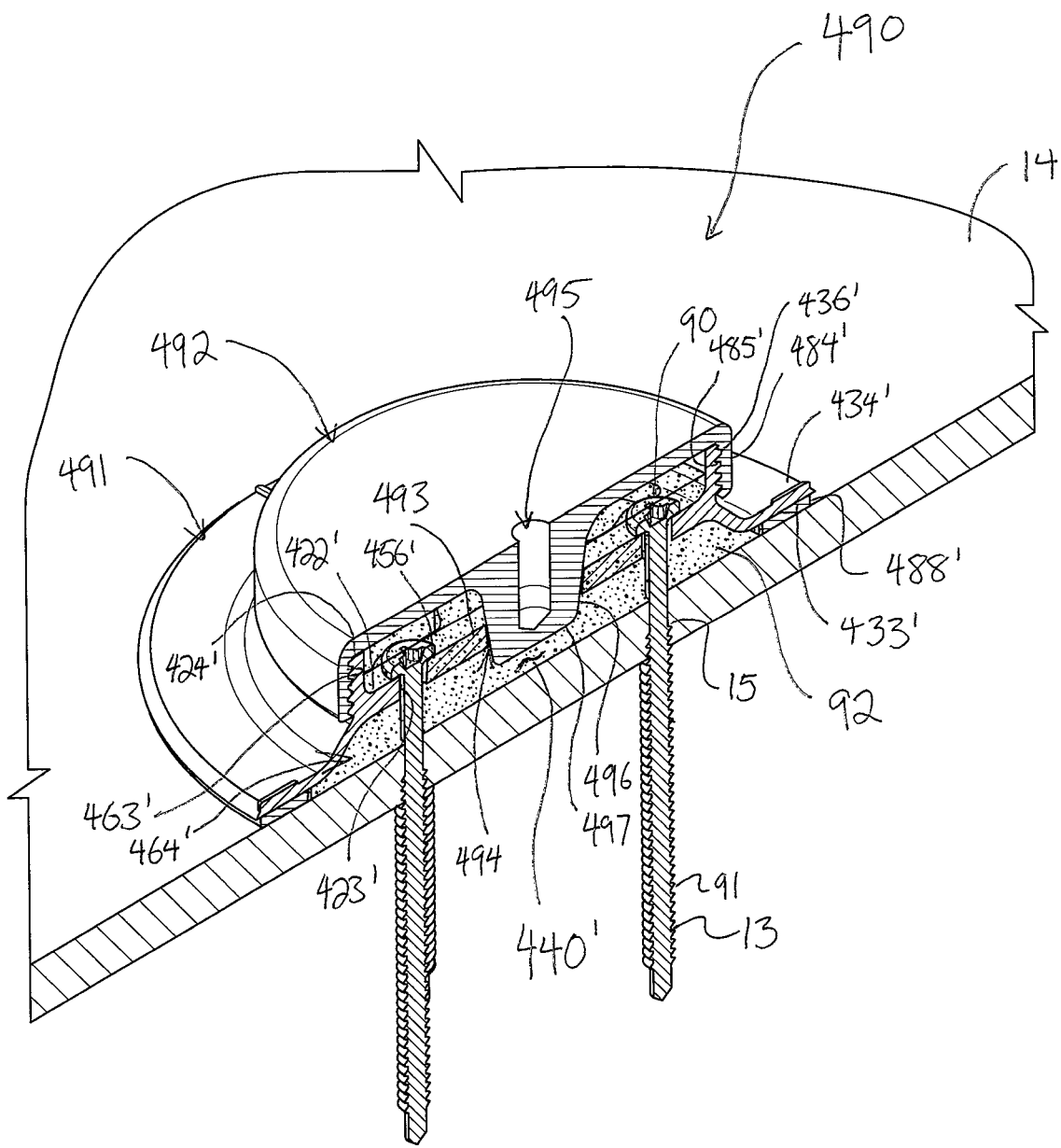
FIG. 6C is a section view taken along the line 6-6 in FIG. 6A, showing the device being applied to a roof.

Embodiment of FIGS. 6A-6C

FIGS. 6A-6C illustrate a flat roof mounting device 490 (hereinafter "the device 490") for covering a roof penetration 15 with a mount. The device 490 is nearly identical to the device 410, and many of the structural elements and features are common to both devices 410 and 490. As such, for structural elements and features of the device 490 which are identical to those of the device 410, the discussion herein adopts the same reference characters, and full description of such elements and features may not be made. The reader will understand the structure and function of such elements and features, a discussion of them having already been presented with respect to the device 410. For clarity, the reference characters of the device 490 which are identical will be marked with a prime ("'") symbol to distinguish them from those of the device 410, and FIGS. 6A-6C will not be marked with all of the identical reference characters. For example, the device 490 includes a base 491 and a cap 492 moveable onto the base 491 for forming an environmental seal around the roof penetration 15, so that a rack can be mounted on the device 490. The base 491 and cap 492 are nearly identical to their counterpart base 411 and cap 412 of the device 410, but are slightly different and so have a different reference character. However, the base 491 includes an outer perimeter structure 421' which is identical to the outer perimeter structure 421' of the device 410, and so that same reference character—marked with a prime symbol—is used. The base 491 also includes a central hub 493 which is coaxially encircled by the perimeter structure 421'.

A plurality of ribs 422' extends radially outward from the hub 493 to the perimeter structure 421', each with a bore 423' for a fastener 13. The hub 493, perimeter structure 421', and ribs 422' are preferably formed integrally and monolithically, from a single piece of material having strong, rugged, durable, and rigid material characteristics. When the low base 491 is applied over the roof penetration and the fasteners 13 are passed through the bores 423' such that their heads are seated against the ribs 422', the base 491 is securely mounted to the roof 14 at the roof penetration 15. With the base 491 securely mounted to the roof, the base 491 is a stable, secure, and strong mount for the rack.

Like the base 411 of the device 410, the base 491 has an top 424' and an opposed open bottom 425'. The perimeter structure 421' has an outer edge 430', an opposed inner edge 431', an outer or upper face 432', an opposed inner or lower face 433', a flat annulus 434', an upstanding wall 435', threads 436' on the wall 435', and an internal reservoir 440'. The ribs 422' are identical, and each has an inner end 450', an outer end 451', an arm 452', a top 453', a bottom 454', opposed sides, and a seat 456'. The base 491 further includes an upper cavity 463' and a lower cavity 464', which extend entirely around the hub 493, are separated by the ribs 422', and are in fluid communication with each other. Together, above and below the rib 422', the upper and lower cavities 463' and 464' form part of the reservoir 440'. The rib 422' does not sever the reservoir 440', because the rib 422' does not separate the reservoir 440' into separate portions or parts among which the sealant cannot flow. Rather, the sealant can flow through the entire reservoir 440' despite the ribs 422', because the ribs 422' do not sever the reservoir 440'.

The hub 493 is located centrally, arranged coaxially with respect to the perimeter structure 421'. Rather than being a large cylindrical block like the hub 420, the hub 493 has a flat top which is coplanar with the tops 453' of the arms 452' of the ribs 422' and a flat bottom which is coplanar with the bottoms 454' as well. Indeed, the inner ends 450' of the four ribs 422' contiguously transition extend to the hub 493, which lies in the same plane as those ribs 422'. As such, the top of the hub 493 is well below the top 424' of the base 491, and the bottom of the hub 493 is well above the bottom 425'. A large hole 494 is formed centrally in the hub 493; when the cap 492 is placed over the base 491, the hole 494 receives a depression or protrusion on the underside of the cap 492.

Referring still to FIGS. 6A and 6B, the cap 492 is wide, round, and has a very low-profile disc shape. The cap 492 has a top 480', an opposed bottom 481', opposed upper and lower surfaces, and a downwardly-projecting lip 484', the inner surface of which is formed with inwardly-directed threads 485' which correspond to and are complemental with the threads 436' on the wall 435' of the base 491.

At the top 480' of the cap 492 is a bore 495 extending downward into the cap 492 and into a protrusion 496 depending from the lower surface of the cap 492. The protrusion 496 is a solid, truncated, conical block having a diameter which is wider at its top proximate to the lower surface of the cap 492 than it is at its flat bottom 497, away from the lower surface. The bore 495 extends into the solid body of the protrusion 496, normal to the flat top 480', and terminates before the bottom 497, such that the bore 495 is blind. The bore 495 is sized to receive a rugged bolt to be passed through the bore 495 to be threadably engaged therein when the device 490 is used.

Turning now primarily to just FIG. 6C, in operation, the device 490 is useful for providing a mount for a rack on a roof 14 and for sealing a roof penetration 15 which is made through the roof 14 and which is necessary to securely attach the device 490 to the roof 14. The roof penetrations 15 are formed, such as with a drill, through the roof 14 and potentially other roof structures (shingles, underlayment, wood decking, moisture barriers, rafters, and other structures are collectively simplified here as the roof 14). If there are several roof penetrations 15, a pattern is used to ensure each is located properly with respect to the other. Once the roof penetrations 15 are formed, the base 491 is placed atop the roof. The base 491 is aligned so that each bore 423' in a rib 422' is registered with a respective roof penetration 15. The fasteners 13 are then applied to the bores 423'. In other embodiments, the fasteners 13 are self-tapping or self-drilling fasteners, and it is not necessary to drill holes; rather, the base 491 is placed over a desired location on the roof 14 and then the fasteners 13 are applied into the roof 14. Each fastener 13 is threadably engaged with the roof 14 until the head 90 is seated in the seat 456' of the rib 422' and the shank 91 passes below the seat 456' into the roof penetration 15. The head 90 is seated in flush and direct contact with the top 453' of the seat 456', and an unthreaded portion of the shank 91 just below the head 90 fills the bore 423' snugly. When all fasteners 13 are engaged in this manner, the base 491 is securely fixed to the roof 14.

In some embodiments, an o-ring, foam ring, adhesive sealant, or other form of gasket 488' or sealing member is applied to the lower face 433' of the annulus 434' before the base 491 is secured according to the above. This gasket 488' creates a first seal between the base 491 and the roof 14, just inboard from the outer edge 430'. This first seal is effective at preventing water, moisture, and other environmental ingress at the annulus 434'. Use of a gasket 488' is optional, however, and not necessary to ensure an environmental seal between the base 491 and the roof 14.

Once the base 491 is securely fixed to the roof 14, a flowable sealant 92 is applied to the reservoir 440'. The sealant 92 is slowly applied to the reservoir 440' until the sealant 92 nearly reaches the top 424' of the base 491. By slowly filling the sealant 92, the sealant 92 can flow across the portion of the roof 14 covered by the base 491, surrounding the roof penetrations 15. Because the roof penetrations 15 are under the bores 423' in the ribs 422', the roof penetrations 15 are under the ribs 422'. However, the lower cavity 464' defined below the ribs 422' is in fluid communication with, and indeed, forms part of, the reservoir 440', and so sealant 92 moves into the lower cavity 464' and surrounds the fasteners 13 and the roof penetrations 15. The sealant 92 entirely fills the bottom of the reservoir 440', flowing upward from the lower cavity 464' to the upper cavity 463'. This forms an environmental seal between the base 491 and the roof 14 which prevents environmental ingress through the roof 14.

By filling the sealant 92 to just below the top 424', the heads 90 of the fasteners 13 are covered. Because the seats 456' are disposed below the top 424' of the base 491, the seats 456' and the heads 90 and shanks 91 of the fasteners 13 received in them are covered. This increases the surety of the environmental seal. Further, by filling the reservoir with sealant 92 until the heads 90 are covered, the installer performing the work receives visual confirmation: when the heads 90 are no longer visible, the installer can be sure the reservoir 440' is adequately filled.

The installer next registers the cap 492 with the base 491, so that the lip 484' is registered with the wall 435' of the base 491, and then moves the cap 492 downward onto the base 491, rotating the cap 492 so as to threadably engage the threads 485' on the lip 484' with the threads 436' on the base 491. The cap 492 is rotated completely. When so engaged, the protrusion 496 extends downward through the hole 494 in the hub 493 where it is snugly received. A rugged bolt, similar to the bolt 88 in FIGS. 1D-1F, is then threadably engaged with the bore 495.

In these ways, when the cap 492 is moved onto the base 491, the cap 492 and the perimeter structure 421' of the base 491 cooperate to form an environmental seal around the roof penetrations 15. The above defines an installed condition of the device 490. This installed condition is sufficient to form the environmental seal over the roof penetrations 15. The cap 492 serves to deflect rain, snow, and other moisture onto the wall 435' and annulus 434', from which it will flow onto the roof 14. Some installers may choose to apply a rugged bolt to the bore 476.

Figure 7A:
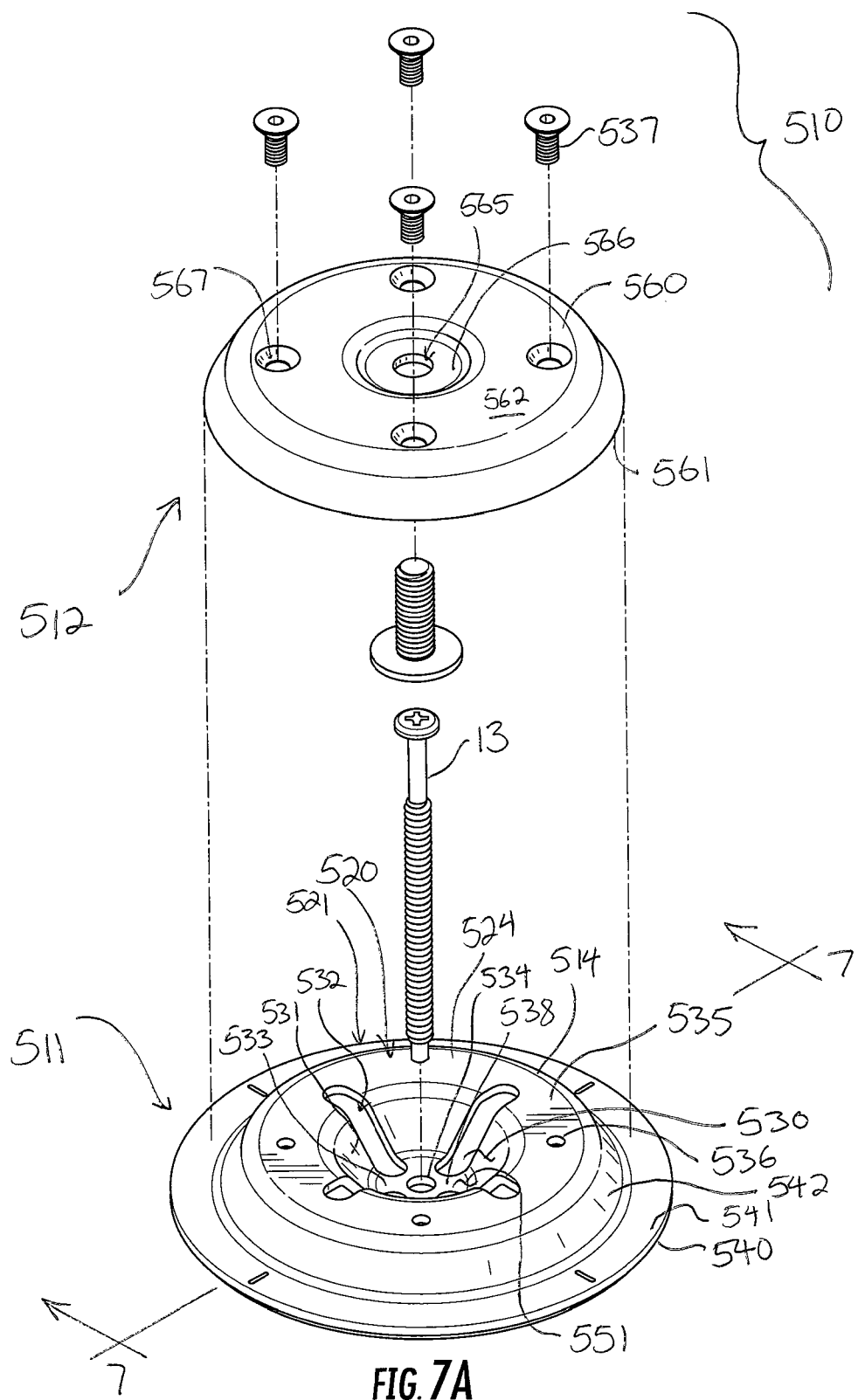
FIGS. 7A and 7B are top and bottom exploded perspective views of a flat roof mounting device.
Figure 7B:
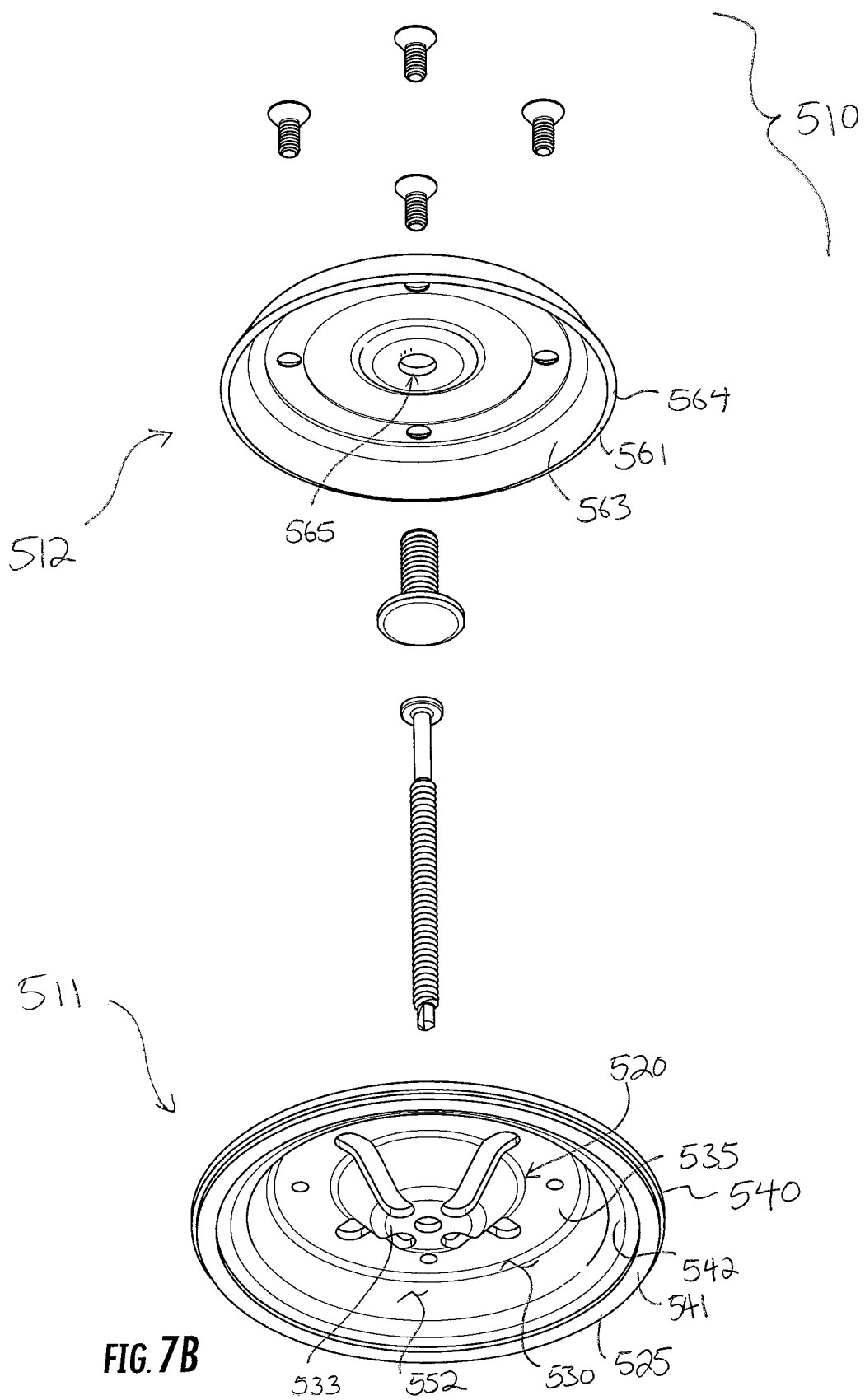
Figure 7C:
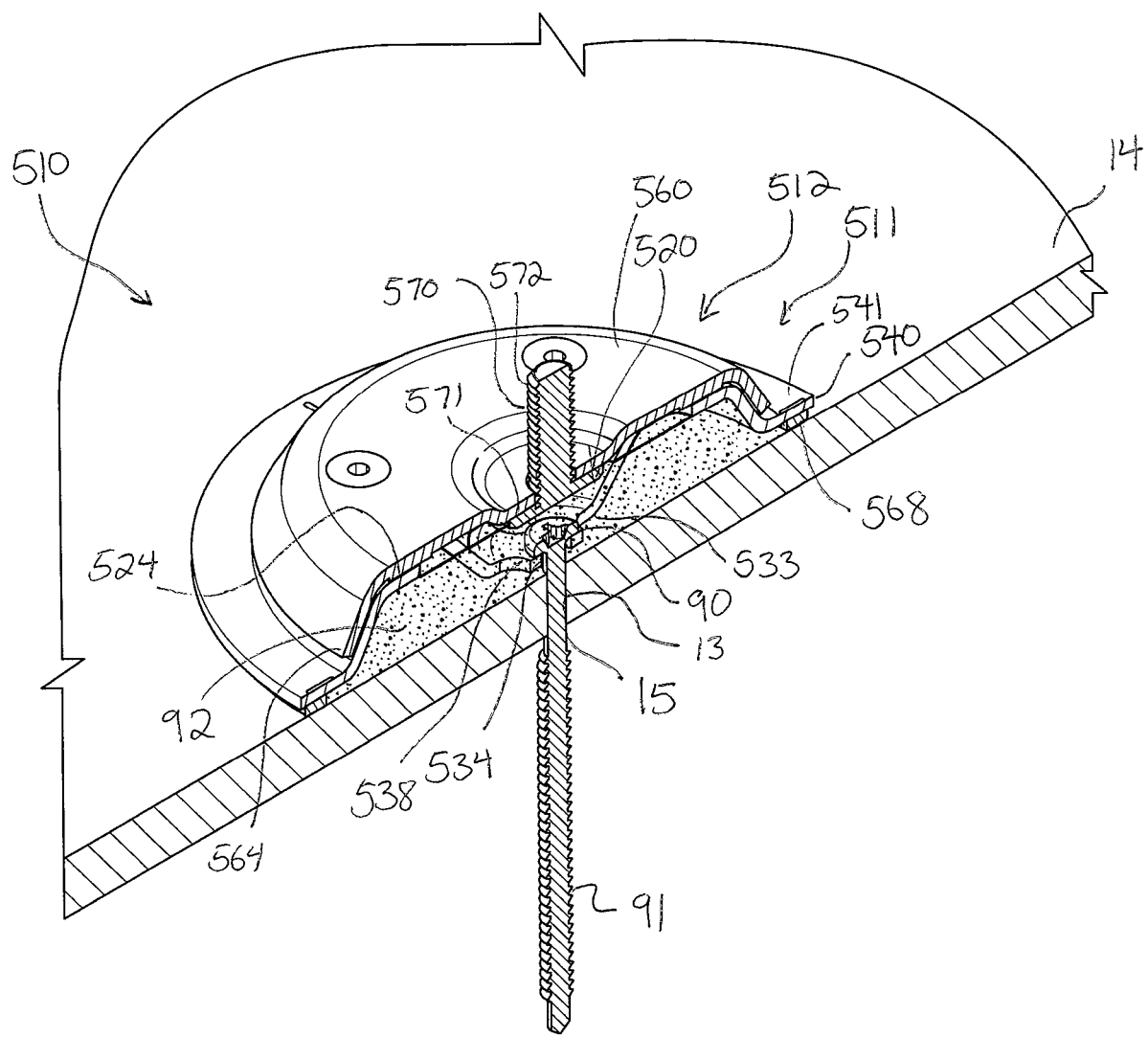
FIG. 7C is a section view taken along the line 7-7 in FIG. 7A, showing the device being applied to a roof.

Embodiment of FIGS. 7A-7C

FIG. 7A illustrates a flat roof mounting device 510 (hereinafter "the device 510") for covering a roof penetration with a mount, the device 510 including a base 511 and a cap 512 moveable onto the base 511 for forming an environmental seal around the roof penetration. The device 510 is a mount for a rack.

The base 511 is wide, round, and has a low profile. The base 511 includes a central depressed socket 520 and an outer perimeter structure 521 encircling the socket 520. The socket 520 and perimeter structure 521 are connected, or coupled, to each other by a monolithic, integral, one-piece sheet 514 of material molded into the form of the base 511, which sheet 514 includes the socket 520, the perimeter structure 521, and the various structures therebetween. The sheet 514 is preferably constructed from a single piece of material having strong, rugged, durable, and rigid material characteristics. When the low base 511 is applied over the roof penetration and a fastener 13 is passed through the base 511 and into the roof, the base 511 is securely mounted to the roof at the roof penetration. With the base 511 securely mounted to the roof, the base 511 is a stable, secure, and strong mount for the rack.

The base 511 has a top 524 and a bottom 525, both of which are open, with openings into the base 511 formed at both the top 524 and bottom 525. A continuous internal reservoir 530 is defined between the top 524 and bottom 525. The reservoir 530 is an inner space or hold, which, when the base 511 is applied to the roof, cooperates with the roof to receive, hold, and contain a flowable sealant which is applied into the reservoir 530. The cap 512 is applied over the open top 524 to enclose the reservoir 530 and cooperate with the base 511 to seal the roof penetration.

The central socket 520 depends from the open top 524. The socket 520 is a truncated, narrow, generally conical structure depending into the reservoir 530, such that the socket 520 is wider near the top 524 than at its bottom. The socket 520 includes four opposed arcuate sidewalls 531 circumferentially spaced apart by four openings or slots 532. The sidewalls 531 are angled to define the conical shape of the socket 520. They extend downwardly and inwardly toward each other in a converging fashion, terminating at a small, roughly circular flat bottom 533 of the socket 520. The bottom 533 extends between the bottom of each of the four sidewalls 531 and is formed at its center with a bore 534 suitable for receiving the fastener 13. The bore 534 is preferably cylindrical and unthreaded, and it extends transversely through the bottom 533. The bottom 533 does encircle the bore 534 with a circular structure, defining a seat 538 in which the bore 534 is formed.

At its top 524, the base 511 has a flat rim 535, characterized as a wide annulus surrounding the socket 520. The slots 532 cut into the rim 535 slightly from its inner diameter; the slots 532 also cut into the otherwise circular bottom 533 from its outer diameter. Formed through the rim 535 are four threaded holes 536, each sized to threadably receive screws 537 which secure the cap 512 to the base 511.

Like the base 511, the perimeter structure 521 is wide, round, and has a low profile. The perimeter structure 521 has an outer edge 540 opposing the rim 535; the outer edge 540 and rim 535 are both circular in the embodiment shown in FIGS. 7A-7C. The outer edge 540 is a low, flat edge. The perimeter structure 521 includes a flat annulus 541 or ring extending inwardly from the outer edge 540 and along a plane at the bottom of the base 511. The annulus 541 terminates at an upstanding ridge 542; the ridge 542 rises obliquely from the annulus 541 to the rim 535 at the top 524 of the base 511. When the cap 512 is applied to the base 511, the cap 512 overlies the rim 535 and most of the ridge 542.

Attention is now directed primarily to FIG. 7B, where the underside of the base 511 is illustrated well. The underside of the annulus 541 is flat. The underside of the upstanding ridge 542 rises upward from the annulus 541 toward the top 524 of the base 511 until it meets the rim 535, at which point the underside of the socket 520 drops down to the bottom 525. The bottom 525 of the socket 520 is disposed above the bottom 525 of the base 511, and the bottom 533 of the socket 520 is disposed below the open top 524. In other words, the bottom 533 of the socket 520 is disposed between the open top 524 and the open bottom 525 of the base 511; the top 524 and bottom 525 are vertically spaced apart from the top 524 and bottom 525.

The sidewalls 531 and bottom 533 of the socket 520 therefore define an upper cavity 551 above the socket 520, and the socket 520, rim 535, and ridge 542 define a lower cavity 552 opposed from the upper cavity 551. The upper cavity 551 extends upward from the socket 520 to the open top 524; the lower cavity 552 extends downward to the open bottom 525. The upper and lower cavities 551 and 552 are formed in communication with each other through the slots 532 in the socket 520 and through the bore 534, and they cooperate to define the internal reservoir 530 of the base 511.

Thus, when the base 511 is mounted on a roof, sealant applied to the base 511 flows vertically, radially, and circumferentially in the upper and lower cavities 551 and 552 without interruption or blockage.

Referring now to FIGS. 7A and 7B, the cap 512 is wide, round, and has a very low-profile dome shape. The cap 512 has a top 560 and an opposed bottom 561, and it opposed upper and lower surfaces 562 and 563. The cap 512 is thin between the upper and lower surfaces 562 and 563, defining a shell. The upper surface 562 is convex, and the lower surface 563 is concave, because the cap 512 curves downward from the flat top 560 to an annular, downwardly-projecting lip 564 at the bottom 561. The lip 564 also defines the outer edge of the cap 512 at its outer dimension.

At the top 560 of the cap 512 is a hole 565 formed in a central downward depression 566. The hole 565 is formed entirely through the cap 512 from the upper surface 562 to the lower surface 563. The underside of the cap 512 is reinforced, and has a greater thickness around the hole 565 than do other parts of the cap 512. The hole 565 is located centrally on the top 560 of the cap 512, and it is disposed below the top 560; the depression 566 surrounding the hole 565 extends downwardly from the top 560 and the hole is formed in the depression 566.

Holes 567 are formed through the cap 512, between the depression 566 and the lip 564. When the cap 512 is placed over the base 511, the holes 567 are registered with the holes 536 in the base 511, such that the screws 537 can be applied to both.

Turning now to FIG. 7C, in operation, the device 510 is useful for providing a mount for a rack on a roof 14 and for sealing a roof penetration 15 which is made through the roof 14 and which is necessary to securely attach the device 510 to the roof 14. The roof penetration 15 is formed, such as with a drill, through the roof 14 and potentially other roof structures (shingles, underlayment, wood decking, moisture barriers, rafters, and other structures are collectively simplified here as the roof 14). Once the roof penetration 15 is formed, the base 511 is placed atop the roof. The base 511 is aligned so that its bore 534 is registered with the roof penetration 15. Preferably, an o-ring, foam ring, adhesive sealant, or other form of gasket or sealing member 568 is compressed between the base 11 and the roof 14; the sealing member 568 is placed just under the annulus 541. This sealing member 568 creates a first seal between the base 511 and the roof 14, just inboard from the outer edge 540. This first seal is effective at preventing water, moisture, and other environmental ingress at the annulus 541. Use of a sealing member 568 is optional, however, and not necessary to ensure an environmental seal between the base 511 and the roof 14.

The fastener 13 is applied to the bore 534. In other embodiments, the fastener 13 is a self-tapping or self-drilling fastener, and it is not necessary to drill a hole through the roof 14; rather, the base 511 is placed over a desired location on the roof 14 and then the fastener 13 is applied through the base 511 and into the roof 14, thus forming the roof penetration 15 as it is applied to the roof 14. The fastener 13 is threadably engaged with the roof 14 until the head 90 is seated in the seat 538 surrounding the bore 534 and the shank 91 passes below the seat 538 into the roof penetration 15. The head 90 is seated in flush and direct contact with the top of the seat 538, and an unthreaded portion of the shank 91 just below the head 90 fills the bore 534 snugly. When the fastener 13 is engaged in this manner, the base 511 is securely fixed to the roof 14.

Once the base 511 is securely fixed to the roof 14, a flowable sealant 92 is applied to the reservoir 530. With a tool such as a caulking gun, the sealant 92 is slowly applied through the open top 524 to the reservoir 530 until the sealant 92 reaches just below the top 524 of the base 511. By slowly filling the sealant 92, the sealant 92 can flow across the portion of the roof 14 covered by the base 511, surrounding the roof penetration 15. Because the roof penetration 15 is under the bore 534, the roof penetration 15 is under the bottom 533 of the socket 520. However, the lower cavity 552 defined below the socket 520 is in fluid communication with, and indeed, forms part of, the reservoir 530. In this way, the socket 520 does not sever the reservoir 530, because the socket 520 does not separate the reservoir 530 into separate portions or parts among which the sealant cannot flow. Rather, the sealant can flow through the entire reservoir 530 despite the socket 520, because the socket 520 does not sever the reservoir 530. As such, sealant 92 moves into the lower cavity 552 and surrounds the fastener 13 and the roof penetration 15. The sealant 92 entirely fills the lower cavity 552 of the reservoir 530, flowing through each of the slots 532. Then, the sealant 92 fills the lower cavity 552, the slots 532 in the socket 520, and the upper cavity 551. This forms an environmental seal between the base 511 and the roof 14 which prevents environmental ingress through the roof 14.

By filling the sealant 92 to near the top 524, the head 90 of the fastener 13 is covered. Because the bore 534 and seat 538 are disposed below the top 524 of the base 511, the bore 534, the seat 538, and the head 90 and shank 91 of the fastener 13 received in them are covered. This increases the surety of the environmental seal. Further, by filling the reservoir with sealant 92 until the head 90 is covered, the installer performing the work receives visual confirmation: when the head 90 is no longer visible, the installer can be sure the reservoir 530 is adequately filled.

Next, the installer applies a rugged bolt 570 through the hole 565 in the cap 512. The bolt 570 is inverted, such that its head 571 is below the cap 512 and its shank 572 passes upward through it, exposing a portion of the shank 572 above the top 560 of the cap 512.

The cap 512 is then registered with the base 511, so that the lip 564 is registered with the ridge 542 of the base 511, and the installer then moves the cap 512 downward onto the base 511 so that the lip 564 is snugly received on the ridge 542. When so placed, the lower surface 563 at the top 560 of the cap 512 is above the socket 520, and a gap may be formed between the top of sealant 92 filling the socket 520 and the lower surface 563 of the cap 512. Otherwise, if the sealant 92 has been filled to the top 524 of the base 511, excess sealant 92 may spill out of the base 511 when the cap 512 is applied. This should be cleaned up by the installer.

In this manner, the lip 564 and the ridge 542 form an environmental seal preventing moisture and other ingress into the device 510. The cap 512 also serves to deflect rain, snow, and other moisture onto the ridge 542 and annulus 541, where it will flow onto the roof 14. In these ways, when the cap 512 is moved onto the base 511, the cap 512 and the perimeter structure 521 of the base 511 cooperate to form an environmental seal over and around the roof penetrations 15. Further, the shank 572 of the bolt 570 is available for the installer to apply the rack.

Embodiment of FIGS. 8A-8E

FIGS. 8A-8E illustrate a flat roof mounting device 610 (hereinafter "the device 610") for covering a roof penetration with a mount for a rack, which mount forms an environmental seal around the roof penetration.

The device 610 includes a lower base 611 and an upper attachment arm 612 projecting upwardly from the base 611. The base 611 is hollow and defines an internal reservoir 620. The reservoir 620 is an inner space or hold, which, when the device 610 is applied to a roof, cooperates with the roof to receive, hold, and contain a flowable sealant applied to the reservoir 620. The reservoir 620 is filled with the sealant during installation. A cap or plug 613 is snugly fit into an opening in the base 611 through which the sealant is applied; when the plug 613 is applied and the base 611 is properly fit on the roof 14, the plug encloses the reservoir 620, and sealant applied to the reservoir 620 seals the roof penetration.

The base 611 includes an oblong dome 621, formed from a thin sidewall, which includes a top 622 and an opposed bottom 623. At the bottom 623, the base 611 terminates with a downwardly-directed channel 624. The channel 624 surrounds a bottom opening 625 in communication with the reservoir 620, and the channel 624 is snugly fit with an o-ring, foam ring, adhesive sealant, or other form of gasket 626 which forms a seal with the roof when the base 611 is applied thereto.

The base 611 has an inner surface 630 and an opposed outer surface 631. The inner surface 630 extends upwardly inside the base 611 from the channel 624 and bounds the reservoir 620. The outer surface 631, in contrast, extends from the channel 624 entirely up to and along the arm 612. The inner and outer surfaces 630 and 631 meet at the channel 624, and also at an opening 632 in the base 611. The opening 632 is formed proximate the top 622 of the base 611, and it extends across the top 622 roughly parallel to the bottom 623 of the base 611. The opening 632 provides access to a top of the reservoir 620. The opening 632 is oblong, extending in its long dimension in the same direction that the dome 621 extends in its long dimension.

Below the opening, a hub 633 is disposed in the reservoir 620. The hub 633 is a generally round, cylindrical structure suspended within the reservoir 620. The hub 633 includes a smooth, vertical outer sidewall 634 extending between a top 635 and an opposed bottom 636 of the hub 633. The top 635 and bottom 636 are flat and parallel to each other and to the bottom 623. Indeed, the bottom 636 of the hub 633 is coplanar to the bottom 623 of the base 611, while the top 635 of the hub 633 is spaced below the top 622 of the base 611.

The hub 633 has a central solid body through which a bore 640 is formed. The bore 640 extends entirely through the hub 633 from the top 635 to the bottom 636, normal to the bottom 623 of the base 611. When the plug 613 is removed from the opening 632, the bore 640 is visible and accessible in the reservoir 620.

The hub 633 is suspended in the reservoir 620 by opposed ribs 641 and 642. The rib 641 extends forwardly to a "front" of the device 610, and so is considered a "forward rib" 641. The rib 642 extends rearwardly to a "back" of the device 610, and so is considered a "rearward rib" 642.

Figure 8A:
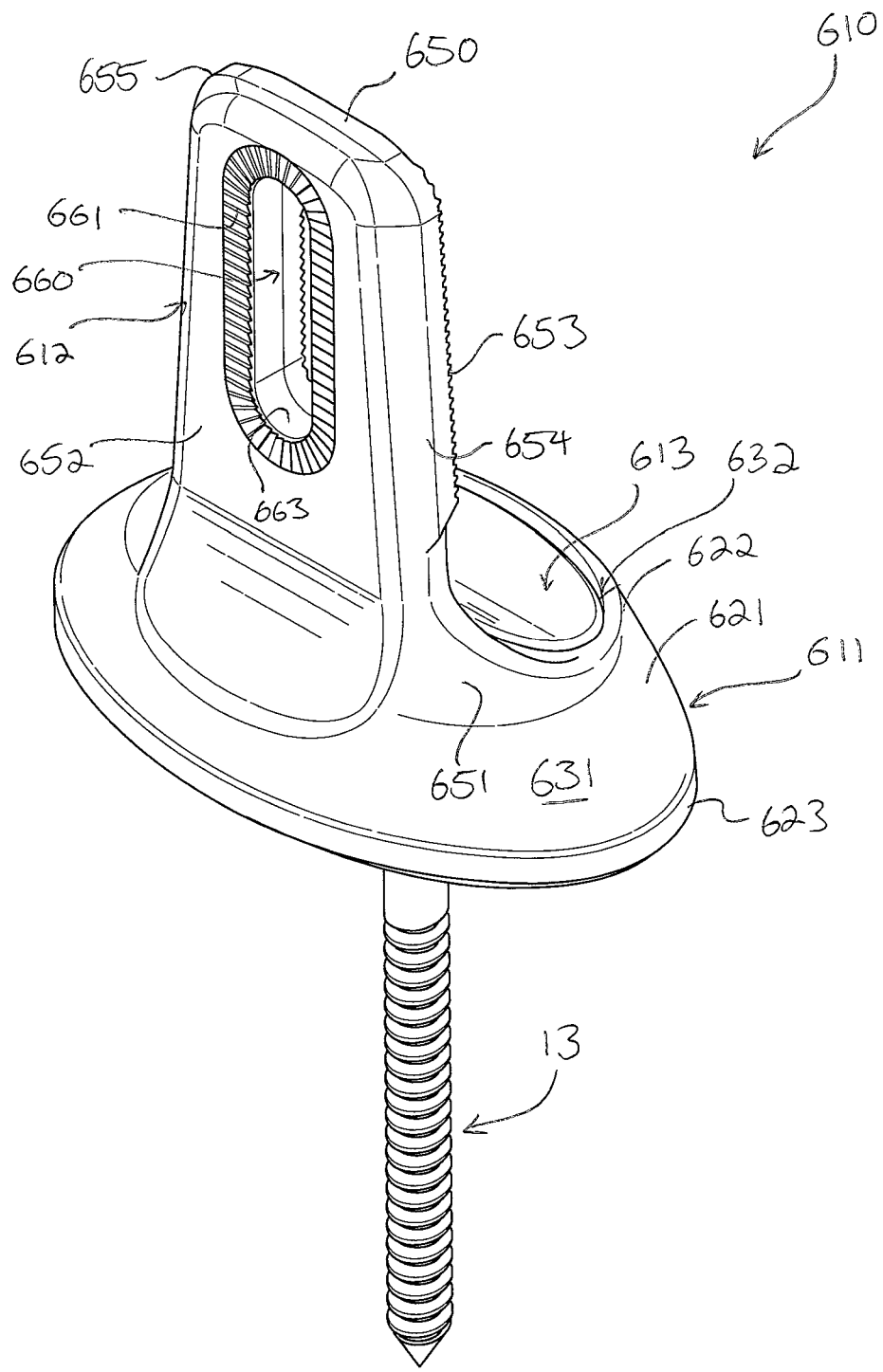
FIGS. 8A, 8B, and 8C are front, rear, and bottom perspective views, respectively, of a flat roof mounting device.
Figure 8B:
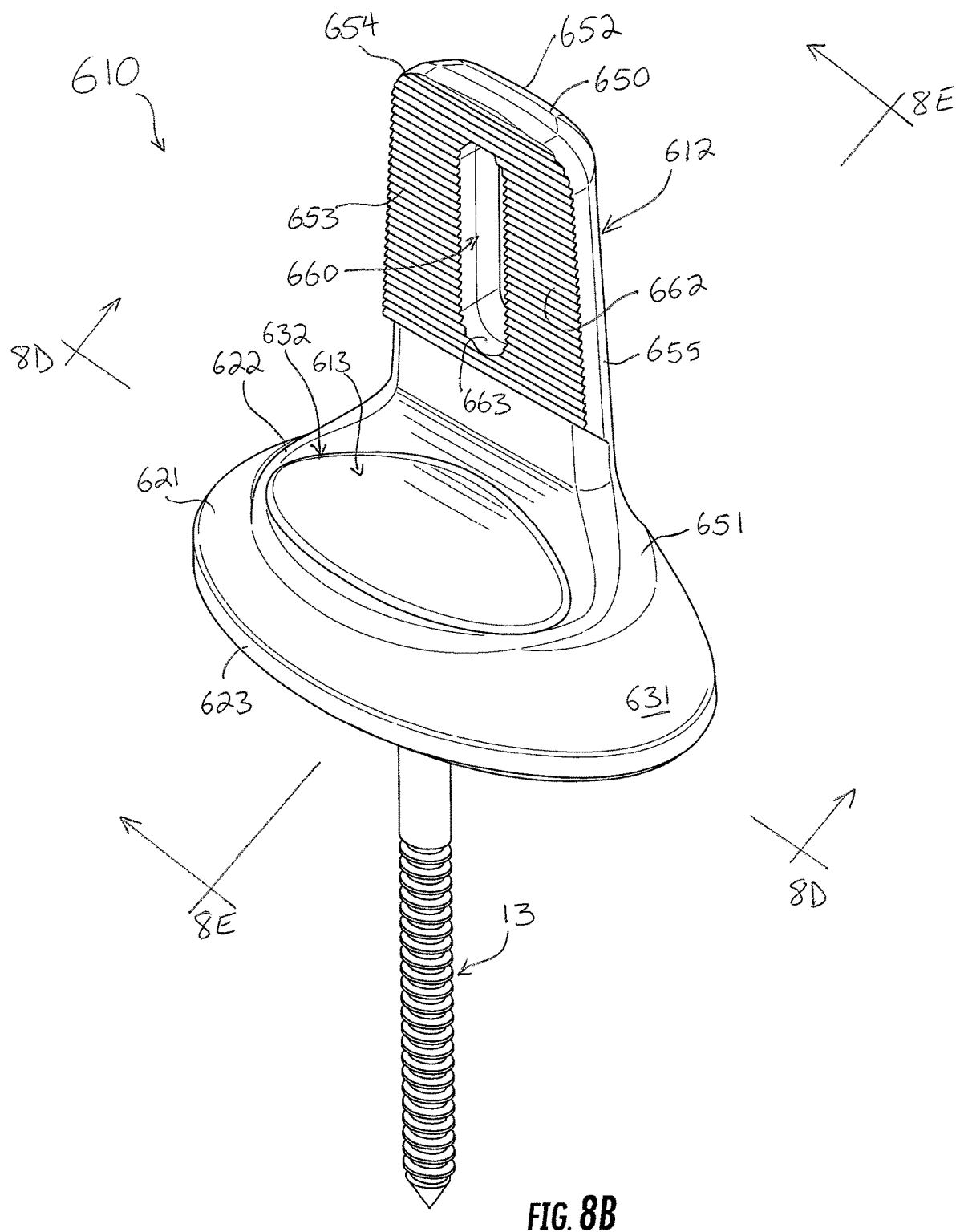
Figure 8C:
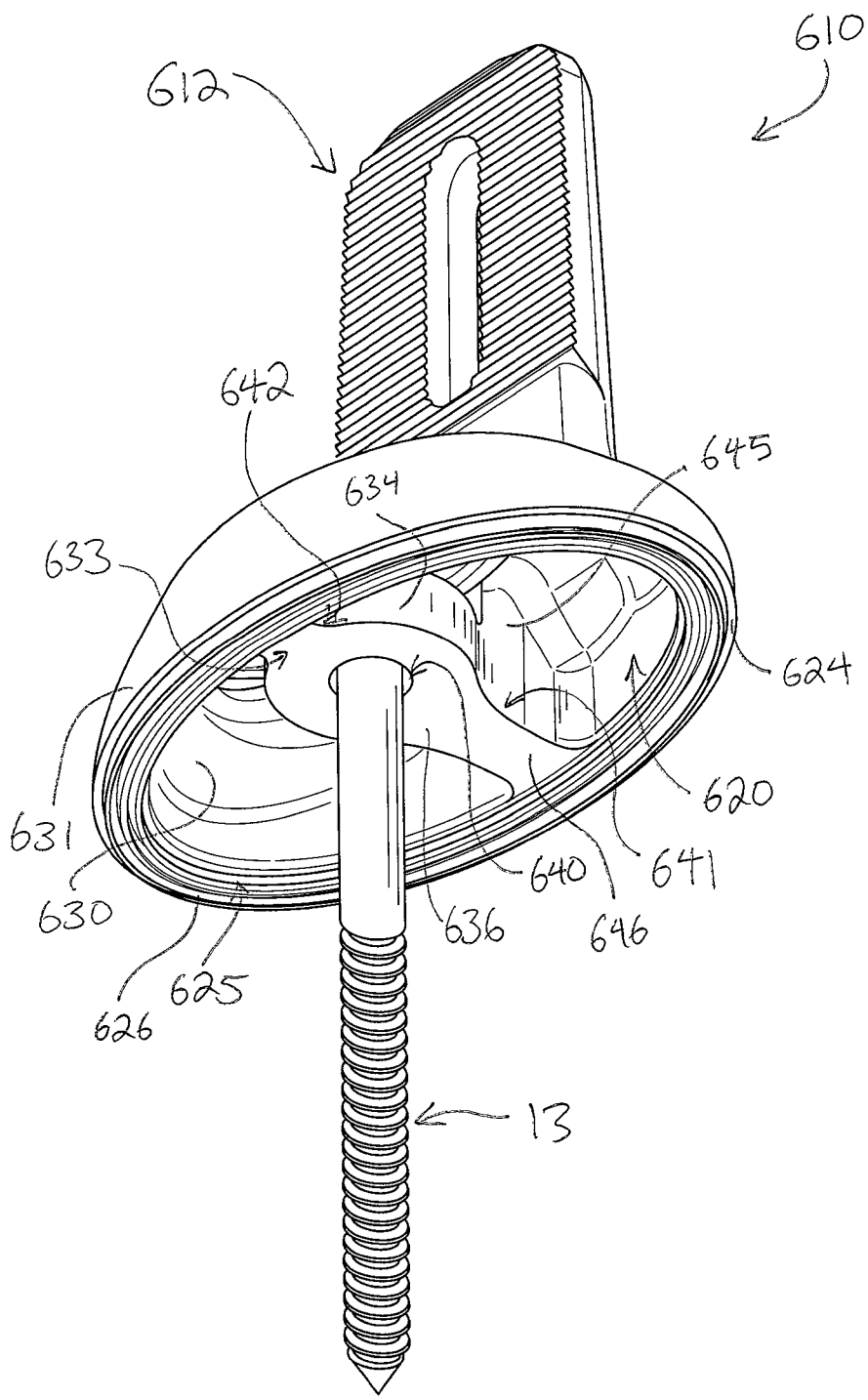

The forward rib 641 extends forwardly from an inner end formed integrally and monolithically to the sidewall 634 of the hub 633 to an outer end formed integrally and monolithically to the inner surface 630 of the base 611. The rib 641 is narrow, having opposed sides which are flat, parallel, and tall. The rib 641 has a top 643 which is contiguous with the top 635 of the hub 633, and it also has a bottom 644 which is contiguous with the bottom 636 of the hub 633. Similarly, the rearward rib 642 extends rearwardly from an inner end formed integrally and monolithically to the sidewall 634 of the hub 633 to an outer end formed integrally and monolithically to the inner surface 630 of the base 611, opposite the location where the forward rib 641 is joined to the inner surface 630. The rib 642 is narrow and tall, having opposed sides which are flat, parallel and tall, having a top 645 and opposed bottom 646. Behind the hub 630, as seen in FIG. 8C, the reservoir 620 rises upwardly slightly. The top 645 of the rib 642 rises as well, and is joined to the inner surface 630 at the top of the reservoir 620 and along the back of the inner surface 630 entirely down to the bottom 623. Indeed, the bottom 646 of the rib 642 is contiguous with the bottom 636 of the base 611.

The hub 633 and ribs 641 and 642 separate the reservoir 620 into two lobes. However, with the hub 620 disposed below the top 622 of the base 611, a cavity 647 is formed between the hub 620 and the top 622. This cavity 647 is part of the reservoir 620, but also joins the lobes of the reservoir 620 in communication with each other, so that the reservoir 620 is not severed or entirely separated by the hub 633 and ribs 641 and 642. Rather, the sealant can flow through the entire reservoir 620 despite the ribs 641 and 642.

Above the base 611, the arm 612 projects upwardly. The arm 612 is an upstanding projection, integrally and monolithically formed to the base 611, and it is rigidly connected thereto. The arm 612 has a top 650 and an opposed bottom 651 which is formed to the top 622 of the base 611. The arm 612 extends smoothly and continuously from the base 611 as an extension thereof from the bottom 651 to its top 650. The arm 612 has a front 652 and an opposed back 653, both of which are roughly flat and parallel to each other between the top 650 and bottom 651. The arm 612 has a thickness between the front 652 and back 653 which is approximately one-quarter the width of both the front 652 and the back 653. The arm 612 is solid and preferably not hollow.

The arm 612 has opposed sides 654 and 655 which are inboard of the dome 621 of the base 611. The sides 654 and 655 converge toward each other slightly to form a taper from the bottom 651 to the top 650. The top 650 of the arm 612 is flat, and rounded corners extend between each of the sides 654 and 655 and the top 650.

An aperture or slot 660 extends through the arm 612 and is useful for mounting rack hardware. The slots 660 is elongate, extending between the top 650 and bottom 651 of the arm 612. The slot 660 has a length and a width; its length is approximately two-thirds of the height of the arm 612 between the top 650 and the bottom 651, and its width is approximately one-fourth its height. Moreover, the top of the slot 660 is offset below the top 650 of the arm 612 by approximately the width of the slot 660. On the front 652 of the arm 612, the outer surface 631 surrounding the slot 660 is beveled slightly inward into the slot 660 and is formed with ridges 661. The ridges 661 extend radially outward from the slot 660. Similarly, on the back 653 of the arm 612, the outer surface 631 of the arm 612 is covered with ridges 662 which are arranged laterally between the opposed sides 654 and 655. The ridges 662 cover the outer surface 631 on the back 653 from the top 650 to just below the bottom of the slot 660. The slot 660 has an inner surface 663 with is smooth and formed without any ridges.

The plug 613 is wide and oval-shaped. The plug 613 fits into and seals the opening 632 in the base 611. The plug 613 has a top 670 and a downwardly-projecting lip 671 formed continuously around the top 670 at a perimeter 672 of the plug 613. The top 670 is slightly curved and corresponds to the gentle concave rise at the top 622 of the base 611 and the bottom 651 of the arm 612. The outer surface of the top 670 is smooth, so that it presents a continuous and contiguous surface to the outer surface 631 of the base 611, such that water and other environmental effects move from the arm 612 over the base 611 without interruption at the plug 613. The lip 671 is a short lip, extending just slightly downward from the top 670 at the perimeter 672. The plug 613 is constructed from a resilient, flexible material, such that when it is applied to the opening 632, the lip 671 deforms slightly to snugly fit into the opening 632 and form an environmental seal with the opening 632 that prevents water from entering the reservoir 620.

Figure 8D:
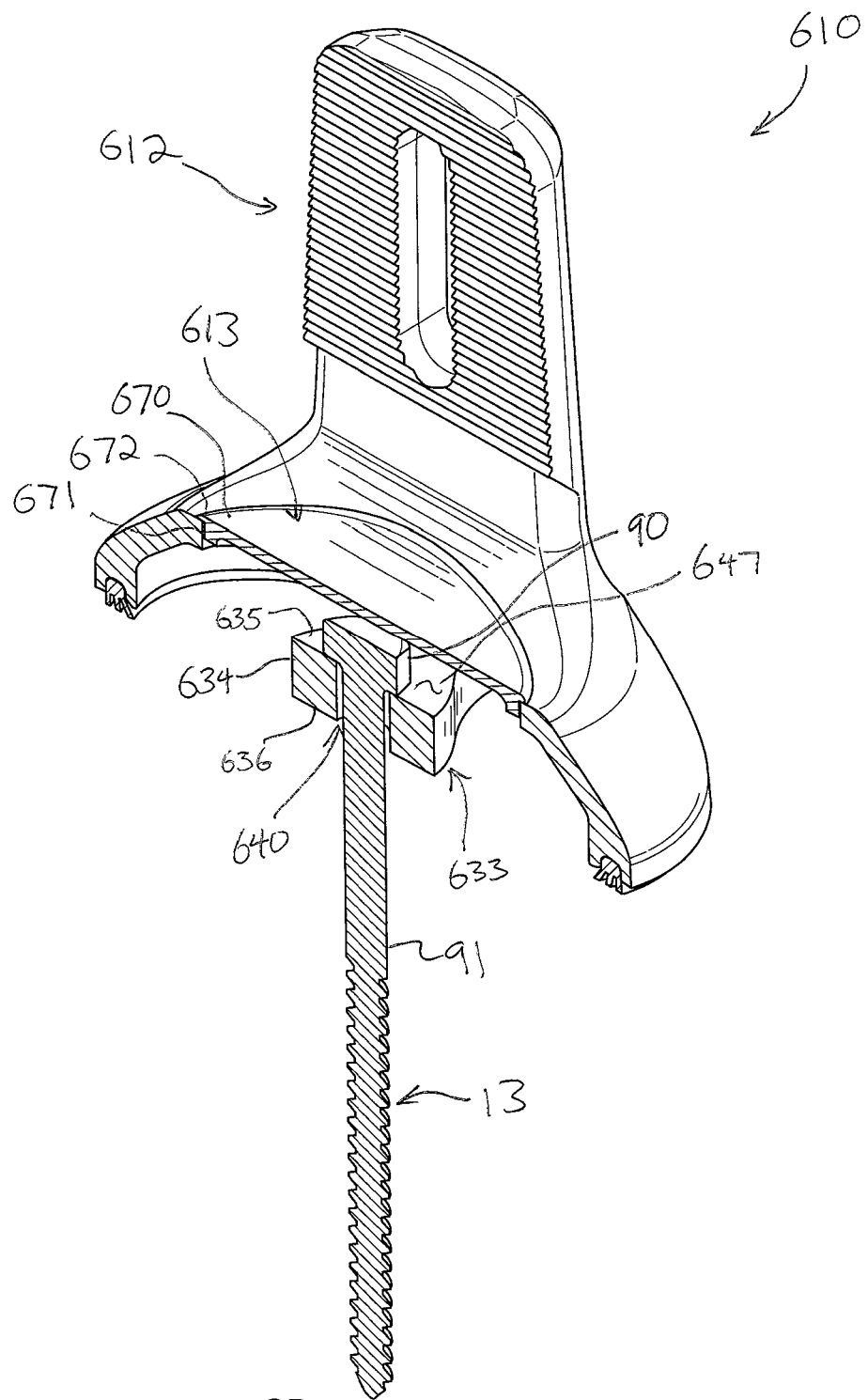
FIGS. 8D and 8E are section views of the device taken along the lines 8D-8D and 8E-8E, respectively.
Figure 8E:
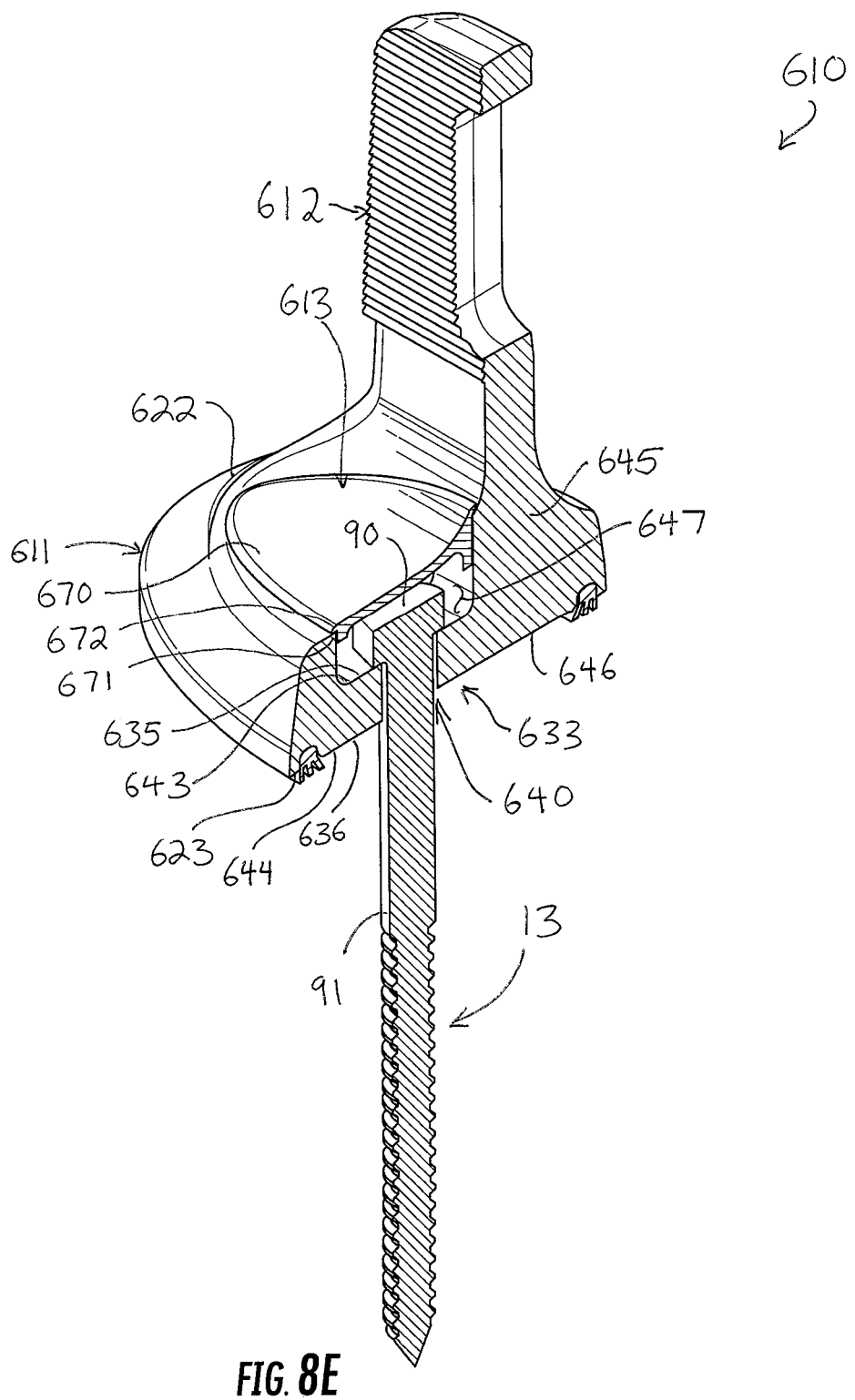

Turning now primarily to FIGS. 8C-8E, in operation, the device 610 is useful for providing a mount for a rack on a roof and for sealing a roof penetration which is made through the roof and which is necessary to securely attach the device 610 to the roof. None of the FIGS. 8A-8E illustrate the roof or roof penetration, as the foregoing discussions should provide sufficient information for the reader to grasp the discussion without explicit illustration. The roof penetrations are formed, such as with a drill, through the roof and potentially other roof structures. Once the roof penetrations are formed, the device 610 is placed atop the roof, and the bore 640 is registered with the roof penetration. Preferably, the plug 613 is initially removed, so that the roof penetration can be sighted through the reservoir 620 below the bore 640.

The fastener 13 is then applied through the bore 640. In other embodiments, the fastener 13 is self-tapping or self-drilling, and it is not necessary to pre-drill a hole; rather, the base 611 is placed over a desired location on the roof 14 and then the fastener 13 is applied into the roof 14. The fastener 13 is threadably engaged with the roof 14 until the head 90 is seated against the top 635 of the hub 633 and the shank 91 passes below the top 635, through the bore 640, and into the roof penetration. The head 90 is seated in flush and direct contact with the top 635, and an unthreaded portion of the shank 91 just below the head 90 fills the bore 640 snugly. When the fastener 13 is engaged in this manner, the device 610 is securely fixed to the roof 14.

As best seen in FIGS. 8D and 8E, in some embodiments, an o-ring, foam ring, adhesive sealant, or other form of gasket 626 or sealing member is applied to the channel 624 on the bottom 623 of the base 611. This gasket 626 creates a first seal between the base 611 and the roof. This first seal is effective at preventing water, moisture, and other environmental ingress into the base 611. Use of a gasket is optional, however, and not necessary to ensure an environmental seal between the base 611 and the roof.

Once the base 611 is securely fixed to the roof, a flowable sealant is applied to the reservoir 620. The sealant is slowly applied to the reservoir until the sealant covers the head 90 of the fastener 13. By slowly filling the sealant, the sealant can flow across the portion of the roof covered by the base 611, surrounding the hub 633 and flowing into both lobes of the reservoir 620 on either side of the hub 633. The sealant entirely fills the bottom of the reservoir 620, flowing up along the sides of the ribs 641 and 642, up above the top 635 of the hub 633, through the cavity 647, and finally over the head 90 of the fattener 13. This forms an environmental seal between the base 11 and the roof which prevents environmental ingress through the roof.

By filling the sealant to cover the head 90 of the fastener 13, the installer can be sure that the reservoir 620 is entirely filled. Because the hub 633, bore 640, and roof penetration are below the head 90 of the fastener 13, when the head 90 is no longer visible, the reservoir 620 is adequately filled.

The above defines an installed condition of the device 610. This installed condition is sufficient to form an environmental seal over the roof penetration. The plug 613 is preferably applied to the base 611, however, to form an additional environmental seal around the reservoir 620. When the plug 613 is applied, some excess sealant in the reservoir 620 may be squeezed out; the installer need only clean it up and continue application of the plug 613. The plug 613 is pressed into the opening 625 until its top 670 is contiguous to the top 622 of the dome 621. In this way, the plug forms a snug fit in the opening 625 and an environmental seal therewith. Equipment can now be mounted to the arm 612 of the device 610.

Figure 9A:
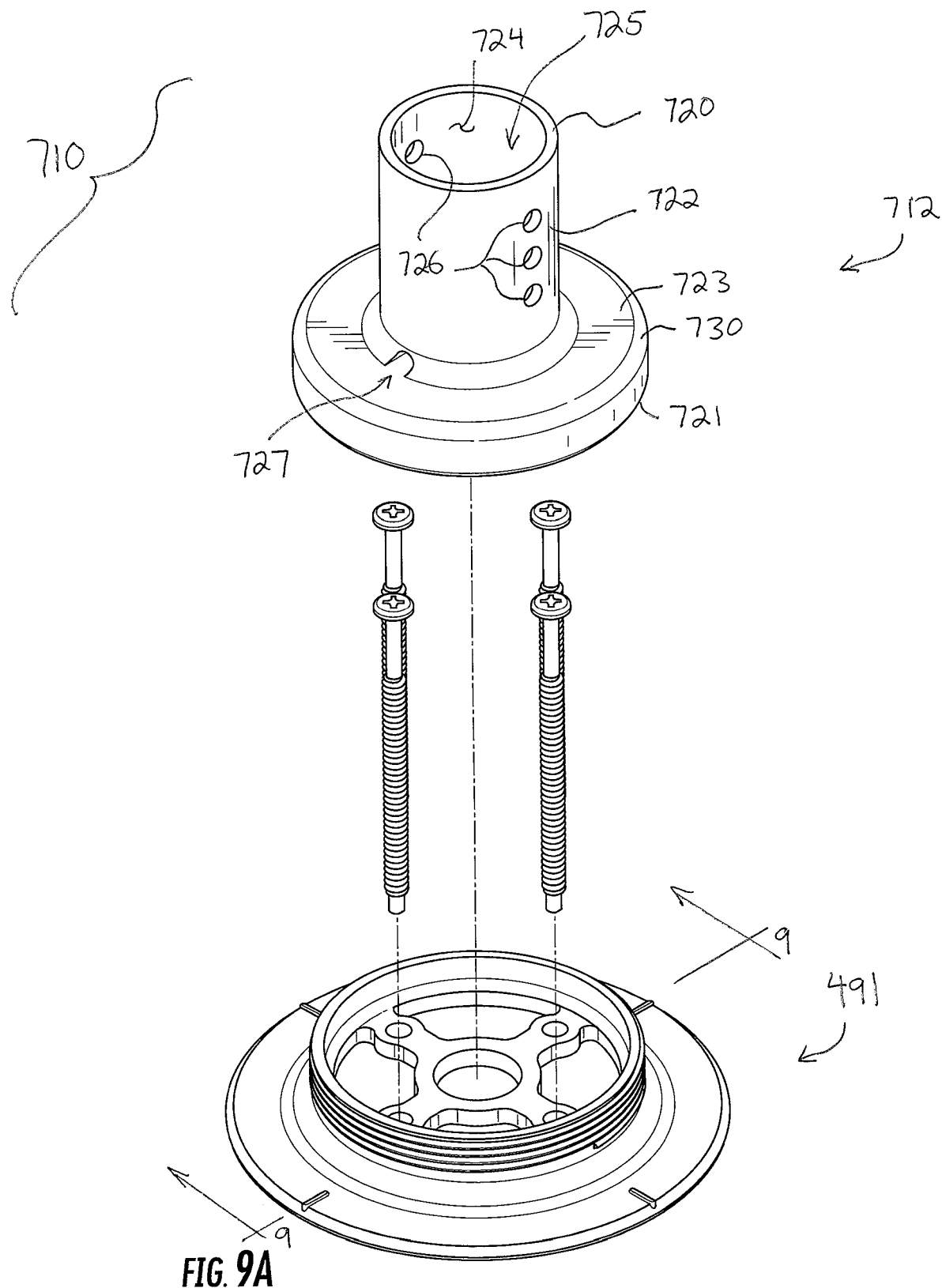
FIGS. 9A and 9B are top and bottom exploded perspective views of a flat roof mounting device.
Figure 9B:
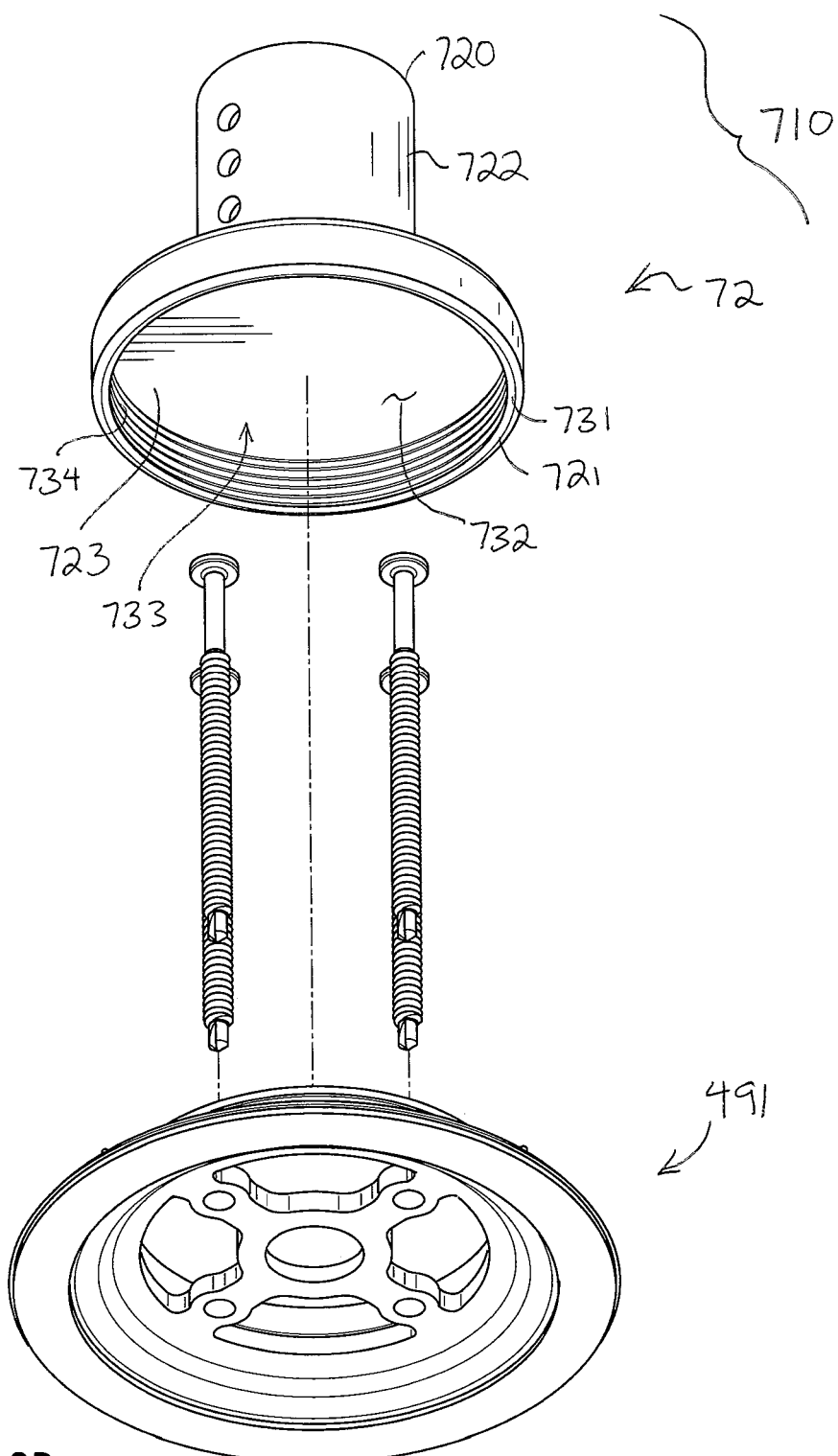
Figure 9C:
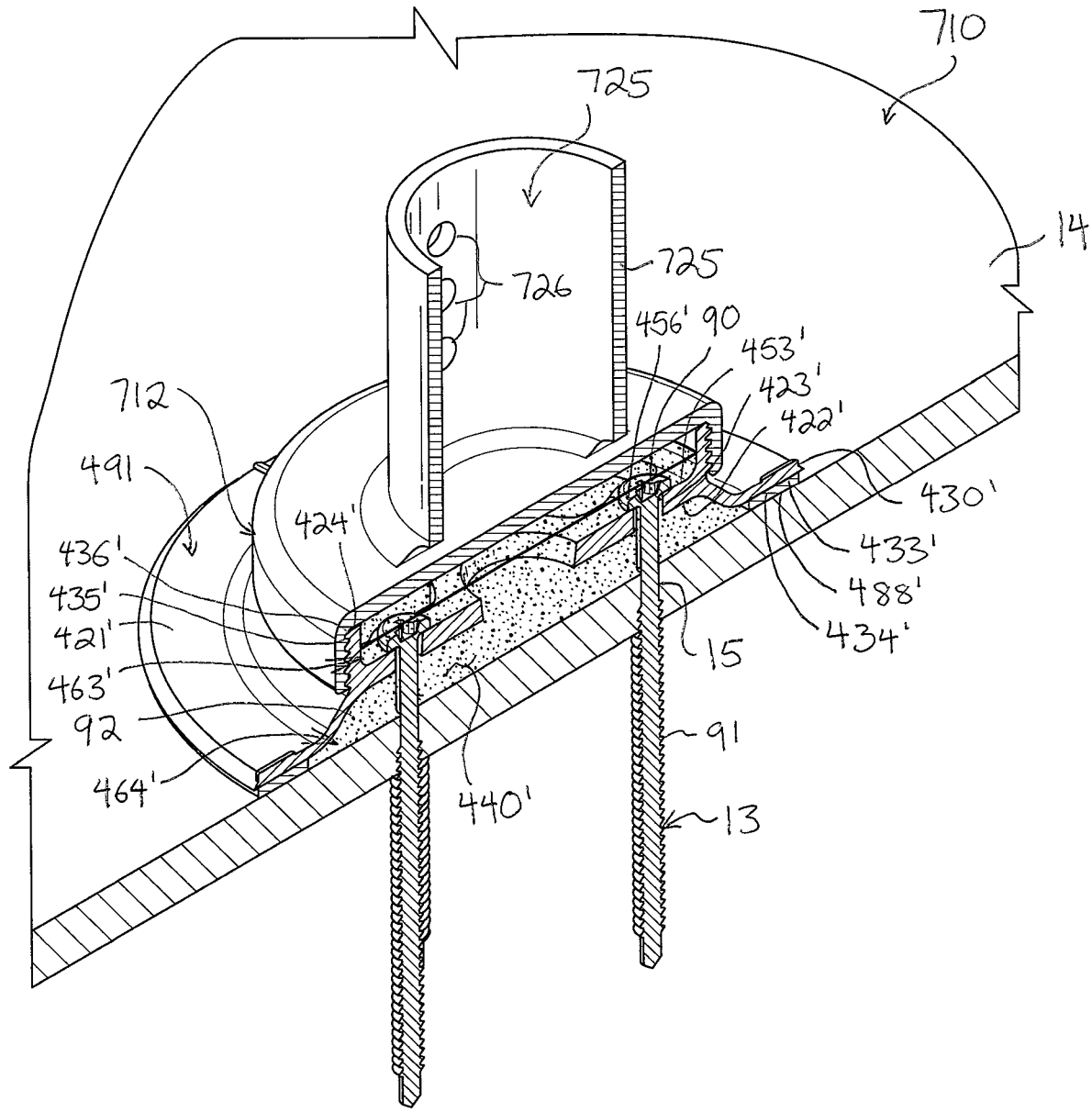
FIG. 9C is a section view taken along the line 9-9 in FIG. 9A, showing the device being applied to a roof.

Embodiment of FIGS. 9A-9C

FIGS. 9A-9C illustrate a flat roof mounting device 710 (hereinafter "the device 710") for covering a roof penetration with a mount. The device 710 has a base 491 and a cap 712; the base 491 is the same base 491 as in the device 490. No additional description of the base 491 is made here, as the reader will already understand the base 491 from its previous description.

The cap 712 is wide, round, and has an upstanding shape. The cap 712 has a top 720, an opposed bottom 721, and a sidewall 722 extending therebetween. Proximate the bottom 721, the sidewall 722 has a wider diameter than it does proximate the top 720, and so the cap 712 has a stepped or dual-diameter shape similar to two concentric cylinders stacked atop one another.

From the top 720, the sidewall 722 is cylindrical and extends downward to a midplane 723. A round opening 724 is defined at the top 720, thereby providing access into an interior 725 defined within the sidewall 722. The interior 725 is open entirely down to the midplane 723, and so the midplane 723 defines an endwall to the interior 725. As such, the interior 725 is blind. Several bores 726 are formed laterally through the sidewall 722; these receive set screws as is explained below. A drain hole 727 is also formed laterally through the sidewall 722 at the bottom of the interior 725 to allow water to drain out of the interior 725.

The midplane 723 is a circular disc between the top 720 and the bottom 721. The midplane 723 extends radially inward from the sidewall 722 to define an endwall to the interior 725, as explained above, and also extends radially outward from the sidewall 722 to a perimeter 730. However, the midplane 723 and sidewall 722 are integrally and monolithically formed to each other; the vertical sidewall 722 transitions into the horizontal midplane 723 continuously, without seam or sever. At the perimeter 730, the sidewall 722 extends downward to form a lip 731. The lip 731 extends downwardly to the bottom 721 where the lip 731 terminates to define a lower opening 732. The lower opening 732 opens into the shallow lower interior 733 beneath the midplane 723. The inner surface of the lip 731 is formed with inwardly-directed threads 734, which correspond to and are complemental with the threads 436' on the wall 435' of the base 491.

Turning now primarily to just FIG. 9C, in operation, the device 710 is useful for providing a mount for a rack on a roof 14 and for sealing a roof penetration 15 which is made through the roof 14 and which is necessary to securely attach the device 710 to the roof 14. The roof penetrations 15 are formed, such as with a drill, through the roof 14 and potentially other roof structures (shingles, underlayment, wood decking, moisture barriers, rafters, and other structures are collectively simplified here as the roof 14). If there are several roof penetrations 15, a pattern is used to ensure each is located properly with respect to the other. Once the roof penetrations 15 are formed, the base 491 is placed atop the roof. The base 491 is aligned so that each bore 423' in a rib 422' is registered with a respective roof penetration 15. The fasteners 13 are then applied to the bores 423'. In other embodiments, the fasteners 13 are self-tapping or self-drilling fasteners, and it is not necessary to drill holes; rather, the base 491 is placed over a desired location on the roof 14 and then the fasteners 13 are applied into the roof 14. Each fastener 13 is threadably engaged with the roof 14 until the head 90 is seated in the seat 456' of the rib 422' and the shank 91 passes below the seat 456' into the roof penetration 15. The head 90 is seated in flush and direct contact with the top 453' of the seat 456', and an unthreaded portion of the shank 91 just below the head 90 fills the bore 423' snugly. When all fasteners 13 are engaged in this manner, the base 491 is securely fixed to the roof 14.

In some embodiments, an o-ring, foam ring, adhesive sealant, or other form of gasket 488' or sealing member is applied to the lower face 433' of the annulus 434' before the base 491 is secured according to the above. This gasket 488' creates a first seal between the base 491 and the roof 14, just inboard from the outer edge 430'. This first seal is effective at preventing water, moisture, and other environmental ingress at the annulus 434'. Use of a gasket 488' is optional, however, and not necessary to ensure an environmental seal between the base 491 and the roof 14.

Once the base 491 is securely fixed to the roof 14, a flowable sealant 92 is applied to the reservoir 440'. The sealant 92 is slowly applied to the reservoir 440' until the sealant 92 nearly reaches the top 424' of the base 491. By slowly filling the sealant 92, the sealant 92 can flow across the portion of the roof 14 covered by the base 491, surrounding the roof penetrations 15. Because the roof penetrations 15 are under the bores 423' in the ribs 422', the roof penetrations 15 are under the ribs 422'. However, the lower cavity 464' defined below the ribs 422' is in fluid communication with, and indeed, forms part of, the reservoir 440', and so sealant 92 moves into the lower cavity 464' and surrounds the fasteners 13 and the roof penetrations 15. The sealant 92 entirely fills the bottom of the reservoir 440', flowing upward from the lower cavity 464' to the upper cavity 463'. This forms an environmental seal between the base 491 and the roof 14 which prevents environmental ingress through the roof 14.

By filling the sealant 92 to just below the top 424', the heads 90 of the fasteners 13 are covered. Because the seats 456' are disposed below the top 424' of the base 491, the seats 456' and the heads 90 and shanks 91 of the fasteners 13 received in them are covered. This increases the surety of the environmental seal. Further, by filling the reservoir with sealant 92 until the heads 90 are covered, the installer performing the work receives visual confirmation: when the heads 90 are no longer visible, the installer can be sure the reservoir 440' is adequately filled.

The installer next registers the cap 712 with the base 491, so that the lip 731 is registered with the wall 435' of the base 491, and then moves the cap 712 downward onto the base 491, rotating the cap 712 so as to threadably engage the threads 734 on the lip 731 with the threads 436' on the base 491. The cap 712 is rotated completely. When the cap 712 is moved onto the base 491, the cap 712 and the perimeter 421' of the base 491 cooperate to form an environmental seal around the roof penetrations 15. The above defines an installed condition of the device 710. This installed condition is sufficient to form the environmental seal over the roof penetrations 15. The cap 712 serves to deflect rain, snow, and other moisture onto the wall 435' and annulus 434', from which it will flow onto the roof 14.

With the cap 712 so positioned, the sidewall 722 is directed normal with respect to the roof 14, and the interior 725 is directed upwardly with the opening 724 accessible above the roof 14. The installer can then apply hardware into the interior 725, fitting it snugly and then securing such hardware in the interior 725 with set screws applied through any or all of the bores 726. Although the embodiment shown in FIGS. 9A-9C illustrates a cylindrical sidewall 722 of the cap 712 defining a cylindrical interior 725 to preferably accept a cylindrical piece of hardware, one having ordinary skill in the art will understand that the sidewall 722 has other shapes and configurations—such as square, rectangular, hexagonal, irregular, etc.—in other embodiments to accept differently-shaped and -sized hardware, and the disclosure is not limited to this cylindrical sidewall 722 embodiment.

Figure 10A:
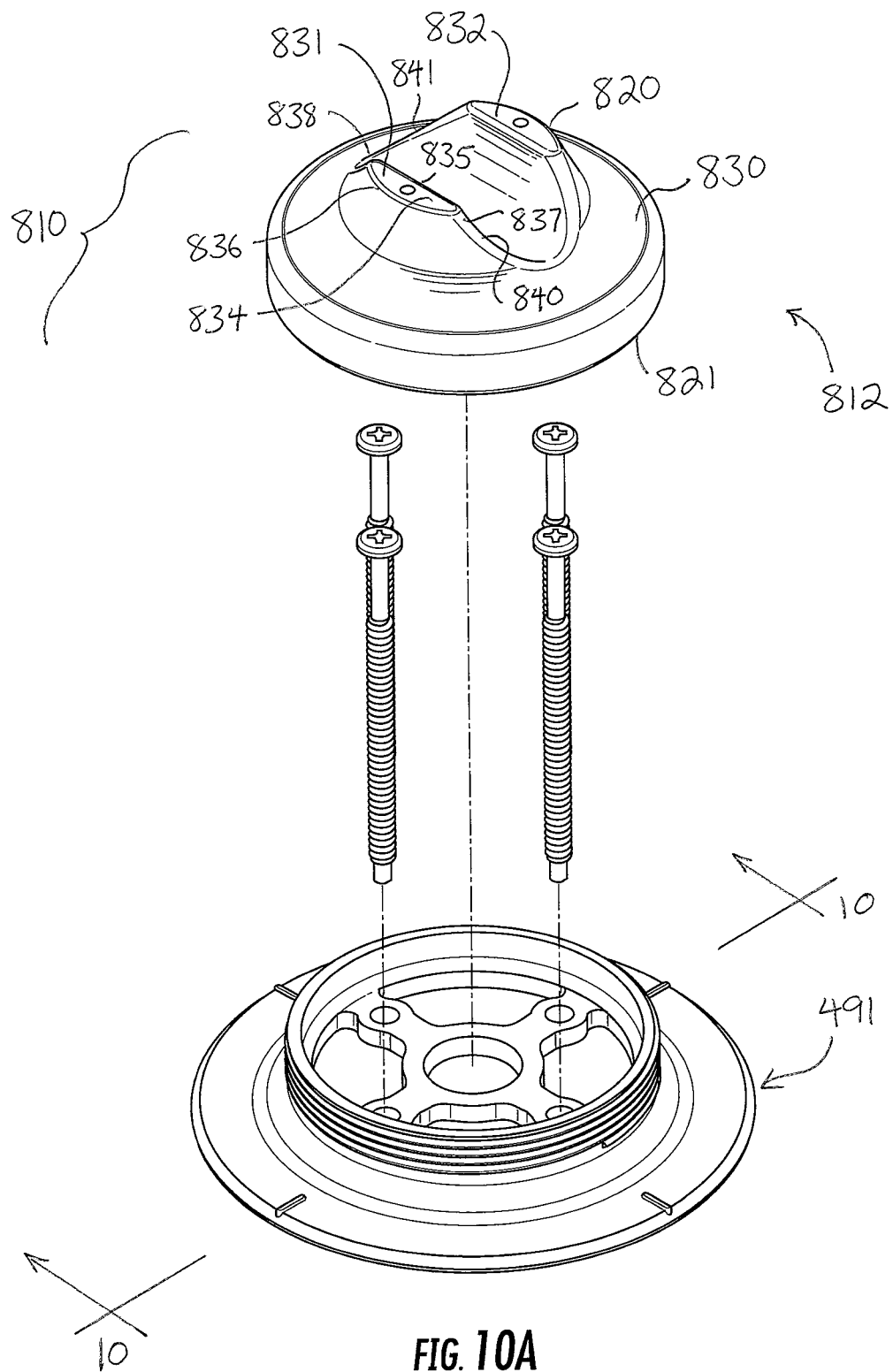
FIGS. 10A and 10B are top and bottom exploded perspective views of a flat roof mounting device.
Figure 10B:
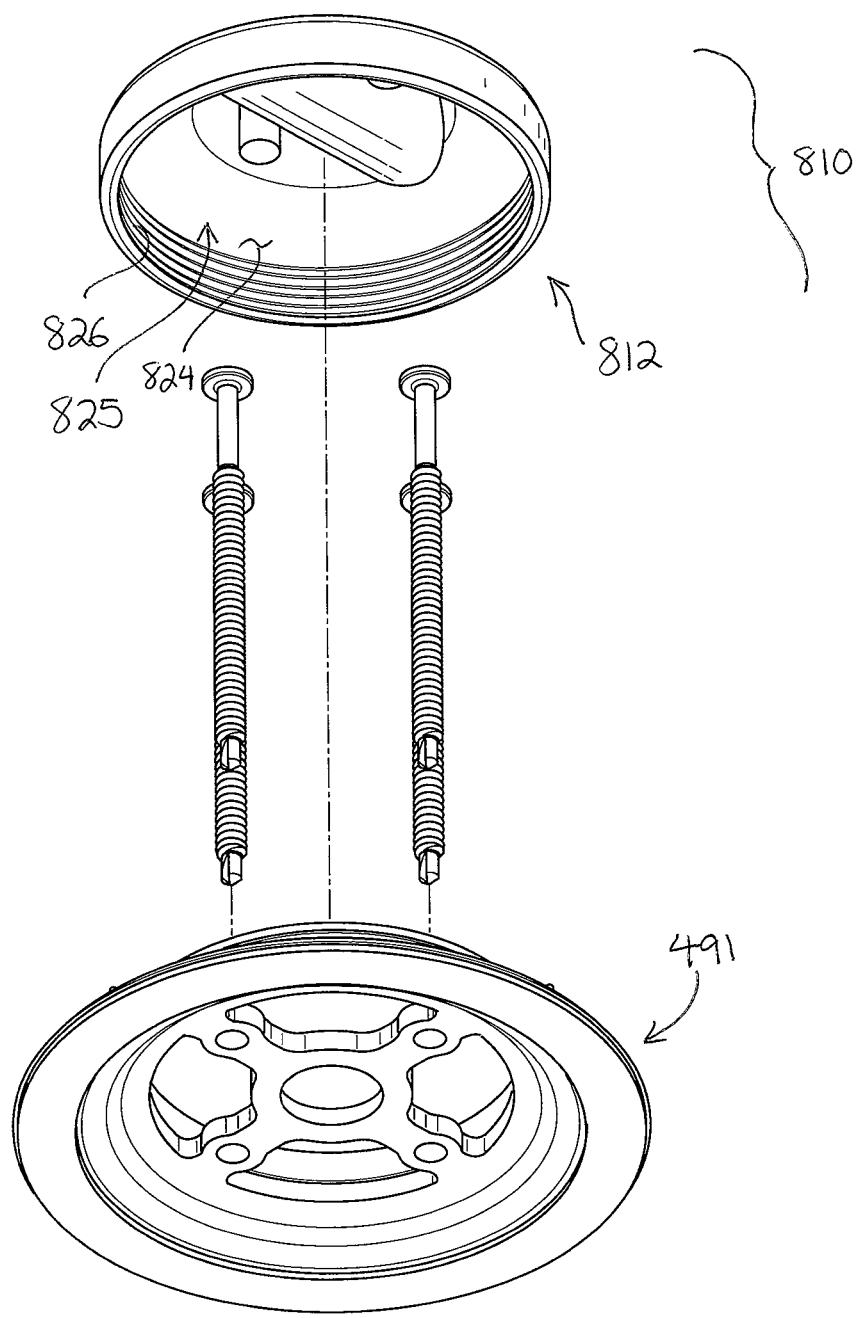
Figure 10C:
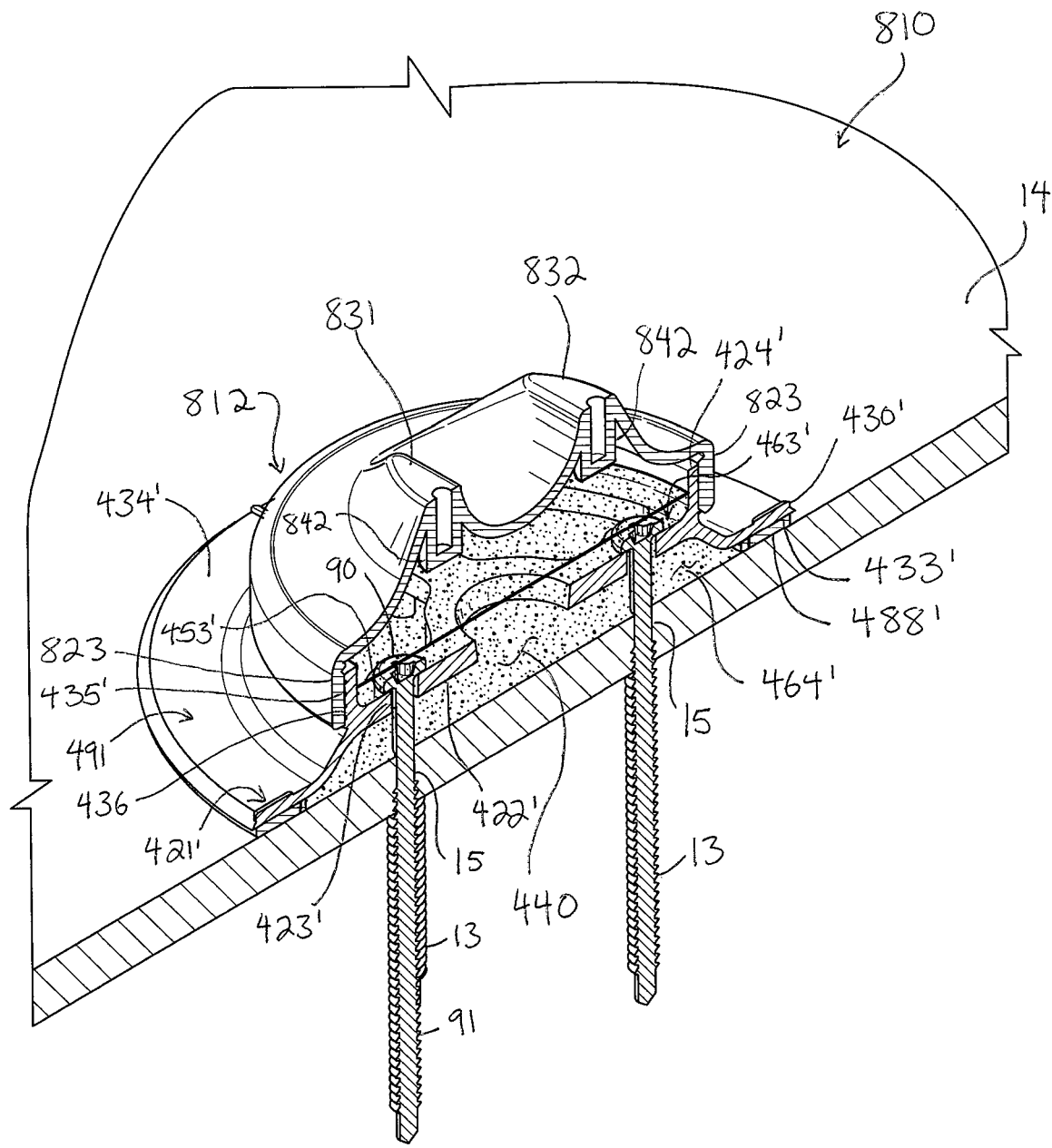
FIG. 10C is a section view taken along the line 10-10 in FIG. 10A, showing the device being applied to a roof.

Embodiment of FIGS. 10A-10C

FIGS. 10A-10C illustrate a flat roof mounting device 810 (hereinafter "the device 810") for covering a roof penetration with a mount. The device 810 has a base 491 and a cap 812; the base 491 is the same base 491 as in the device 490. No additional description of the base 491 is made here, as the reader will already understand the base 491 from its previous description.

The cap 812 is wide and round, structured to accept an embodiment of a mounting hardware. In other embodiments, the cap 812 may have other shapes to accommodate other hardware; such other embodiments are within the scope of this disclosure. The cap 812 has a top 820, an opposed bottom 821, and a sidewall 822 extending therebetween. Proximate the bottom 821, the cap 812 generally has a disc shape. Extending upward from the bottom 821, the sidewall 822 forms an annular lip 823. The lip 823 defines a lower opening 824 into an interior 825 of the cap 812. The inner surface of the lip 823 is formed with inwardly-directed threads 826, which correspond to and are complemental with the threads 436' on the wall 435' of the base 491.

The lip 823 projects upwardly from the bottom 821 to a dome 830. The dome 830 extends radially inwardly and upwardly from the lip 823. The dome 830 is part of the sidewall 822, and as such, is formed integrally and monolithically to the lip 823. The dome 830 includes two raised ridges 831 and 832 and a valley 833 therebetween. The outer surface of the dome 830 has a concave shape between the lip 823 and the ridges 831 and 832, such that the outer surface curves smoothly between the lip 823 and each of the ridges 831 and 832. The ridges 831 and 832 are identical, and as such, only the ridge 831 will be described here with the understanding that the description applies equally to the other ridge 832.

The ridge 832 has a flat top 834 that extends across the top 820 of the cap 812, parallel to the top 820 and bottom 821. The ridge 831 has an inner edge 835, which is straight, and an opposed outer edge 836, which is arcuate and bows outwardly away from the inner edge 835. The outer surface of the dome 830 is continuous with the ridge 831, of course, and as such, the ridge 831 has an outer surface which, below the inner edge 835, is straight, and which, below the outer edge 836, is arcuate and bows outwardly from the inner edge 835. The inner and outer edges 835 and 836 meet and front and rear ends 837 and 838, and extending downward from these, the outer surface defines a forward curved edge 840 and a rearward curved edge 841, respectively. Both of the forward and rearward curved edges 840 slope downward from the ridge 831 toward the lip 823 of the cap 812, and then, arcuately, slope back upward to the opposite ridge 832. The forward and rearward curved edges 840 and 841 mark inflections in the outer surface of the cap 812. Indeed, between the forward and rearward curved edges 840 and 841, the valley 833 extends parallel to the ridges 831 and 832. The valley 833 is a smooth concave depression in the cap 812 between the two ridges 831 and 832 and is sized and shaped to receive mounting hardware for a rack. In other embodiments, the valley 833 has a profile other than a smooth concave depression, such as a rectangular or square channel, to accept different mounting hardware.

Turning to FIG. 10C, blind sockets 842 are formed in the cap 812. These sockets 842 depend inwardly in a transverse direction from the tops 834 of the ridges 831 and 832 to bottoms. The bottoms of the sockets 842 are co-planar to the bottom of the valley 833, all of which are elevated above the top of the lip 823.

Turning now primarily to just FIG. 10C, in operation, the device 810 is useful for providing a mount for a rack on a roof 14 and for sealing roof penetrations 15 which are made through the roof 14 and which are necessary to securely attach the device 810 to the roof 14. The roof penetrations 15 are formed, such as with a drill, through the roof 14 and potentially other roof structures (shingles, underlayment, wood decking, moisture barriers, rafters, and other structures are collectively simplified here as the roof 14). If there are several roof penetrations 15, a pattern is used to ensure each is located properly with respect to the other. Once the roof penetrations 15 are formed, the base 491 is placed atop the roof. The base 491 is aligned so that each bore 423' in a rib 422' is registered with a respective roof penetration 15. The fasteners 13 are then applied to the bores 423'. In other embodiments, the fasteners 13 are self-tapping or self-drilling fasteners, and it is not necessary to drill holes; rather, the base 491 is placed over a desired location on the roof 14 and then the fasteners 13 are applied into the roof 14. Each fastener 13 is threadably engaged with the roof 14 until the head 90 is seated in the seat 456' of the rib 422' and the shank 91 passes below the seat 456' into the roof penetration 15. The head 90 is seated in flush and direct contact with the top 453' of the seat 456', and an unthreaded portion of the shank 91 just below the head 90 fills the bore 423' snugly. When all fasteners 13 are engaged in this manner, the base 491 is securely fixed to the roof 14.

In some embodiments, an o-ring, foam ring, adhesive sealant, or other form of gasket 488' or sealing member is applied to the lower face 433' of the annulus 434' before the base 491 is secured according to the above. This gasket 488' creates a first seal between the base 491 and the roof 14, just inboard from the outer edge 430'. This first seal is effective at preventing water, moisture, and other environmental ingress at the annulus 434'. Use of a gasket 488' is optional, however, and not necessary to ensure an environmental seal between the base 491 and the roof 14.

Once the base 491 is securely fixed to the roof 14, a flowable sealant 92 is applied to the reservoir 440'. The sealant 92 is slowly applied to the reservoir 440' until the sealant 92 nearly reaches the top 424' of the base 491. By slowly filling the sealant 92, the sealant 92 can flow across the portion of the roof 14 covered by the base 491, surrounding the roof penetrations 15. Because the roof penetrations 15 are under the bores 423' in the ribs 422', the roof penetrations 15 are under the ribs 422'. However, the lower cavity 464' defined below the ribs 422' is in fluid communication with, and indeed, forms part of, the reservoir 440', and so sealant 92 moves into the lower cavity 464' and surrounds the fasteners 13 and the roof penetrations 15. The sealant 92 entirely fills the bottom of the reservoir 440', flowing upward from the lower cavity 464' to the upper cavity 463'. This forms an environmental seal between the base 491 and the roof 14 which prevents environmental ingress through the roof 14.

By filling the sealant 92 to just below the top 424', the heads 90 of the fasteners 13 are covered. Because the seats 456' are disposed below the top 424' of the base 491, the seats 456' and the heads 90 and shanks 91 of the fasteners 13 received in them are covered. This increases the surety of the environmental seal. Further, by filling the reservoir with sealant 92 until the heads 90 are covered, the installer performing the work receives visual confirmation: when the heads 90 are no longer visible, the installer can be sure the reservoir 440' is adequately filled.

The installer next registers the cap 812 with the base 491, so that the lip 823 is registered with the wall 435' of the base 491, and then moves the cap 812 downward onto the base 491, rotating the cap 812 so as to threadably engage the threads 826 on the lip 823 with the threads 436' on the base 491. The cap 812 is rotated completely. When the cap 812 is moved onto the base 491, the cap 812 and the perimeter 421' of the base 491 cooperate to form an environmental seal around the roof penetrations 15. The above defines an installed condition of the device 810. This installed condition is sufficient to form the environmental seal over the roof penetrations 15. The cap 812 serves to deflect rain, snow, and other moisture onto the wall 435' and annulus 434', from which it will flow onto the roof 14.

With the cap 812 so positioned, the valley 833 is oriented parallel to the roof 14, with the ridges 831 and 832 flanking the valley 833. The valley 833 is available to received rack mounting hardware which can be placed into the valley 833 and then secured with fasteners applied to the sockets 842 in each of the ridges 831 and 832. The ridges 831 and 832 flank the hardware placed into the valley 833 and prevent movement of such hardware in the valley 833.

Embodiment of FIGS. 11A-11F

Figure 11A:
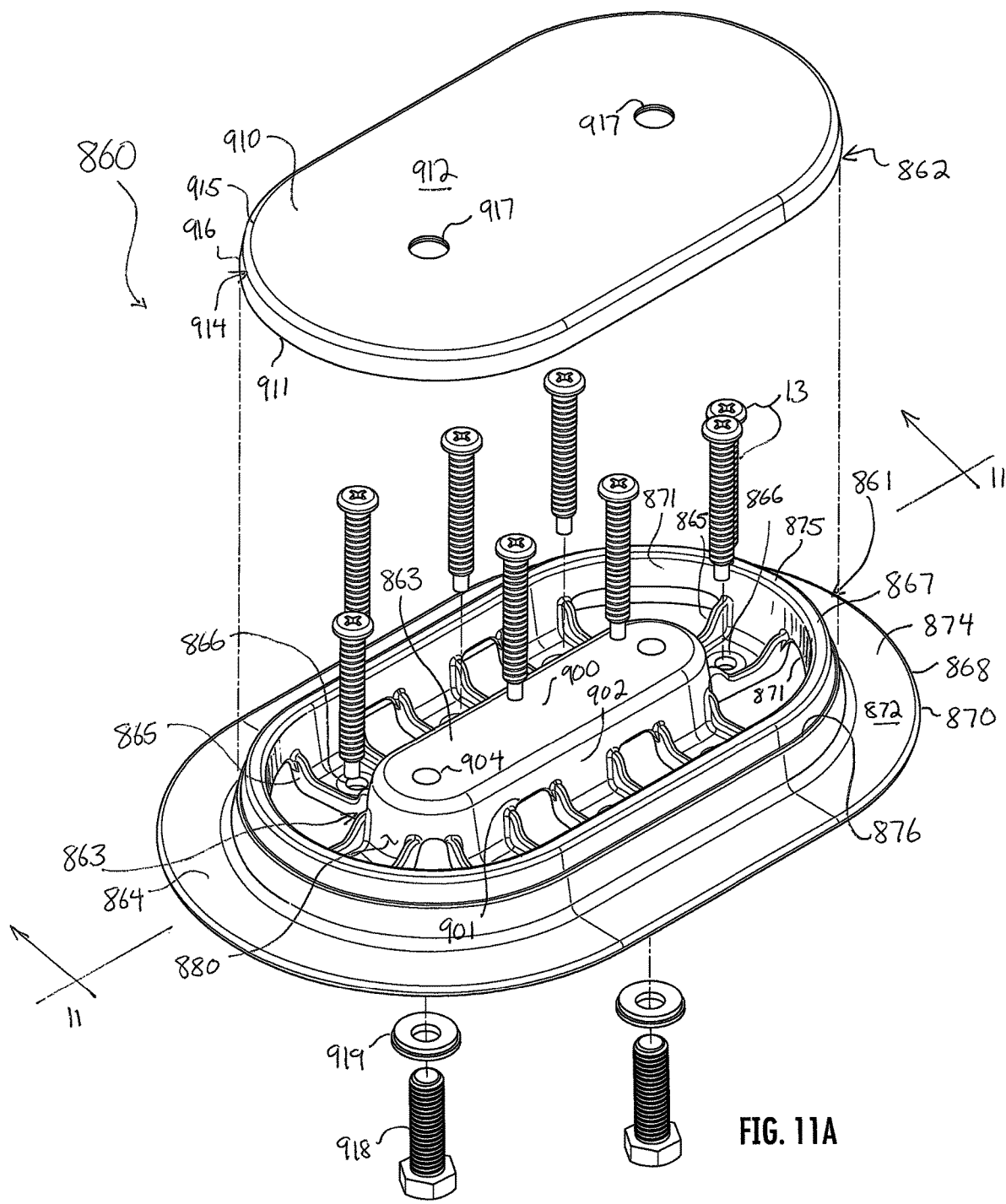
FIGS. 11A and 11B are top and bottom exploded perspective views of a flat roof mounting device.

FIG. 11A illustrates a flat roof mounting device 860 (hereinafter "the device 860") for covering a roof penetration with a mount, the device 860 including a base 861 and a cap 862 moveable onto the base 861 for forming an environmental seal around the roof penetration. The device 860 is a mount for a rack, framework, or other apparatus carrying equipment such as a solar panel array (hereinafter identified as a "rack").

The base 861 is wide, elongate, oblong or oval, and has a low profile. The base 861 includes a hub 863 and an outer perimeter structure 864 coaxially encircling the hub 863. The hub 863 and perimeter structure 864 are connected, or coupled, to each other by a plurality of ribs 865 extending outward from the hub 863 to the perimeter structure 864. Each rib 865 is formed with a bore 866 through which a fastener 13 is passed and secured into the roof, so as to securely fix the base 861 to the roof. The hub 863, perimeter structure 864, and ribs 865 are preferably formed integrally and monolithically, from a single piece of material having strong, rugged, durable, and rigid material characteristics. When the low base 861 is applied over the roof penetration and the fasteners 13 are passed through the bores 866 such that their heads are seated against the ribs 865, the base 861 is securely mounted to the roof at the roof penetration. With the base 861 securely mounted to the roof, the base 861 is a stable, secure, and strong mount for the rack.

The base has a top 867 and an opposed bottom 868; the bottom 868 is mounted on the roof and the top 867 is directed away from the roof. Both the top 867 and bottom 868 are open, that is to say, openings are formed at both the top 867 and bottom 868. It is noted briefly here that, while the description may refer to "a roof penetration," the embodiment of FIGS. 11A-11F actually has several roof penetrations—one for each of eight fasteners 13. However, in some embodiments, only a single penetration may be made or used (and so only a single fastener 13 may be used), while in other cases only two or three penetrations through the roof may be made or used. The phrase "roof penetration" is therefore meant to include single and multiple penetrations through a roof in a local area, such as under the footprint of one device 860. Moreover, the embodiment shown in FIGS. 11A-11F has eight bores 866 in eight ribs 865, but other embodiments have a fewer or greater number of bores 866 through a fewer or greater number of ribs 865.

Figure 11B:
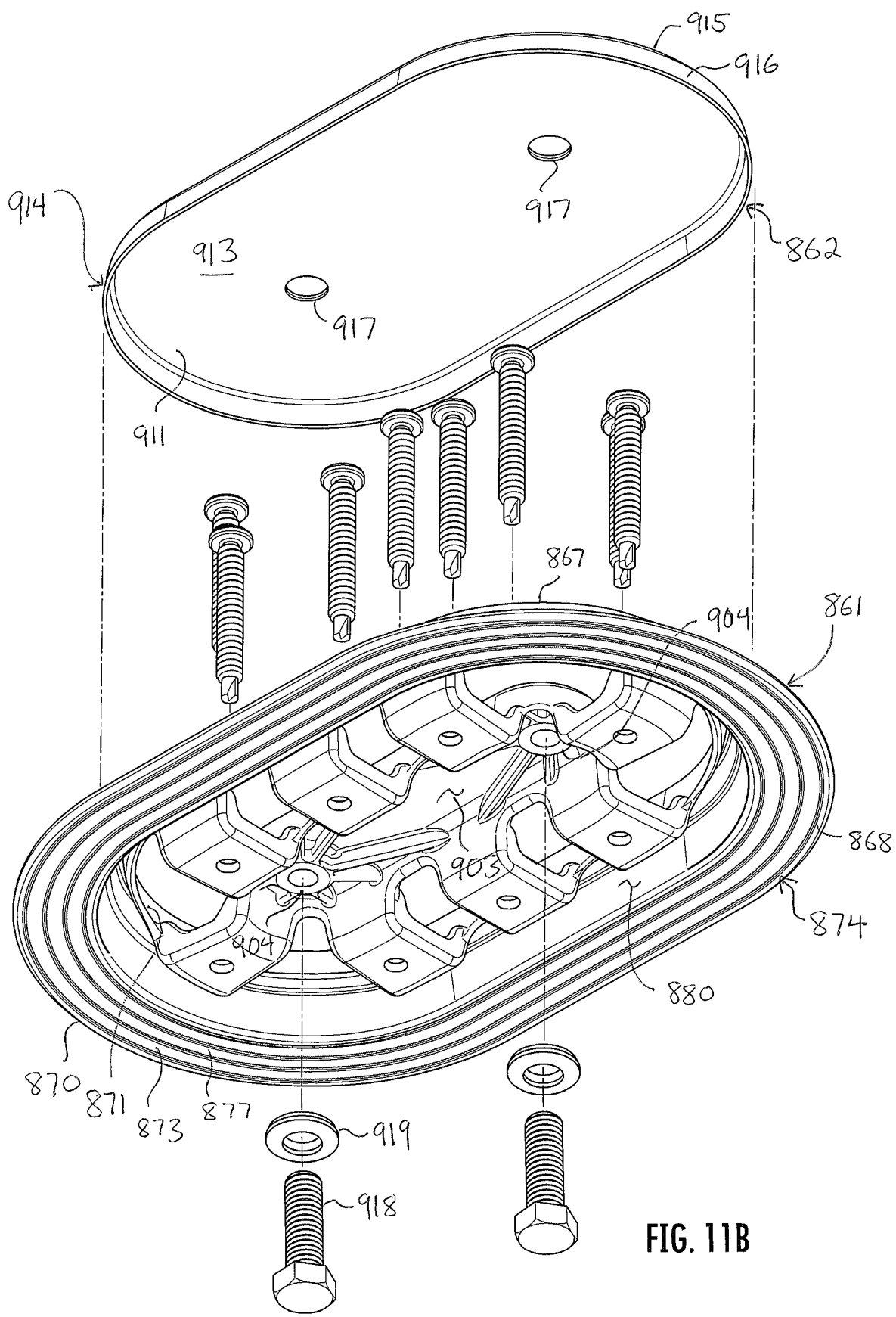

Referring now primarily to FIGS. 11A and 11B, like the base 861, the perimeter structure 864 is wide, elongate, oblong or oval, and has a low profile. The perimeter structure 864 has an outer edge 870 and an opposed inner edge 871, both of which are oval in the embodiment shown in FIGS. 11A-11F. The outer edge 870 is an outwardly-directed annular edge, while the inner edge 871 is an upstanding flat edge or wall. The perimeter structure 864 also has an upper face 872 and an opposed lower face 873. The upper and lower faces 872 and 873 meet at the outer and inner edges 870 and 871. The perimeter structure 864 includes a flat, oval annulus 874 or ring extending inwardly from the outer edge 870 and along a plane at the bottom 868 of the base 861. The annulus 874 terminates at an upstanding ridge 875; the ridge 875 rises obliquely from the annulus 874 toward the top 867 of the base 861 at the inner edge 871. The upper face 872 has several differently-angled pitches, and approximately halfway up the upper face 872, the upper face 872 is formed with an inset seat 876. The seat 876 is an annular shoulder extending into the ridge 875 from the upper face 872 thereof; the seat 876 is sized and shaped to snugly receive the cap 862 when applied to the base 861. The upper face 872 continues upward from the seat 876. The inner edge 871 extends vertically downward toward, but not entirely to, the bottom 868 of the base, generally perpendicular to the plane at the bottom 868.

Figure 11C:
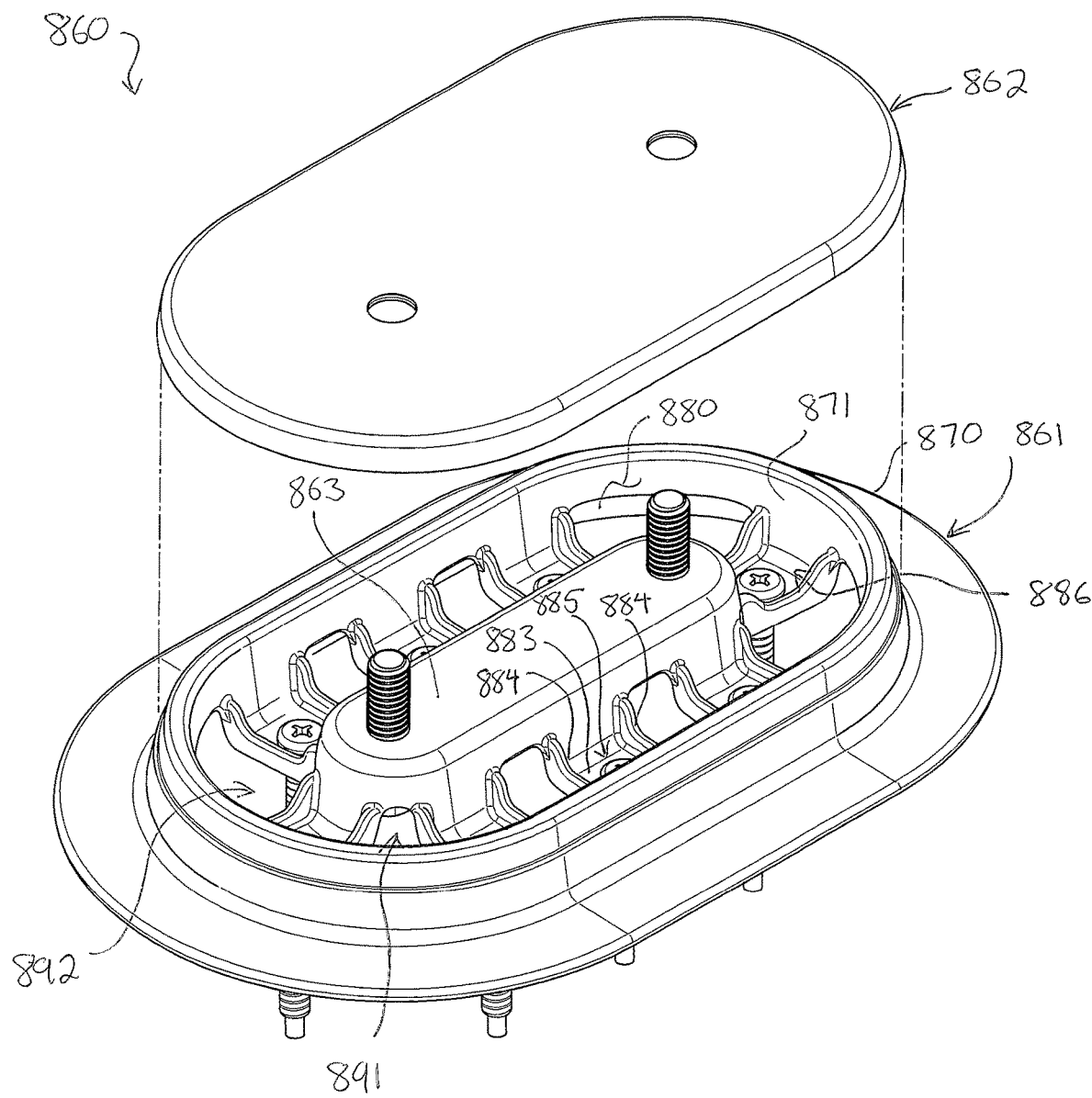
FIG. 11C is a top perspective view of the flat roof mounting device of FIG. 11A.
Figure 11D:
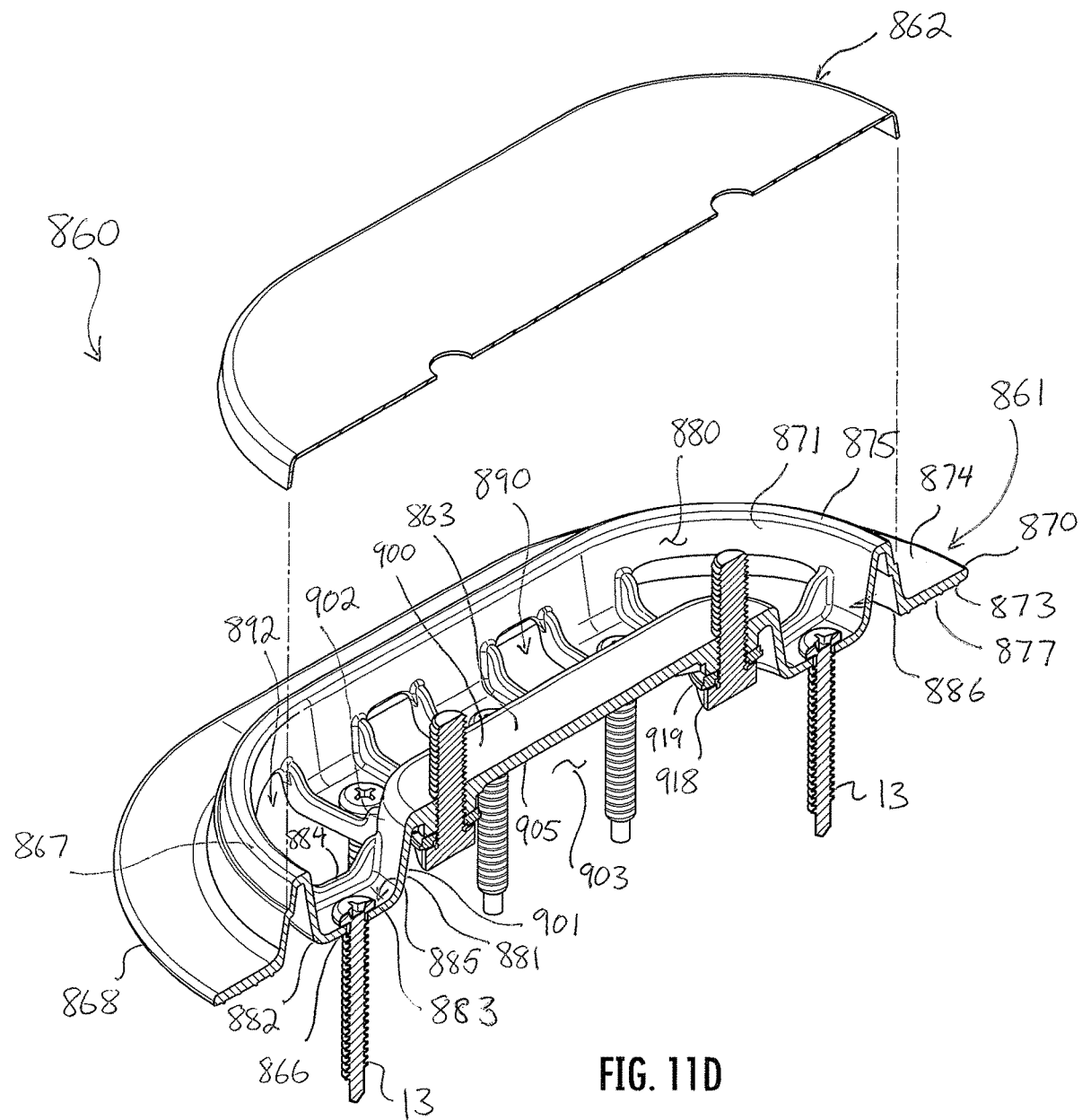

Referring to FIG. 11D and to FIG. 11B, where the underside of the base 861 is illustrated well, the base 861 is partially hollow. The lower face 873 of the base 861 is contoured and is interrupted by several downwardly-projecting concentrically-spaced apart ridges. At the annulus 874, proximate the outer edge 870, the lower face 873 is flat. Just slightly inboard of the outer edge 870, however, the flat lower face 873 is interrupted by a coaxial channel 877 extending upward into the base 861. The channel 877 has a generally rectangular cross-section (though other shapes may be suitable) for receiving an o-ring, foam ring, adhesive sealant, or other form of gasket or sealing member to be compressed between the base 861 and the roof. The lower face 873 extends from the channel 877, along the plane at the bottom 868, to the underside of the upstanding ridge 875, at which point the lower face 873 rises upward toward the top 867 of the base 861. The lower face 873 then drops back down toward the bottom 868 along the inner edge 871. The inner edge 871 extends downwardly and slightly inwardly, from the top 867 of the base 861 toward the bottom 868 of the base 861, but it stops above the bottom 8768. The inner edge 871 projects downwardly from the top 867 to approximately two-thirds of the distance between the top 867 and the bottom 868.

A hold 880 extends throughout the base 861, bound by the contours of the perimeter structure 864 and the top and bottom 867 and 868 of the base 861. The hold 880 is an inner space of the base 861, and is hereinafter identified as a reservoir 880 with respect to this embodiment because, when the device 860 is applied to a roof structure, the hold 880 cooperates with the roof structure to define a reservoir 880 configured to receive, hold, and contain a flowable sealant applied thereto. As such, the hold 880 is the reservoir 880. Indeed, in all embodiments presented herein, the hold is a reservoir and will be referred to as such. The reservoir 880 is open to both the top 867 and the bottom 868 of the base 861, and it extends between the hub 863 and the perimeter structure 864, extends under the hub 863, and is unsevered by the ribs 865. In operation, as discussed below, the reservoir 880 is filled with the flowable sealant to ensure an environmental seal against the roof and around the roof penetration.

The perimeter structure 864 is formed integrally and monolithically to each of the ribs 865. Turning now to FIGS. 11C and 11D, eight ribs 865 are visible. The device 860 preferably has eight ribs 865, as shown in these drawings, but may suitably have a fewer or greater number of ribs 865 depending on the needs of the application. Moreover, the ribs 865 are identical in structure (though different in size, location, and orientation) and so discussion of the various structural elements and features of the ribs 865 will be made without reference to one rib 865 in particular, and the reader should understand that the discussion applies to all the ribs 865 equally.

The rib 865 has an inner end 881 proximate the hub 863 and an opposed outer end 882 proximate the perimeter structure 864. The rib 865 includes a web 883 projecting outward from the inner end 881 toward the outer end 882. The web 883 is wide, thin, bends slightly downward at both the inner and outer ends 881 and 882, and is flat therebetween. Upstanding flanges 884 flank the opposed lateral sides of the web 883. The flanges 884 extend along the entire length of the web 883 and project above the web 883, thereby defining a seat 885 in the web 883 between the opposed flanges 884.

The seat 885 is configured to receive a fastener 13. The seat 885 has a flat top on top of the web 883 and a flat bottom on the underside of the web 883. Formed centrally and entirely through the seat 885 from the top to the bottom is the bore 866 mentioned previously. The bore 866 is preferably a cylindrical, unthreaded hole formed transversely through the seat 885. The fastener 13 passes through the bore 866 to secure the device 860 at a roof penetration, and when fully seated, the head of the fastener 13 bears against the seat 885. The seat 885 extends nearly entirely from the inner end 881 to the outer end 882 of the rib 865. The outer end 882 is formed continuously to the inner edge 871 of the perimeter structure 864. Thus, the rib 865, extending from the inner end 881, through the seat 885, and extending finally to the outer end 882, is a single form, connected integrally and monolithically to both the hub 863 and the perimeter structure 864. The flanges 884 provide structural integrity and rigidity to the rib 865, such that the hub 863 and perimeter structure 864 are rigidly connected to each other.

Referring still to FIGS. 11C and 11D, the rib 865 is disposed within the reservoir 880, below the top 867 of the base 861 and below the top of the hub 863. Likewise, the seat 885 is below the top 867 of the base 861, below the top of the hub 863, and below an underside 905 of the hub 863. Since the structure of the rib 865 descends from proximate the hub 863 to the seat 885, the entirety of the rib 865 is below the open top 867 of the base 861. With the rib 865 disposed apart from the open top 867, a cavity 886 is defined above the rib 865. The bottom of the rib 865 is flush, or planar with the bottom 868 of the base 861. The cavity 886 above the rib 865 forms part of the reservoir 880. In this way, the rib 865 does not sever the reservoir 880, because the rib 865 does not separate the reservoir 880 into separate portions or parts among which the sealant cannot flow. Rather, the sealant can flow through the entire reservoir 880 despite the ribs 865, because the ribs 865 do not sever the reservoir 880.

The ribs 865 do, however, sever the perimeter structure 864 in a way. The ribs 865 are spaced apart from each other by gaps 890. The ribs 865 extend generally radially outward from the hub 863, but because the hub 863 in this embodiment is oblong or oval, some of the ribs 865 are generally parallel to each other and some are generally transverse. As such, the gaps 890 between some of the ribs 865 are generally rectangular (such as those between two ribs 865 projecting from a common side of the hub 863) while other are generally quarter-circular (such as those between one side of the hub 863 and one end of the hub 863). These gaps 890 extend between the hub 863 and the perimeter structure 864 and extend upward into both. As such, the gaps 890 define notches 891 and 892 in the hub 863 and perimeter structure 864, respectively. The notch 891 in the hub 863 is an erosion of the lower edge of the hub 863, and the notch 892 in the perimeter structure 864 is an erosion of the inner edge 871 upward. The notches 891 and 892 eroded those structures to a point just higher than the location at which the ribs 865 are formed to each. The notches 891 and 892 prevent, in part, the inner edge 871 from separating the reservoir 880 into concentric, isolated rings. The notches 891 and 892 also allow sealant to flow radially through the entire reservoir 880 without interruption.

The ribs 865 extend outwardly from the hub 863. In embodiments such as this one shown here, in which the hub 863 is oblong or oval, the ribs 865 are normal to the surface of the hub 863 from which they extend. Referring to FIGS. 11A and 11D, the hub 863 is located centrally with respect to the perimeter structure 864. The hub 863 is hollow, formed as an upstanding protrusion or projection. The hub 863 has a top 900, an opposed bottom 901, an outer cylindrical sidewall 902 extending between the top 900 and bottom 901, and an underside 905 just opposite the top 900. The inner end 881 of each rib 865 is formed to the outer sidewall 902. The sidewall 902 has a slight taper to it, so that the sidewall 902 is slightly reduced in outer dimension proximate the top 900 compared to proximate the bottom 901. The top 900 of the hub 863 is coplanar with the top of the upstanding ridge 875, and these two tops are coplanar with the open top 867 of the base 861.

Because the hub 863 is a projection, it is hollow and defines an interior space 903 underneath the hub 863, bound primarily by the underside 905 and the sidewall 902. This interior space 903 is part of the reservoir 880. The top 900 is flat, smooth, and planar. Two threaded bores 904 are formed through the top 900, at opposed ends of the hub 863, each roughly in the geometric center of the arcuate, semi-circular ends of the hub 863. The bores 904 extend through the top 900, normal to the flat top 900, and connect to the interior space 903. When the cap 862 is placed over the base 861, the bores 904 are registered with holes in the cap 862.

Referring now to FIGS. 11A and 11B, the cap 862 is elongate, oblong or oval, and has a very low-profile dome shape. The cap 862 has a top 910 and an opposed bottom 911, and opposed upper and lower surfaces 912 and 913. The cap 862 is thin between the upper and lower surfaces 912 and 913, defining a shell. The upper surface 912 is convex, and the lower surface 913 is concave, because the cap 862 curves downward from the flat top 910 to an annular, downwardly-projecting lip 914 at the bottom 911. The lip 914 also defines the outer edge of the cap 862 at its outer dimension. The lip 914 includes an inner first pitch 915 and an outer second pitch 916; the second pitch 916 is steeper than the first pitch 915.

Two holes 917 are spaced apart on the cap 862 at opposed ends thereof. The holes 917 are formed entirely through the cap 862 from the upper surface 912 to the lower surface 913. The holes 917 are located at opposed ends of the cap 862, such that when the cap 862 is moved onto the base 861, the holes 917 are registered with the threaded bores 904 in the hub 863. This allows a rugged bolt 918 (with a washer 919) to be passed, from below, through each threaded bore 904 in the hub 863 and then upward through the holes 917 in the cap 862 when the device 860 is used.

Figure 11E:
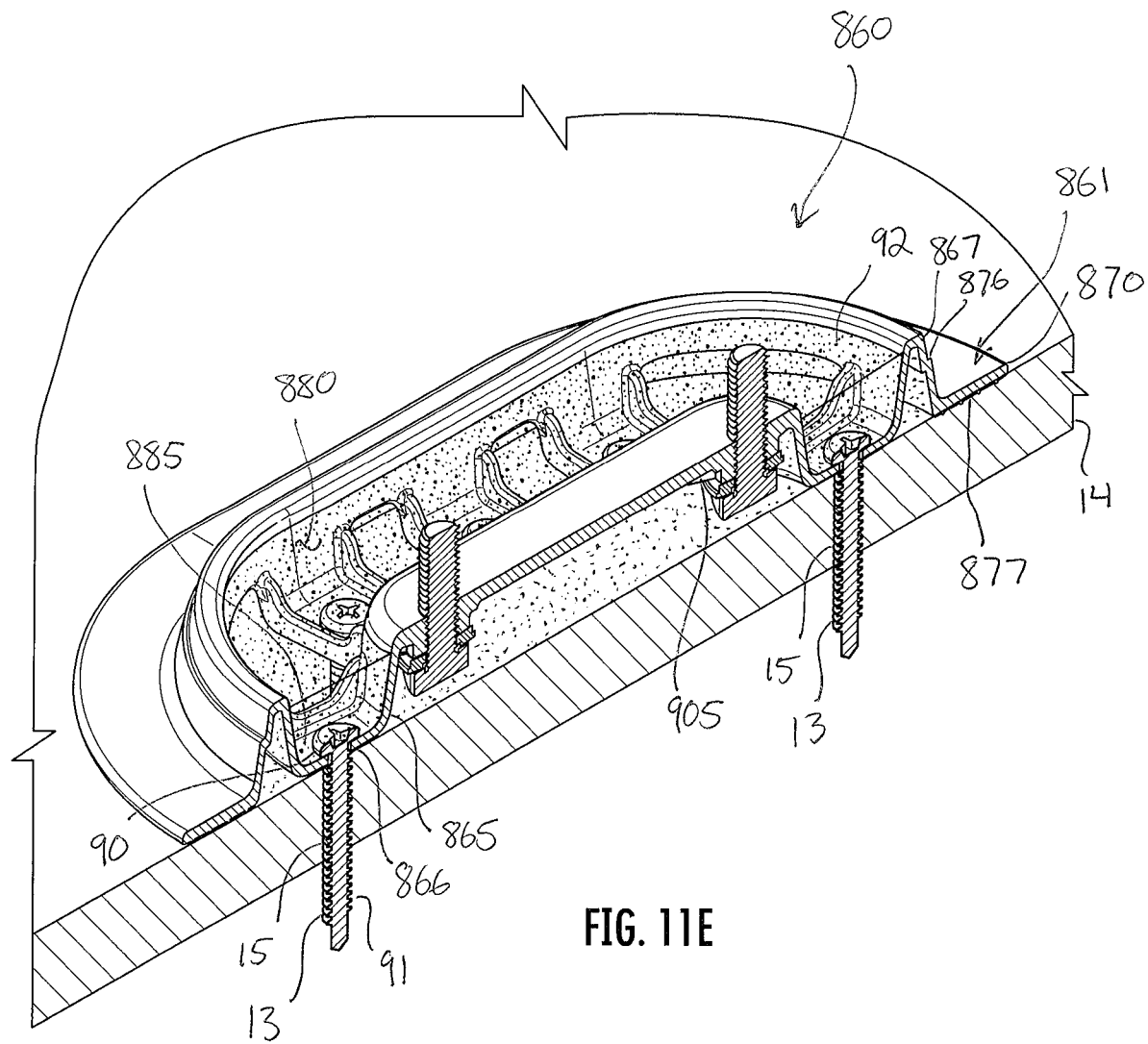

Turning now to FIGS. 11D-11F, in operation, the device 860 is useful for providing a mount for a rack on a roof 14 and for sealing a roof penetration 15 made through the roof 14, which are necessary to securely attach the device 860 to the roof 14. The roof penetrations 15 are formed, such as with a drill, through the roof 14 and potentially other roof structures (shingles, underlayment, wood decking, moisture barriers, rafters, and other structures are collectively simplified here as the roof 14). If there are several roof penetrations 15, a pattern is used to ensure each is located properly with respect to the other.

Once the roof penetrations 15 are formed, the base 861 is prepared. The fasteners 13 may be passed initially through the bores 866 in the ribs 865 or may be passed later once the base 861 is on the roof 14. However, before the base 861 is placed onto the roof 14, the bolts 918 are applied to the threaded bores 904 in the hub 863. The washers 919 are fit onto the shanks of the bolts 918, the bolts 918 are inverted, and the bolts 918 are threadably engaged from below the hub 863. When fully applied against the underside 905 of the hub 863, the washers 919 and the heads of the bolts 918 are maintained in the interior space 903 within the hub 863, and the shanks of the bolts 918 project upward above the top 900 of the hub 863.

The base 861 is then placed atop the roof, as in FIG. 11E. The base 861 is aligned so that each bore 866 in a rib 865 is registered with a respective roof penetration 15. The fasteners 13 are then applied to the bores 866. In other embodiments, the fasteners 13 are self-tapping or self-drilling fasteners, and it is not necessary to drill holes; rather, the base 861 is placed over a desired location on the roof 14 and then the fasteners 13 are applied into the roof 14. Each fastener 13 has a head 90 and a long shank 91. Each fastener 13 is threadably engaged with the roof 14 until the head 90 is seated in the seat 885 of the rib 865 and the shank 91 passes below the seat 885, penetrating the roof 14 and forming into the roof penetration 15. The head 90 is seated in flush and direct contact with the top of the seat 885, and an unthreaded portion of the shank 91 just below the head 90 fills the bore 866 snugly. When all fasteners 13 are engaged in this manner, the base 861 is securely fixed to the roof 14.

In some embodiments, an o-ring, foam ring, adhesive sealant, or other form of gasket or sealing member is applied to the channel 877 on the underside of the base 861 before the base 861 is secured according to the above. This gasket creates a first seal between the base 861 and the roof 14, just inboard from the outer edge 870. This first seal is effective at preventing water, moisture, and other environmental ingress at the annulus 874. Use of a gasket is optional, however, and not necessary to ensure an environmental seal between the base 861 and the roof 14.

Once the base 861 is securely fixed to the roof 14, a flowable sealant 92 is applied to the reservoir 880. The sealant 92 is slowly applied to the reservoir 880 until the sealant 92 nearly reaches the top 867 of the base 861. By slowly filling the sealant 92, the sealant 92 can flow across the portion of the roof 14 covered by the base 861, surrounding the roof penetrations 15. Because the roof penetrations 15 are under the bores 866 in the ribs 865, the roof penetrations 15 are under the ribs 865. However, as shown in FIG. 11E, the ribs 865 lie in flat, direct, and continuous contact with the roof 14. Once the sealant moves into the cavities 886 above the ribs 865 and surrounds the fasteners 13 and the seats 876, the sealant 92 entirely fills the bottom of the reservoir 880 to form an environmental seal between the base 861 and the roof 14 which prevents environmental ingress through the roof 14.

By filling the sealant 92 to just below the top 867 of the base 861, the heads 90 of the fasteners 13 are covered. Because the seats 885 are disposed below the top 867 of the base 861, the seats 885 and the heads 90 of the fasteners 13 received in them are covered. This increases the surety of the environmental seal. Further, by filling the reservoir with sealant 92 until the heads 90 are covered, the installer performing the work receives visual confirmation: when the heads 90 are no longer visible, the installer can be sure the reservoir 880 is adequately filled to have formed the environmental seal.

The above defines an installed condition of the device 860. This installed condition is sufficient to form an environmental seal over the roof penetrations 15. Though not preferred, some installers may choose to apply the bolt 918 to the hub 863 and then immediately begin installing racks. However, an additional step may also preferably be completed. FIG. 11F illustrates the cap 862 applied to the base 861. The installer registers the cap 862 with the base 861, so that the lip 914 is registered with the seat 876 by the top of the ridge 875 of the base 861, and then moves the cap 862 downward onto the base 861 so that the lip 914 is snugly received in the seat 876. With this movement, the shanks of the upstanding bolts 918 also pass through the holes 917. When a nut is engaged to the bolt 918, or when the rack or other hardware is secured on the bolt 918, the bolt 918 is tightened, the cap 862 is compressed onto the base 861, and the lip 914 and seat 876 form an environmental seal preventing moisture and other ingress into the device 860. Of course, the installer can also simply press the cap 862 down onto the base 861 to form the environmental seal. The cap 862 also serves to deflect rain, snow, and other moisture onto the ridge 875 and annulus 874, from which it will flow onto the roof 14. In these ways, when the cap 862 is moved onto the base 861, the cap 862 and the perimeter structure 864 of the base 861 cooperate to form an environmental seal around the roof penetrations 15.

Embodiment of FIGS. 12A-12F

Figure 12A:
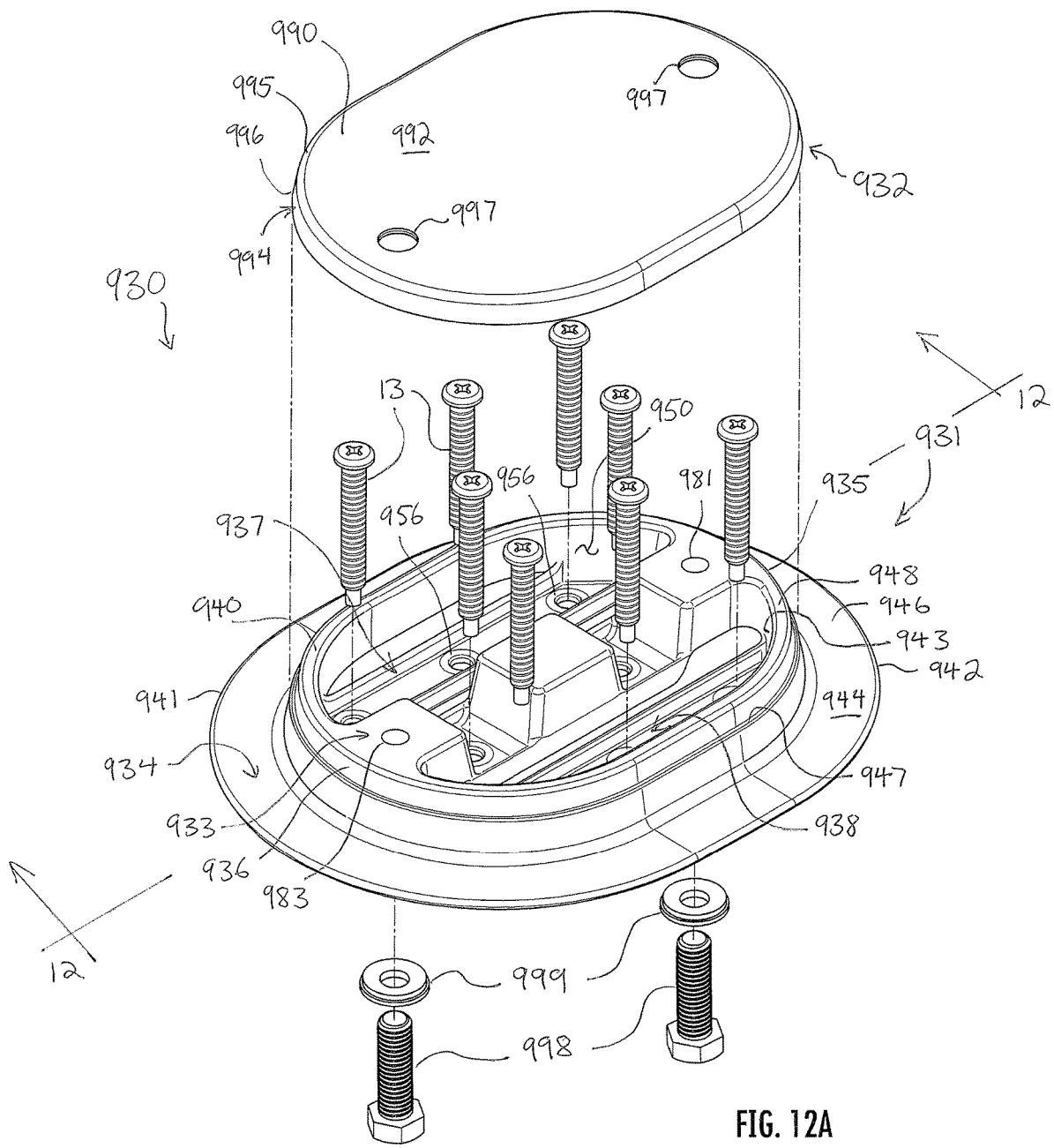
FIGS. 12A and 12B are top and bottom exploded perspective views of a flat roof mounting device.

FIG. 12A illustrates a flat roof mounting device 930 (hereinafter "the device 930") for covering a roof penetration with a mount, the device 930 including a base 931 and a cap 932 moveable onto the base 931 for forming an environmental seal around the roof penetration. The device 930 is a mount for a rack, framework, or other apparatus carrying equipment such as a solar panel array (hereinafter identified as a "rack").

The base 931 is wide, oblong or oval, and has a low profile. The base 931 includes a hub (generally designated with the reference character 933) and an outer perimeter structure 934 encircling the hub 933. The hub 933 and perimeter structure 934 are connected, or coupled, to each other at opposed first and second ends 935 and 936 of the perimeter structure 934 as well as by longitudinally-extending first and second mount plates 937 and 938 disposed on opposed sides of the hub 933. Each mount plate 937 and 938 is formed with a bore through which a fastener 13 is passed and secured into the roof, so as to securely fix the base 931 to the roof. The hub 933, perimeter structure 934, and mount plates 937 and 938 are preferably formed integrally and monolithically, from a single piece of material having strong, rugged, durable, and rigid material characteristics. When the low base 931 is applied over the roof penetration and the fasteners 13 are passed through the bores in the mount plates 937 and 938 such that their heads are seated against the plates 937 and 938, the base 931 is securely mounted to the roof at the roof penetration. With the base 931 securely mounted to the roof, the base 931 is a stable, secure, and strong mount for the rack.

The base has a top 940 and an opposed bottom 941; the bottom 941 is mounted on the roof and the top 940 is directed away from the roof. Both the top 940 and bottom 941 are open, that is to say, openings are formed at both the top 940 and bottom 941. It is noted briefly here that, while the description may refer to "a roof penetration," the embodiment of FIGS. 12A-12F actually has several roof penetrations—one for each of six fasteners 13. However, in some embodiments, only a single penetration may be made or used (and so only a single fastener 13 may be used), while in other cases only two or three penetrations through the roof may be made or used. The phrase "roof penetration" is therefore meant to include single and multiple penetrations through a roof in a local area, such as under the footprint of one device 930. Moreover, the embodiment shown in FIGS. 12A-12F has six bores in the mount plates 937 and 938, but other embodiments have a fewer or greater number of bores.

Figure 12B:
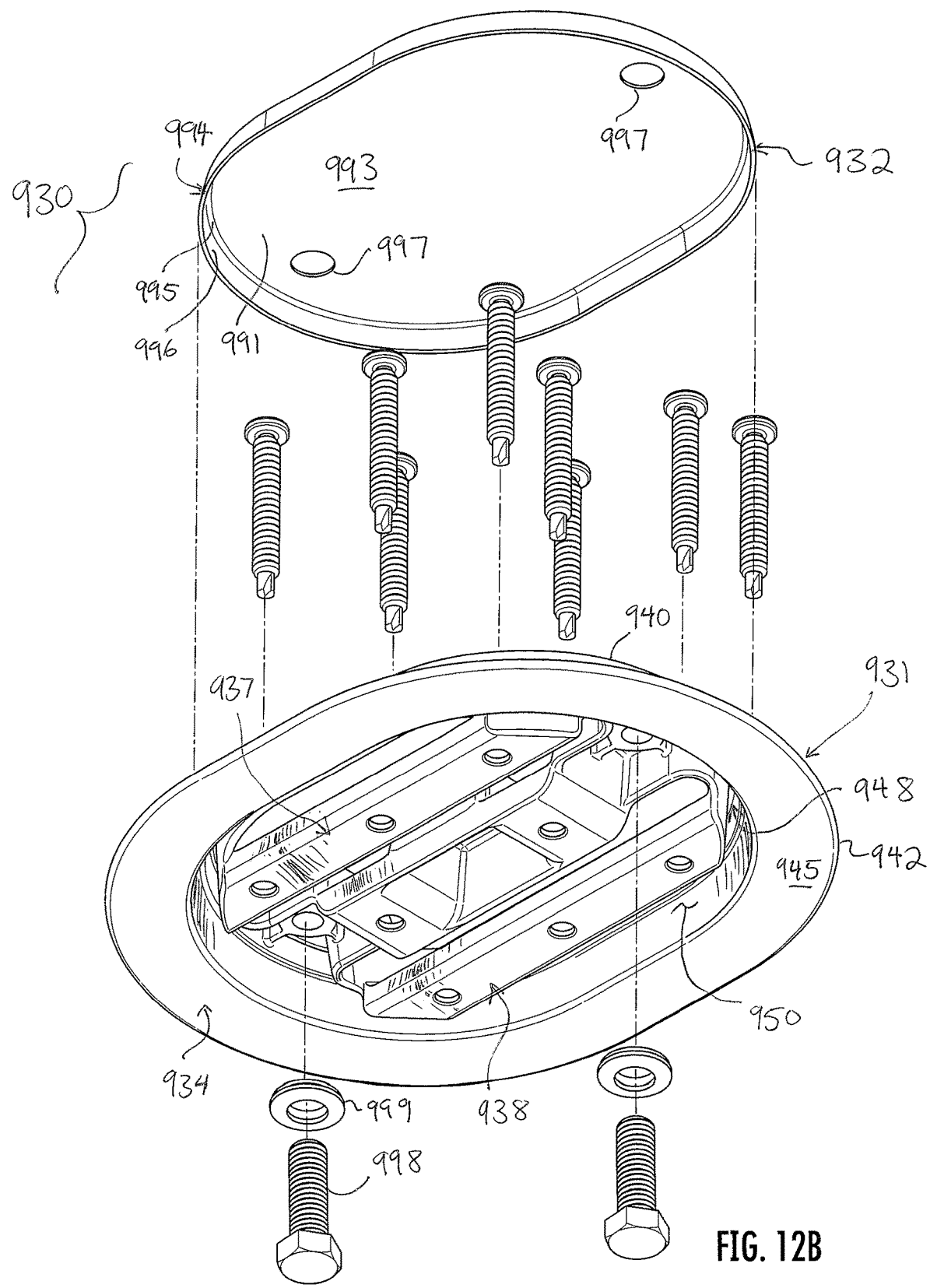

Referring now primarily to FIGS. 12A and 12B, like the base 931, the perimeter structure 934 is elongate, oblong or oval, and has a low profile. The perimeter structure 934 has an outer edge 942 and an opposed inner edge 943, both of which are oval in the embodiment shown in FIGS. 12A-12F. The outer edge 942 is an outwardly-directed annular edge, while the inner edge 943 is an upstanding flat edge or wall. The perimeter structure 934 also has an upper face 944 and an opposed lower face 945. The upper and lower faces 944 and 945 meet at the outer and inner edges 942 and 943. The perimeter structure 934 includes a flat, oval annulus 946 or ring extending inwardly from the outer edge 942 and along a plane at the bottom 941 of the base 931. The annulus 946 terminates at an upstanding ridge 948; the ridge 948 rises obliquely from the annulus 946 toward the top 940 of the base 931 at the inner edge 943. The upper face 944 has several differently-angled pitches, and approximately halfway up the upper face 944, the upper face 944 is formed with an inset seat 947. The seat 947 is an annular shoulder extending into the ridge 948 from the upper face 944 thereof; the seat 947 is sized and shaped to snugly receive the cap 932 when applied to the base 931. The upper face 944 continues upward from the seat 947. The inner edge 943 extends vertically downward toward, but not entirely to, the bottom 941 of the base, generally perpendicular to the plane at the bottom 941.

Figure 12C:
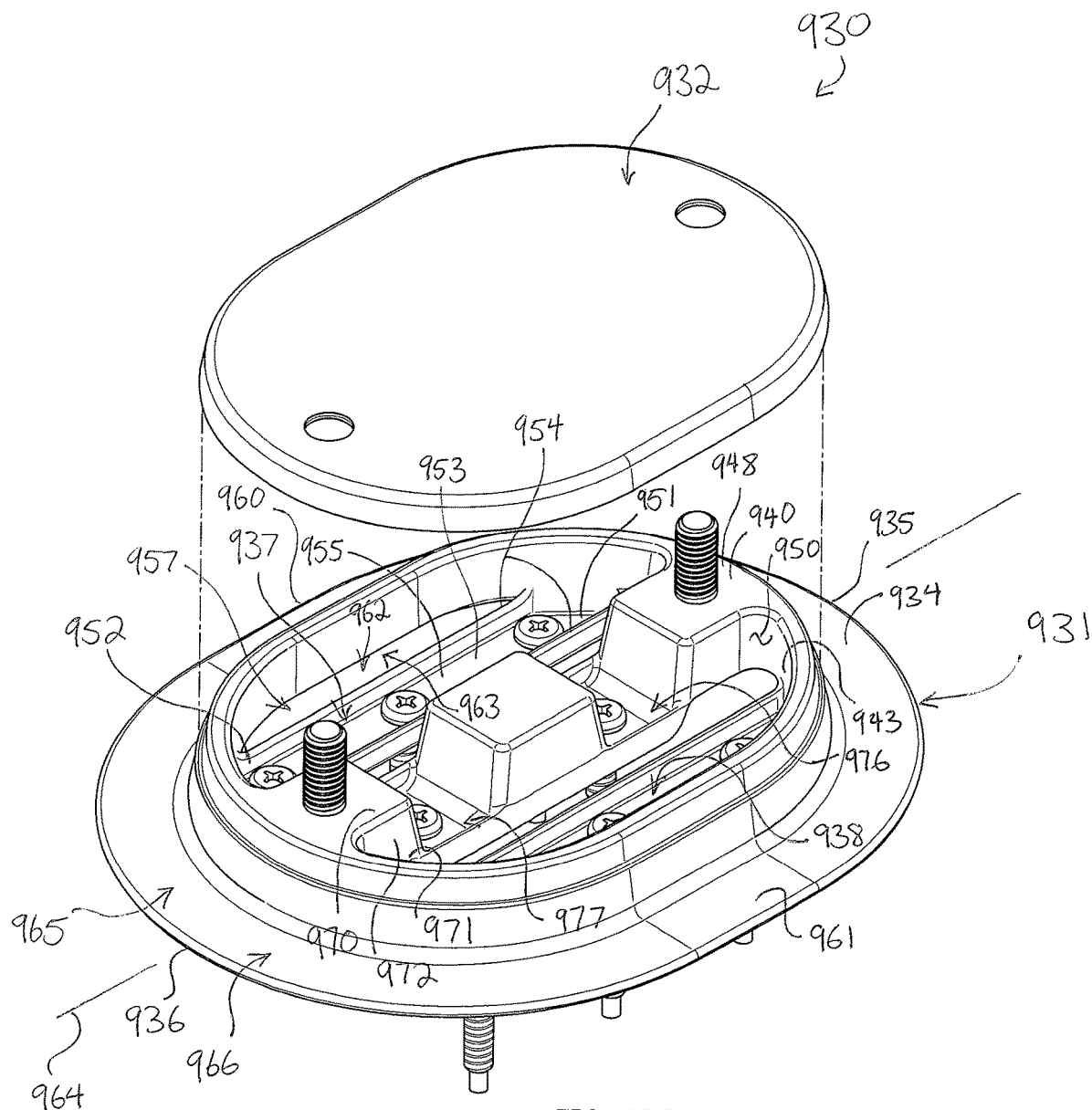
FIG. 12C is a top perspective view of the flat roof mounting device of FIG. 12A.
Figure 12D:
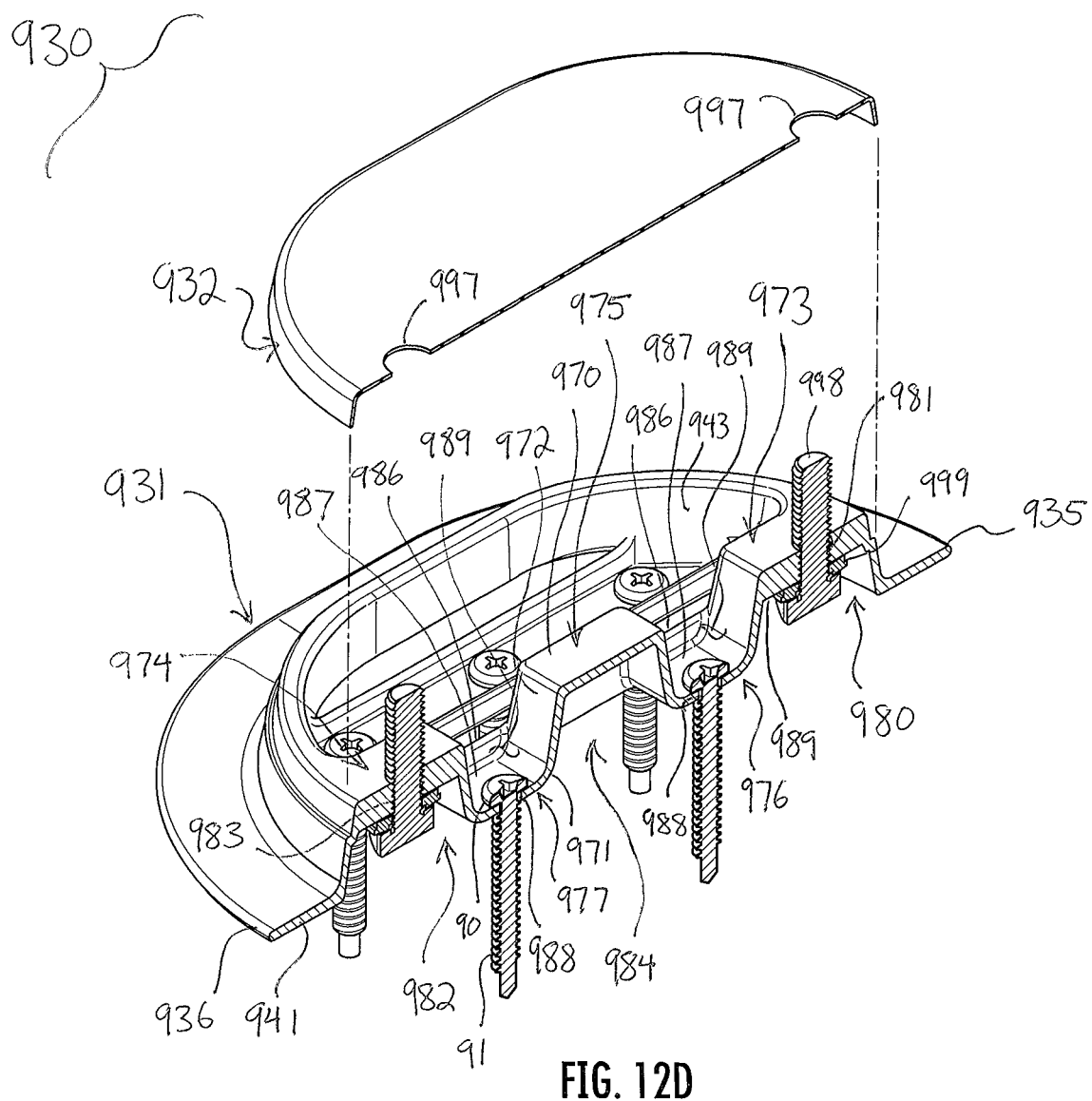
FIG. 12D-12F are perspective section views taken along the line 12-12 of FIG. 12A, showing the flat roof being applied to a roof.

Referring to FIG. 12B, where the underside of the base 931 is illustrated well, and to FIG. 12D, the base 931 is partially hollow. The lower face 945 of the base 931 is flat, smooth, and generally featureless. The lower face 945 extends from the outer edge 942, along the plane of the bottom 941 of the base 931, to the underside of the upstanding ridge 948, at which point the lower face 945 rises upward toward the top 940 of the base 931. The lower face 945 then drops back down toward the bottom 941 along the inner edge 943. The inner edge 943 extends inwardly, from the top 940 of the base 931 toward the bottom 941 of the base 931, but it stops above the bottom 941. The inner edge 943 projects downwardly from the top 940 to approximately two-thirds of the distance between the top 940 and the bottom 941.

A hold 950 extends throughout the base 931, bound by the contours of the perimeter structure 934 and the top 940 and bottom 941 of the base 931. The hold 950 is an inner space of the base 931, and is hereinafter identified as a reservoir 950 with respect to this embodiment because, when the device 930 is applied to a roof structure, the hold 950 cooperates with the roof structure to define a reservoir 950 configured to receive, hold, and contain a flowable sealant applied thereto. As such, the hold 950 is the reservoir 950. Indeed, in all embodiments presented herein, the hold is a reservoir and will be referred to as such. The reservoir 950 is open to both the top 940 and the bottom 941 of the base 931, and it extends between the hub 933 and the perimeter structure 934, extends under the hub 933, and is unsevered by the mount plates 937 and 938. In operation, as discussed below, the reservoir 950 is filled with the flowable sealant to ensure an environmental seal against the roof and around the roof penetration.

The perimeter structure 934 is formed integrally and monolithically to both the hub 933 and to each of the mount plates 937 and 938. Turning now to FIG. 12C, the two mount plates 937 and 938 are visible. The mount plates 937 and 938 are identical in structure (though different in location) and so discussion of the various structural elements and features of the mount plates 937 and 938 will be made without reference to one in particular, and the reader should understand that the discussion applies to both mount plates 937 and 938 equally.

The first mount plate 937 has a first end 951 proximate the first end 935 of the perimeter structure 934 and a second end 936 proximate the second end 936 of the perimeter structure 934. The mount plate 937 includes a flat, elongate web 953 projecting entirely from the inner end 881 to the outer end 882. Upstanding flanges 954 flank the opposed lateral sides of the web 953. The flanges 954 extend along the entire length of the web 953 and project above the web 953, thereby defining three seats 955 in the web 953 between the opposed flanges 954.

The seats 955 are spaced apart and each is configured to receive a fastener 13. Each seat 955 has a flat top on top of the web 953 and a flat bottom on the underside of the web 953. Formed centrally and entirely through each seat 955 from the top to the bottom is a bore 956, shown better in FIG. 12B. Each bore 956 is preferably a cylindrical, unthreaded hole formed transversely through the seat 955. The fastener 13 passes through the bore 956 to secure the device 930 at a roof penetration, and when fully seated, the head of the fastener 13 bears against the seat 955.

Both the first and second ends 951 and 952 are formed continuously to the inner edge 943 of the perimeter structure 934. Thus, the mount plate 937 is a single form, connected integrally and monolithically to the perimeter structure 934. The flanges 954 provide structural integrity and rigidity to the mount plate 937.

Referring still to FIG. 12C, the mount plate 937 is disposed within the reservoir 950, below the top 940 of the base 931 and below the top of the hub 933. Likewise, the seat 955 is below the top 940 of the base 931, below the top of the hub 933, and below an underside 989 of the hub 933. As shown, the flanges 954 project from near the bottom of the inner edge 943 of the perimeter structure 934, and so the entirety of the structure of the mount plate 937 is below the open top 940 of the base 931. With the mount plate 937 disposed apart from the open top 940, a cavity 957 is defined above the mount plate 937. The bottom of the mount plate 937 is flush, or planar with the bottom 941 of the base 931. The cavity 957 above the mount plate 937 forms part of the reservoir 950. In this way, the mount plate 937 does not sever the reservoir 950, because the mount plate 937 does not separate the reservoir 950 into separate portions or parts among which the sealant cannot flow. Rather, the sealant can flow through the entire reservoir 950 despite the presence of the mount plate 937, because the mount plate 937 does not sever the reservoir 950. The mount plate 938, as noted above, is identical to the mount plate 937 and thus does not sever the reservoir 950 either.

The mount plates 937 and 938 do, however, sever the perimeter structure 934 in a way. The perimeter structure 934 includes opposed first and second sides 960 and 961, which are elongate and extend between the first and second ends 935 and 936. The mount plates 937 and 938 extend between the first and second ends 935 and 936 along these first and second sides 935 and 936. There are gaps 962 between the mount plate 937 and the first side 960 and between the mount plate 938 and the second side 961. These gaps 962 extend upward the perimeter structure 934. As such, the gaps 962 define notches 963 in the perimeter structure 934. The notches 963 in the perimeter structure 934 are erosions of the inner edge 943 upward. The notches 963 erode those structures to a point just higher than the location at which the mount plates 937 and 938 are formed to each. The notches 963 prevent, in part, the inner edge 943 from separating the reservoir 950 into concentric, isolated rings. The notches 963 also allow sealant to flow radially through the entire reservoir 950 without interruption.

The mount plates 937 and 938 flank the hub 933, which extends longitudinally through the base 931. The hub 933 is elongate, and in the embodiment shown in FIGS. 12A-12F, extends through a middle of the base 931 along an axis 964, along which section line 12-12 is taken. The axis 964 divides the base 931 into two portions: a first portion 965 on one side of the axis 964 and a second portion 966 on an opposed side of the axis 964. In the drawing of FIG. 12C, the first portion 965 is in the background and the second portion 966 is in the foreground. While the mount plate 937 is entirely in the first portion 965 and the mount plate 938 is entirely in the second portion 966, the hub 933 lies in the middle, is spaced apart from and disposed between the mount plates 937 and 938, and is in both the first and second portions 965 and 966.

The hub 933 is hollow, formed as an upstanding protrusion with spaced-apart depressions. The hub 933 has a top 970, an opposed bottom 971, and an outer sidewall 972 extending between the top 970 and bottom 971. The top 970 of the hub 933 is coplanar with the top of the upstanding ridge 948, and these two tops are coplanar with the open top 940 of the base 931.

The hub 933 has three projections, spaced apart from each by depressions: a first projection 973, a second projection 974, an intermediate projection 975, a first depression 976, and a second depressions 977. The first projection 973 is proximate the first end 935 of the perimeter structure 934, and the second projection 974 is proximate the second end 936 of the perimeter structure 934. The second intermediate projection 975 is disposed between the first and second depressions 976 and 977, which are respectively proximate the first and second projections 973 and 974.

The first projection 973 is roughly rectangular prismatic. The sidewall 972 extends from the inner edge 943, proximate the inner edge 943, and includes opposed lateral sides and an inner side, opposite the inner edge 943. Each of these three sides has a slight taper, so that the dimension of each is slightly reduced from the bottom to the top. The opposed lateral sides of the first projection 973 are aligned with the sides of the hub 933. The inner side depends from the top 970 entirely to the bottom 971 of the hub 933 and the first depression 976 formed there. The first projection 973 is hollow and bounds a first inner space 980. The top 970 of the first projection 973 is flat, smooth, and planar. A threaded bore 981 is formed therethrough at roughly the geometric center of the first protection 973. The bore 981 extends through the top 970, normal to the flat top 970, and connects to the first interior space 980. When the cap 932 is placed over the base 931, the bore 981 is registered with a hole in the cap 932.

The intermediate projection 975 is roughly rectangular prismatic. The sidewall 972 includes opposed lateral sides and opposed end sides, one of which faces the first depression 976 and the other of which faces the second depression 977. Each of these three sides has a slight taper, so that the dimension of each is slightly reduced from the bottom to the top. The opposed lateral sides of the intermediate projection 975 are aligned with the sides of the hub 933 and with the lateral sides of the first projection 973. The end sides depend from the top 970 entirely to the bottom 971 of the hub 933 and the first and second depressions 976 and 977 formed there. The intermediate projection 975 is hollow and bounds an intermediate inner space 984. The top 970 of the intermediate projection 975 is flat, smooth, planar, and is preferably formed without a bore therethrough. In some embodiments, a bore—threaded or otherwise—does extend through top 970.

The second projection 974 is roughly rectangular prismatic. The sidewall 972 extends from the inner edge 943, proximate the second end 936, and includes opposed lateral sides and an inner side, opposite the inner edge 943. Each of these three sides has a slight taper, so that the dimension of each is slightly reduced from the bottom to the top. The opposed lateral sides of the second projection 974 are aligned with the sides of the hub 933 and with the lateral sides of the first and intermediate projections 973 and 975. The inner side depends from the top 970 entirely to the bottom 971 of the hub 933 and the second depressions 977 formed there. The second projection 974 is hollow and bounds a second inner space 982. The top 970 of the second projection 974 is flat, smooth, and planar. A threaded bore 983 is formed therethrough at roughly the geometric center of the second projection 974. The bore 983 extends through the top 970, normal thereto, and connects to the inner space 982. When the cap 932 is placed over the base 931, the bore 981 is registered with a hole in the cap 932.

The first and second depressions 976 and 977, between the first and second projections 973 and 974, and flanking the intermediate projection 975, are low, coplanar with the bottom 941 of the base 931. They are roughly flat and rectangular. The opposed sides of the depressions 976 have upstanding flanges 986, defining recessed seats 987 therebetween. In the seats are bores 988 formed entirely through the seats 987 and normal thereto. The flanges 986 provide additional rigidity to the seats 987 between the projections 973, 974, and 975, and thus provide additional structural integrity and rigidity to the hub 933. After all, extending through the center of the base 931, the hub 933 is the primary mounting point for the cap 932 and for the rack placed above the cap 932. Cavities 989 are defined above the depressions 976 and 977, between the projections 973, 974, and 975, and allow sealant to flow between the first and second portions 965 and 966 of the base 931 without interruption.

Referring now to FIGS. 12A and 12B, the cap 932 is elongate, oblong or oval, and has a very low-profile dome shape. The cap 932 has a top 990 and an opposed bottom 991, and opposed upper and lower surfaces 992 and 993. The cap 932 is thin between the upper and lower surfaces 992 and 993, defining a shell. The upper surface 992 is convex, and the lower surface 993 is concave, because the cap 932 curves downward from the flat top 990 to an annular, downwardly-projecting lip 994 at the bottom 991. The lip 994 also defines the outer edge of the cap 932 at its outer dimension. The lip 994 includes an inner first pitch 995 and an outer second pitch 996; the second pitch 996 is steeper than the first pitch 995.

Two holes 997 are spaced apart on the cap 932 at opposed ends thereof. The holes 997 are formed entirely through the cap 932 from the upper surface 992 to the lower surface 993. The holes 997 are located at opposed ends of the cap 932, such that when the cap 932 is moved onto the base 931, the holes 997 are registered with the threaded bores 981 and 983 in first and second projections 973 and 974 of the hub 933. This allows a rugged bolt 998 (with a washer 999) to be passed, from below, through each threaded bore 981 and 983 in the hub 933 and then upward through the holes 997 in the cap 932 when the device 930 is used.

Figure 12E:
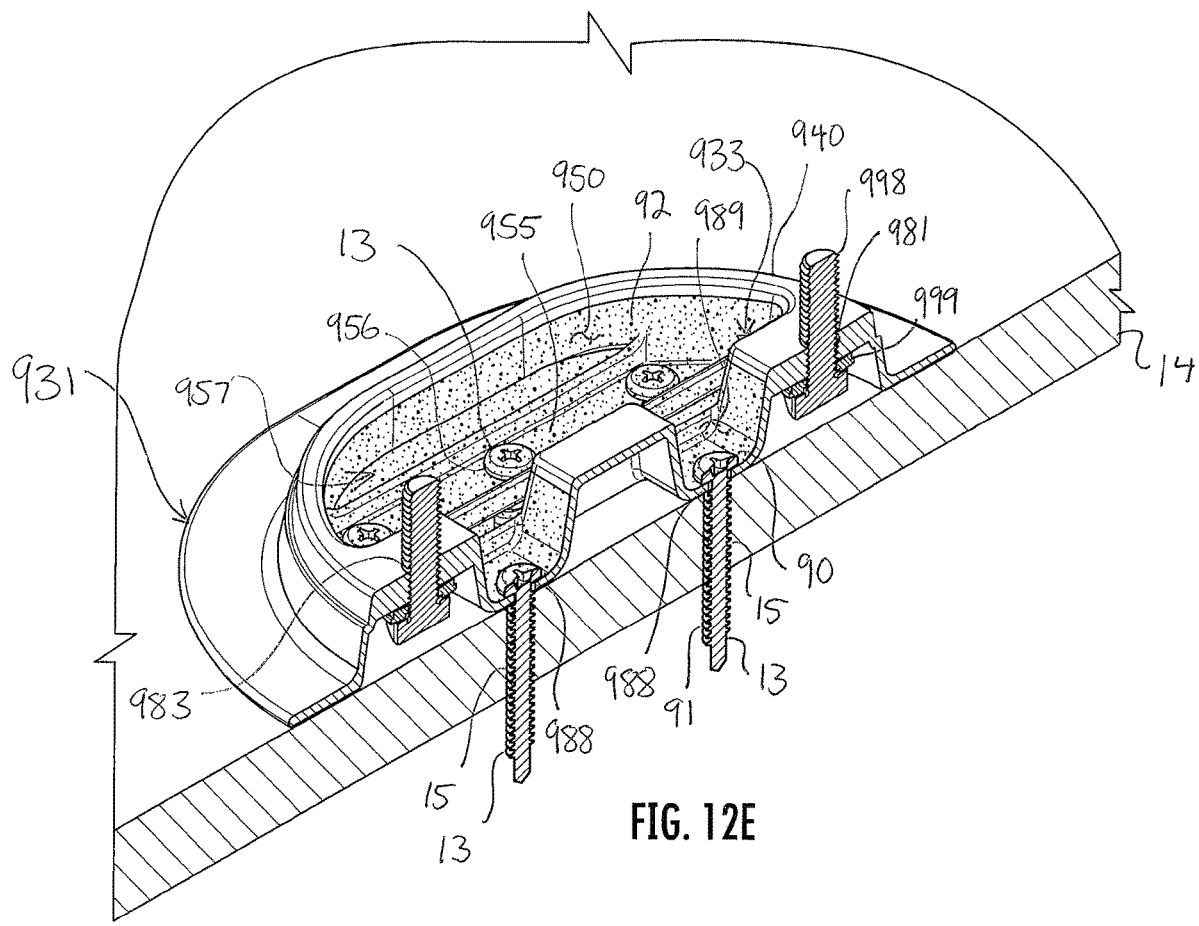
Figure 12F:
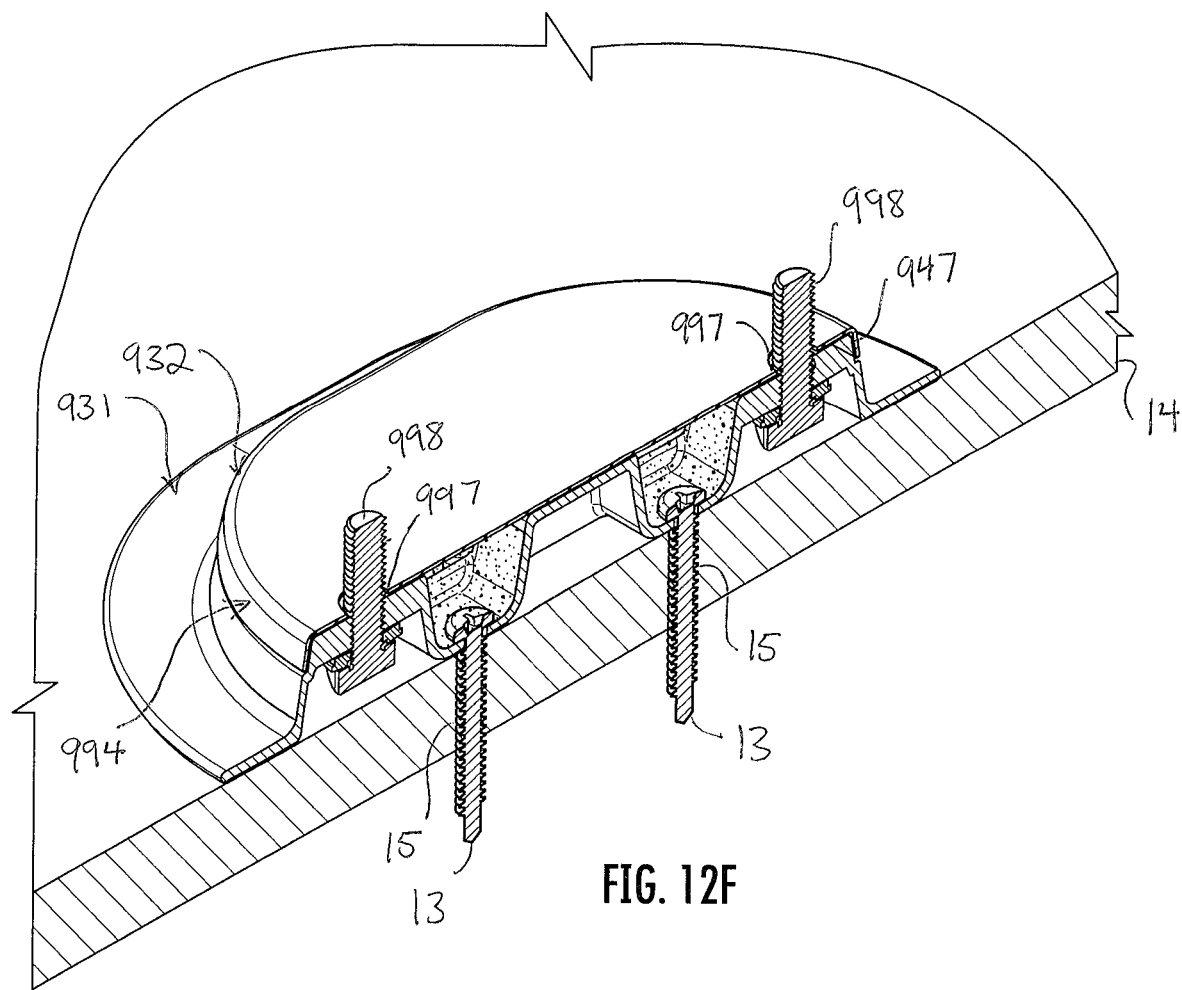

Turning now to FIGS. 12D-12F, in operation, the device 930 is useful for providing a mount for a rack on a roof 14 and for sealing roof penetrations 15 made through the roof 14, which are necessary to securely attach the device 930 to the roof 14. The roof penetrations 15 are formed, such as with a drill, through the roof 14 and potentially other roof structures (shingles, underlayment, wood decking, moisture barriers, rafters, and other structures are collectively simplified here as the roof 14). If there are several roof penetrations 15, a pattern is used to ensure each is located properly with respect to the other.

Once the roof penetrations 15 are formed, the base 931 is prepared. The fasteners 13 may be passed initially through the bores 956 in the first and second mount plates 937 and 938 or may be passed later once the base 931 is on the roof 14. However, before the base 931 is placed onto the roof 14, the bolts 998 are applied to the threaded bores 981 and 983 in the hub 933. The washers 999 are fit onto the shanks of the bolts 998, the bolts 998 are inverted, and the bolts 998 are threadably engaged from below the hub 933. When fully applied, the washers 999 and the heads of the bolts 998 are seated against the underside 989 of the hub 933, maintained in the first and second inner spaces 980 and 982 within the hub 933, and the shanks of the bolts 998 project upward above the top 970 of the hub 933.

The base 931 is then placed atop the roof 14, as in FIG. 12E. The base 931 is aligned so that each bore 956 in a mount plate 937 and 938 is registered with a respective roof penetration 15. The fasteners 13 are then applied to the bores 956. In other embodiments, the fasteners 13 are self-tapping or self-drilling fasteners, and it is not necessary to drill holes; rather, the base 931 is placed over a desired location on the roof 14 and then the fasteners 13 are applied into the roof 14. Each fastener 13 has a head 90 and a long shank 91. Each fastener 13 is threadably engaged with the roof 14 until the head 90 is seated in the seat 955 of the mount plate 937 and the shank 91 passes below the seat 955, penetrating the roof 14 and forming into the roof penetration 15. The head 90 is seated in flush and direct contact with the top of the seat 955, and an unthreaded portion of the shank 91 just below the head 90 fills the bore 956 snugly. Additionally, fasteners 13 are applied to the bores 988 in the seats 987 of the hub 933. These fasteners 13 are also threadably engaged until the head 90 is seated in the seat 987 in flush and direct contact therewith. When all fasteners 13 are engaged in this manner, the base 931 is securely fixed to the roof 14.

In some embodiments, an o-ring, foam ring, adhesive sealant, or other form of gasket or sealing member is applied on the underside of the base 931 before the base 931 is secured according to the above. This gasket creates a first seal between the base 931 and the roof 14, just inboard from the outer edge 942. This first seal is effective at preventing water, moisture, and other environmental ingress at the annulus 946. Use of a gasket is optional, however, and not necessary to ensure an environmental seal between the base 931 and the roof 14.

Once the base 931 is securely fixed to the roof 14, a flowable sealant 92 is applied to the reservoir 950. The sealant 92 is slowly applied to the reservoir 950 until the sealant 92 nearly reaches the top 940 of the base 931. By slowly filling the sealant 92, the sealant 92 can flow across the portion of the roof 14 covered by the base 931, surrounding the roof penetrations 15 in the first and second mount plates 937 and 938 and in the hub 933. Because the roof penetrations 15 are under the bores 956 and 988, the roof penetrations 15 are under the mount plates 937 and 938 and the first and second depressions 976 and 977 of the hub 933. However, as shown in FIG. 12E, the ribs mount plates 937 and 938 and depressions 976 and 977 lie in flat, direct, and continuous contact with the roof 14. Once the sealant 92 moves into the cavities 957 and 989 above the mount plates 937 and 938 and the depressions 976 and 977 and surrounds the fasteners 13, the sealant 92 entirely fills the bottom of the reservoir 950 to form an environmental seal between the base 931 and the roof 14 which prevents environmental ingress through the roof 14.

By filling the sealant 92 to just below the top 940 of the base 930, the heads 90 of the fasteners 13 are covered. Because the seats 955 and 987 are disposed below the top 940 of the base 931, the seats 865 and the heads 90 of the fasteners 13 received in them are covered. This increases the surety of the environmental seal. Further, by filling the reservoir with sealant 92 until the heads 90 are covered, the installer performing the work receives visual confirmation: when the heads 90 are no longer visible, the installer can be sure the reservoir 950 is adequately filled to have formed the environmental seal.

The above defines an installed condition of the device 930. This installed condition is sufficient to form an environmental seal over the roof penetrations 15. Though not preferred, some installers may choose to apply the bolt 998 to the hub 933 and then immediately begin installing racks. However, an additional step may also preferably be completed. FIG. 12F illustrates the cap 932 applied to the base 931. The installer registers the cap 932 with the base 931, so that the lip 994 is registered with the seat 947 by the top of the ridge 948 of the base 931, and then moves the cap 932 downward onto the base 931 so that the lip 994 is snugly received in the seat 947. With this movement, the shanks of the upstanding bolts 998 also pass through the holes 997. When a nut is engaged to the bolt 998, or when the rack or other hardware is secured on the bolt 998, the bolt 998 is tightened, the cap 932 is compressed onto the base 931, and the lip 994 and seat 947 form an environmental seal preventing moisture and other ingress into the device 930. Of course, the installer can also simply press the cap 932 down onto the base 931 to form the environmental seal. The cap 932 also serves to deflect rain, snow, and other moisture onto the ridge 948 and annulus 946, from which it will flow onto the roof 14. In these ways, when the cap 932 is moved onto the base 931, the cap 932 and the perimeter structure 934 of the base 931 cooperate to form an environmental seal around the roof penetrations 15.

Embodiment of FIGS. 13A-13F

Figure 13A:
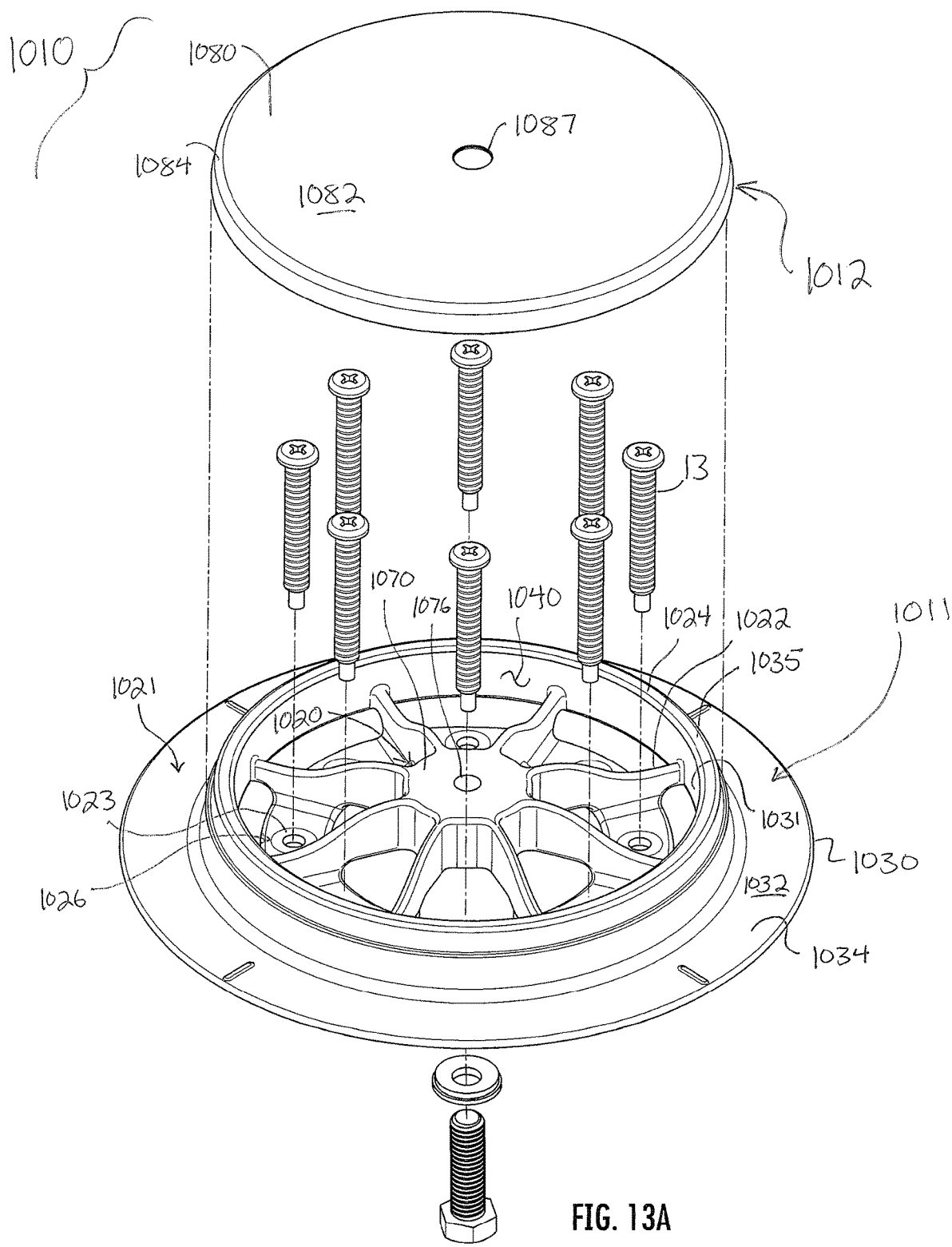
FIGS. 13A and 13B are top and bottom exploded perspective views of a flat roof mounting device.

FIG. 13A illustrates a flat roof mounting device 1010 (hereinafter "the device 1010") for covering a roof penetration with a mount, the device 1010 including a base 1011 and a cap 1012 moveable onto the base 1011 for forming an environmental seal around roof penetrations. The device 1010 is a mount for a rack, framework, or other apparatus carrying equipment such as a solar panel array (hereinafter identified as a "rack").

The base 1011 is wide, round, and has a low profile. The base 1011 includes a central hub 1020 and an outer perimeter structure 1021 coaxially encircling the central hub 1020. The hub 1020 and perimeter structure 1021 are connected, or coupled, to each other by a plurality of ribs 1022 extending radially outward from the hub 1020 to the perimeter structure 1021. An annular mount plate 1026 is connected to the ribs 1022, disposed between the hub 1020 and the perimeter structure 1021. Between each rib 1022, the mount plate 1026 is formed with a bore 1023 through which a fastener 13 is passed and secured into the roof, so as to securely fix the base 1011 to the roof. The hub 1020, perimeter structure 1021, ribs 1022, and mount plate 1026 are preferably formed integrally and monolithically, from a single piece of material having strong, rugged, durable, and rigid material characteristics. When the low base 1011 is applied over the roof penetration and the fasteners 13 are passed through the bores 1023 such that their heads are seated against the mount plate 1026, the base 1011 is securely mounted to the roof at the roof penetration. With the base 1011 securely mounted to the roof, the base 1011 is a stable, secure, and strong mount for the rack.

The base 1011 has a top 1024 and an opposed bottom 1025; the bottom 1025 is mounted on the roof and the top 1024 is directed away from the roof Both the top 1024 and bottom 1025 are open, that is to say, openings are formed at both the top 1024 and bottom 1025. It is noted briefly here that, while the description may refer to "a roof penetration," the embodiment of FIGS. 13A-13F actually has several roof penetrations—one for each of eight fasteners 13. However, in some cases, only a single penetration may be made or used (and so only a single fastener 13 may be used), while in other cases only two or three penetrations through the roof may be made or used. The phrase "roof penetration" is therefore meant to include single and multiple penetrations through a roof in a local area, such as under the footprint of one device 1010.

Figure 13B:
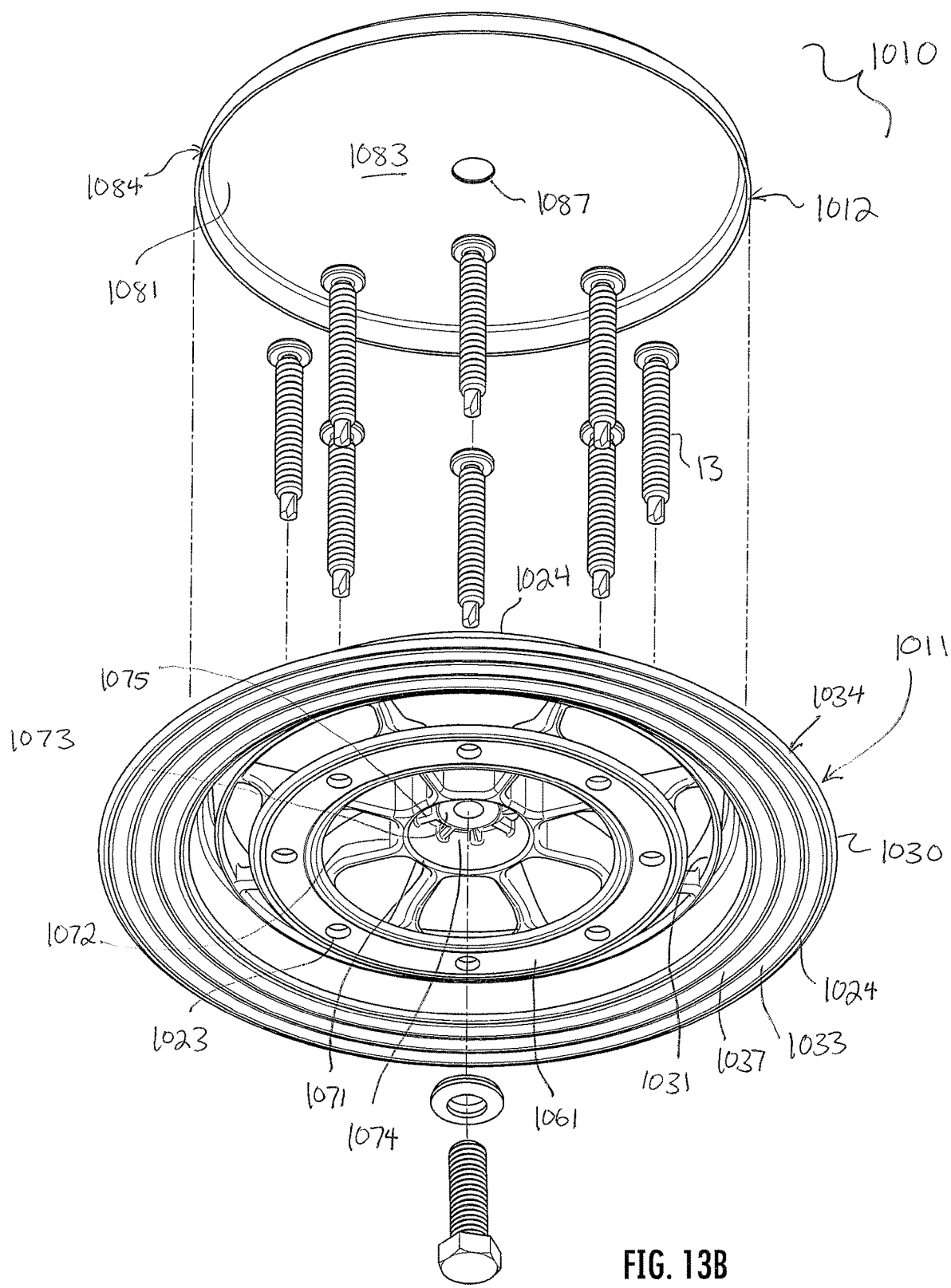

Referring now primarily to FIGS. 13A and 13B, like the base 1011, the perimeter structure 1021 is wide, round, and has a low profile. The perimeter structure 1021 has an outer edge 1030 and an opposed inner edge 1031, both of which are circular in the embodiment shown in FIGS. 13A-1F. The outer edge 1030 is a radially-directed annular edge, while the inner edge 1031 is an upstanding flat edge or wall. The perimeter structure 1021 also has an upper face 1032 and an opposed lower face 1033. The upper and lower faces 1032 and 1033 meet at the outer and inner edges 1030 and 1031. The perimeter structure 1021 includes a flat annulus 1034 or ring extending inwardly from the outer edge 1030 and along a plane at the bottom 1025 of the base 1011. The annulus 1034 terminates at an upstanding ridge 1035; the ridge 1035 rises obliquely from the annulus 1034 toward the top 1024 of the base 1011 at the inner edge 1031. The upper face 1032, along the ridge 1035, has several differently-angled pitches, and proximate the top 1024, the ridge 1035 is formed with an inset seat 1036. The seat 1036 is an annular depression extending into the ridge 1035 from the upper face 1032 thereof; the seat 1036 is sized and shaped to snugly receive the cap 1012 when applied to the base 1011. The seat 1036 terminates radially inwardly at the top 1024 and at the inner edge 1031. The inner edge 1031 extends vertically downward toward, but not entirely to, the bottom 1025 of the base 1011, generally perpendicular to the plane at the bottom 1025.

Referring primarily to FIG. 13B, where the underside of the base 1011 is illustrated well, the base 1011 is partially hollow. The lower face 1033 of the base 1011 is contoured. At the annulus 1034, proximate the outer edge 1030, the lower face 1033 is flat. Just slightly inboard, however, the flat lower face 1033 is interrupted by a coaxial channel 1037 extending upward into the base 1011. The channel 1037 has a generally rectangular cross-section (though other shapes may be suitable) for receiving an o-ring, foam ring, adhesive sealant, or other form of gasket or sealing member to be compressed between the base 1011 and the roof. The lower face 1033 extends from the channel 1037, along the plane at the bottom 1025, to the underside of the upstanding ridge 1035, at which point the lower face 1033 rises upward toward the top 1024 of the base 1011. The lower face 1033 then drops back down toward the bottom 1025 along the inner edge 1031. The inner edge 1031 extends from the top 1024 of the base 1011 toward the bottom 1025 of the base 1011, but it stops above the bottom 1025. The inner edge 1031 projects downwardly from the top 1024 approximately two-thirds of the distance between the top 1024 and the bottom 1025.

Figure 13C:
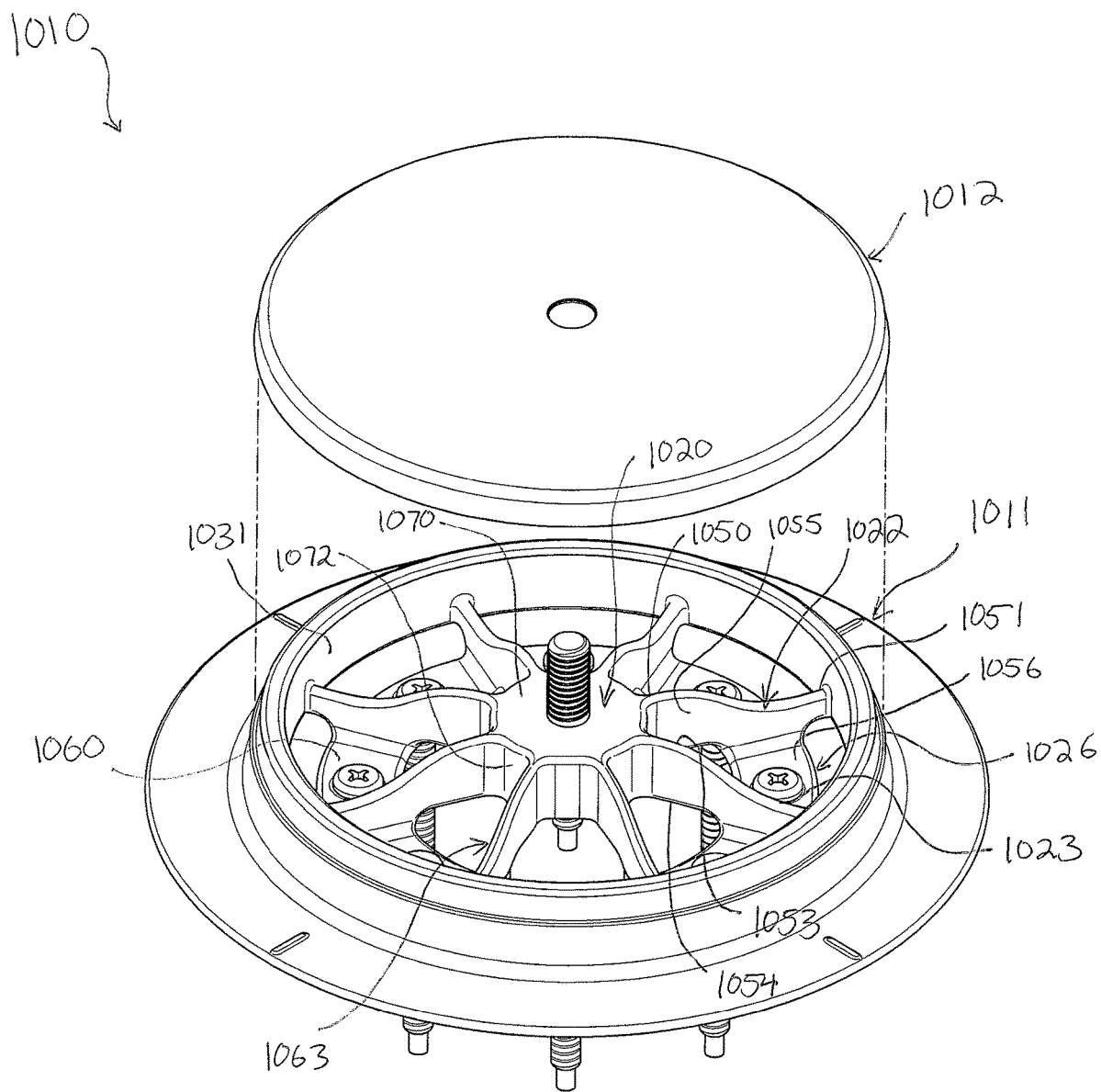
FIG. 13C is a top perspective view of the flat roof mounting device of FIG. 13A.
Figure 13D:
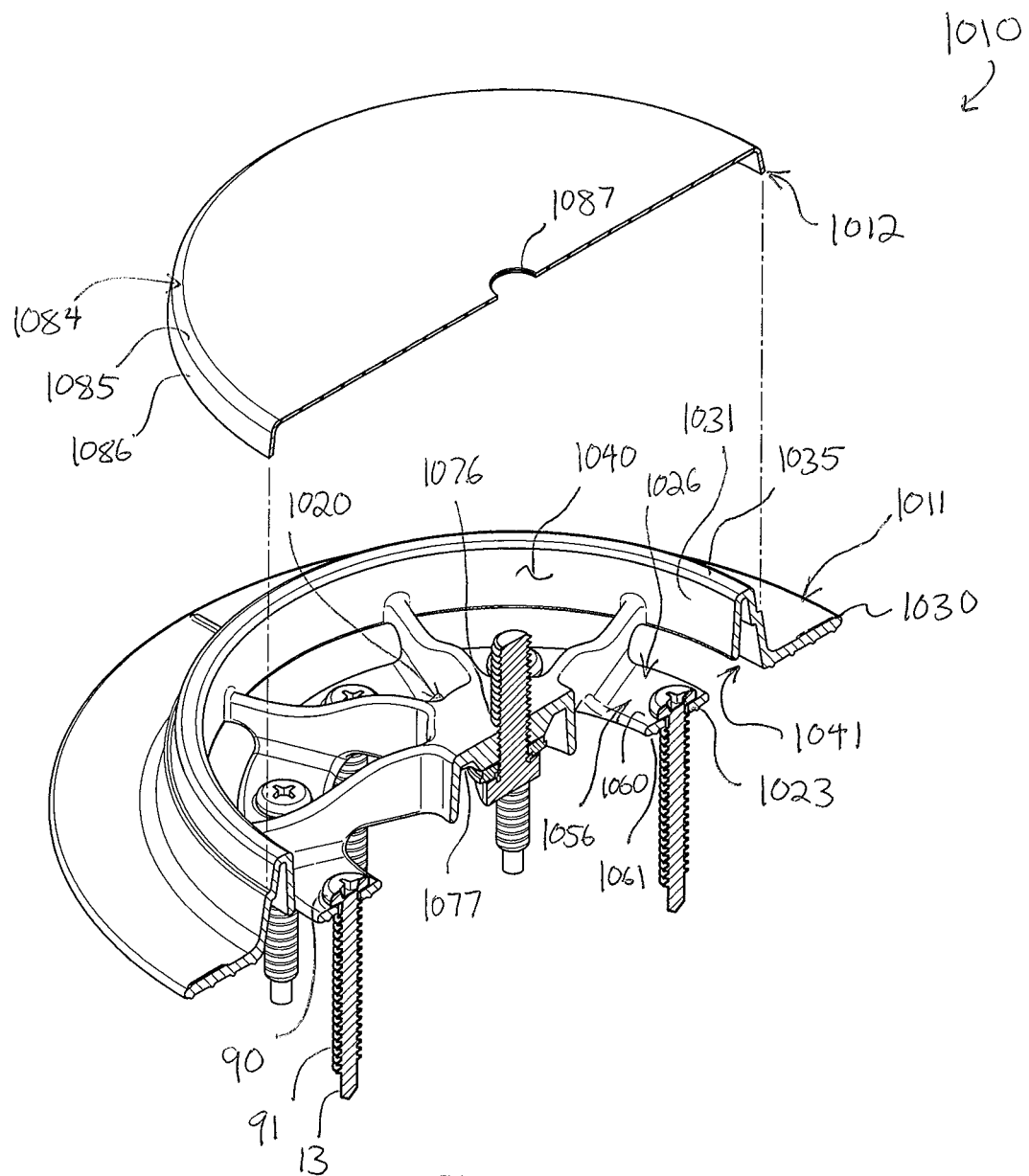
FIG. 13D-13F are perspective section views taken along the line 13-13 of FIG. 13A, showing the flat roof being applied to a roof.

The upper and lower faces 1032 and 1033 cooperate to bound a hold 1040 of the base 1011. The hold 1040 is an inner space of the base 1011. The hold 1040 is hereinafter identified as a reservoir 1040 with respect to this embodiment because, when the device 1010 is applied to a roof structure, the hold 1040 cooperates with the roof structure to define a reservoir 1040 configured to receive, hold, and contain a flowable sealant applied thereto. As such, the hold 1040 is the reservoir 1040. Indeed, in all embodiments presented herein, the hold is a reservoir and will be referred to as such. The reservoir 1040 is open to both the top 1024 and the bottom 1025 of the base 1011, and it extends between the hub 1020 and the perimeter structure 1021 and is unsevered by the ribs 1022 or the mount plate 1026. In operation, as discussed in greater detail below, the reservoir 1040 is filled with the flowable sealant to ensure an environmental seal against the roof and around the roof penetration. The inner edge 1031 defines a gap 1041 below the ridge 1035 at the inner edge 1031; this gap 1041 is best seen in FIG. 13D. The presence of the gap 1041 prevents the inner edge 1031 from separating the reservoir 1040 into an outer ring (under the ridge 1035) and an inner ring (between the ridge 1035 and the hub 1020). This gap 1041 allows sealant to flow radially throughout the reservoir 1040.

The perimeter structure 1021 is formed integrally and monolithically to each of the ribs 1022. Turning now primarily to FIG. 13C, the right ribs 1022 are visible. The device 1010 preferably has eight ribs 1022, but may suitably have a fewer or greater number of ribs 1022 depending on the needs of the application. Moreover, the ribs 1022 are identical in every respect, and so discussion of the various structural elements and features of the ribs 1022 will be made without reference to one rib 1022 in particular, and the reader should understand that the discussion applies to all the ribs 1022 equally.

The rib 1022 has an inner end 1050 proximate the hub 1020 and an outer end 1051 proximate the perimeter structure 1021. The rib 1022 projects outward from the inner end 1050 toward the outer end 1051. The rib 1022 is tall and narrow, having a top 1053, a bottom 1054, and opposed sides 55. The side 55 are flat, parallel, and tall between the top 1053 and bottom 1054. The bottom 1054 is generally flat, parallel to the plane at the bottom 1025 of the base 1011 but elevated above it. The top 1053 is highest proximate the inner end 1050 and tapers down slightly toward the bottom 1054. About two-thirds of the distance from the inner end 1050 to the outer end 1051, the bottom 1054 of the rib 1022 projects further down, joining to the mount plate 1026.

The mount plate 1026 is an annular, ring-like extension of each rib 1026. The mount plate 1026 extends arcuately through the reservoir 1040, inboard of the perimeter structure 1021 and outboard of the hub 1020. It is coupled between and to each of the ribs 1022. The mount plate 1026 is thin, flat, and disposed just below the bottom 1054 of the ribs 1022 along most of their lengths. Between each pair of ribs 1022, the mount plate 1026 has a seat 1056. The seat 1056 has a flat top 1060 and an opposed flat bottom 1061. Formed centrally and entirely through each seat 1056 from the top 1060 to the bottom 1061 is the bore 1023 mentioned above. In FIG. 13C, the bores 1023 are each concealed by the heads of fasteners 13, but the bores 1023 are visible in other drawings. The bore 1023 is preferably a cylindrical, unthreaded hole formed transversely through the seat 1056. The ribs 1022, extending from inner ends 1050 to outer ends 1051, at which each is connected to the perimeter structure, and between is coupled the mount plate 1026, are connected integrally and monolithically to the hub 1020, the perimeter structure 1021, and the mount plate 1026.

Referring now to FIG. 13D, the top 1053 of the rib 1022 is below the top 1024 of the base 1011, is below the top of the hub 1020, and is below an underside 1077 of the hub 1020. The seat 1056 in the mount plate 1026 is also below the top 1024 and below the top of the hub 1020. Since the top 1053 of the rib 1022 descends from proximate the hub 1020 to the mount plate 1026 where the seat 1056 is located, the entireties of the rib 1022 and the mount plate 1026 are below the open top 1024 of the base 1011. With the rib 1022 disposed apart from the open top 1024, a cavity 1063 is defined above the rib 1022. The bottom 1054 of the rib 1022 is contiguous with and coplanar to the bottom 1061 of the inner edge 1031, such that the rib 1022 has a single, straight, planar bottom extending entirely from the inner end 1050 to the outer end 1051, but for the portion where the rib 1022 is connected to the mount plate 1026. This bottom 1061 is elevated above the bottom 1025 of the base 1011. With the rib 1022 disposed apart from the bottom 1025 of the base 1011, a cavity 1064 is defined below the rib 1022 and above the plane including the bottom 1025 of the base 1011. Both cavities 1063 and 1064 above and below the rib 1022 form part of the reservoir 1040. In this way, the rib 1022 does not sever the reservoir 1040, because the rib 1022 does not separate the reservoir 1040 into separate portions or parts among which the sealant cannot flow. Rather, the sealant can flow through the entire reservoir 1040 despite the ribs 1022, because the ribs 1022 do not sever the reservoir 1040. The mount plate 1026 is coplanar with the bottom 1025 of the base, and so sealant can flow above the mount plate 1026 without interruption.

Referring again to FIGS. 13A-13C, the ribs 1022 all extend radially outward from the central hub 1020. The hub 1020 is located centrally, arranged coaxially with respect to the perimeter structure 1021. The hub 1020 is a cylindrical block, having a top 1070, an opposed bottom 1071, and an outer cylindrical sidewall 1072 extending between the top 1070 and bottom 1071. The inner end 1050 of each rib 1022 is formed to the outer sidewall 1072. The sidewall 1072 has a slight taper to it, so that the sidewall 1072 is slightly reduced in outer diameter proximate the top 1070 compared to proximate the bottom 1071. The top 1070 of the hub 1020 is coplanar with the top of the upstanding ridge 1035, and these two tops are coplanar with the open top 1024 of the base 1011.

As shown best in FIG. 13B, the hub 1020 has a central solid body 1073. The solid body 1073 is separated from the sidewall 1072 by an annular void 1074. A plurality of short ribs 1075 extend from the solid body 1073 to the sidewall 1072 and are registered in alignment with the ribs 1022. Both the sidewall 1072 and the solid body 1073 extend downward entirely to the bottom 1071, while the bottoms of the ribs 1075 are raised slightly with respect to the bottom 1071. However, when the base 1011 is applied to the roof, the sidewall 1072 is preferably in continuous contact with the roof and isolates the void 1074 from the reservoir 1040. The void 1074 extends up to the top 1070.

The top 1070 is flat, circular, smooth, and planar. A threaded bore 1076 is formed in the geometric center of the top 1070. The bore 1076 extends entirely through the solid body 1073 of the hub 1020 from the top 1070 to the bottom 1071, such that the bore 1076 is a throughbore. When the cap 1012 is placed over the base 1011, the bore 1076 is registered with a hole in the cap 1012.

Referring now to FIGS. 13A and 13B, the cap 1012 is wide, round, and has a very low-profile dome shape. The cap 1012 has a top 1080 and an opposed bottom 1081, and opposed upper and lower surfaces 1082 and 1083. The cap 1012 is thin between the upper and lower surfaces 1082 and 1083, defining a shell. The upper surface 1082 is convex, and the lower surface 1083 is concave, because the cap 1012 curves downward from the flat top 1080 to an annular, downwardly-projecting lip 1084 at the bottom 1081. The lip 1084 also defines the outer edge of the cap 1012 at its outer dimension. The lip 1084 includes an inner first pitch 1085 and an outer second pitch 1086 (as best seen in FIG. 13F); the second pitch 1086 is steeper than the first pitch 1085.

At the top 1080 of the cap 1012 is a hole 1087. The hole 1087 is formed entirely through the cap 1012 from the upper surface 1082 to the lower surface 1083. The hole 1087 is located centrally on the top 1080 and on the cap 1012, such that when the cap 1012 is moved onto the base 1011, the hole 1087 is registered with the threaded bore 1076 in the hub 1020. This allows a rugged bolt 1088 (fitted with a washer 1089) to be threadably applied to the bore 1076 in the hub 1020 from below and then passed through the hole 1087 in the cap 1012 to receive a rack or rack-mounting hardware.

Figure 13E:
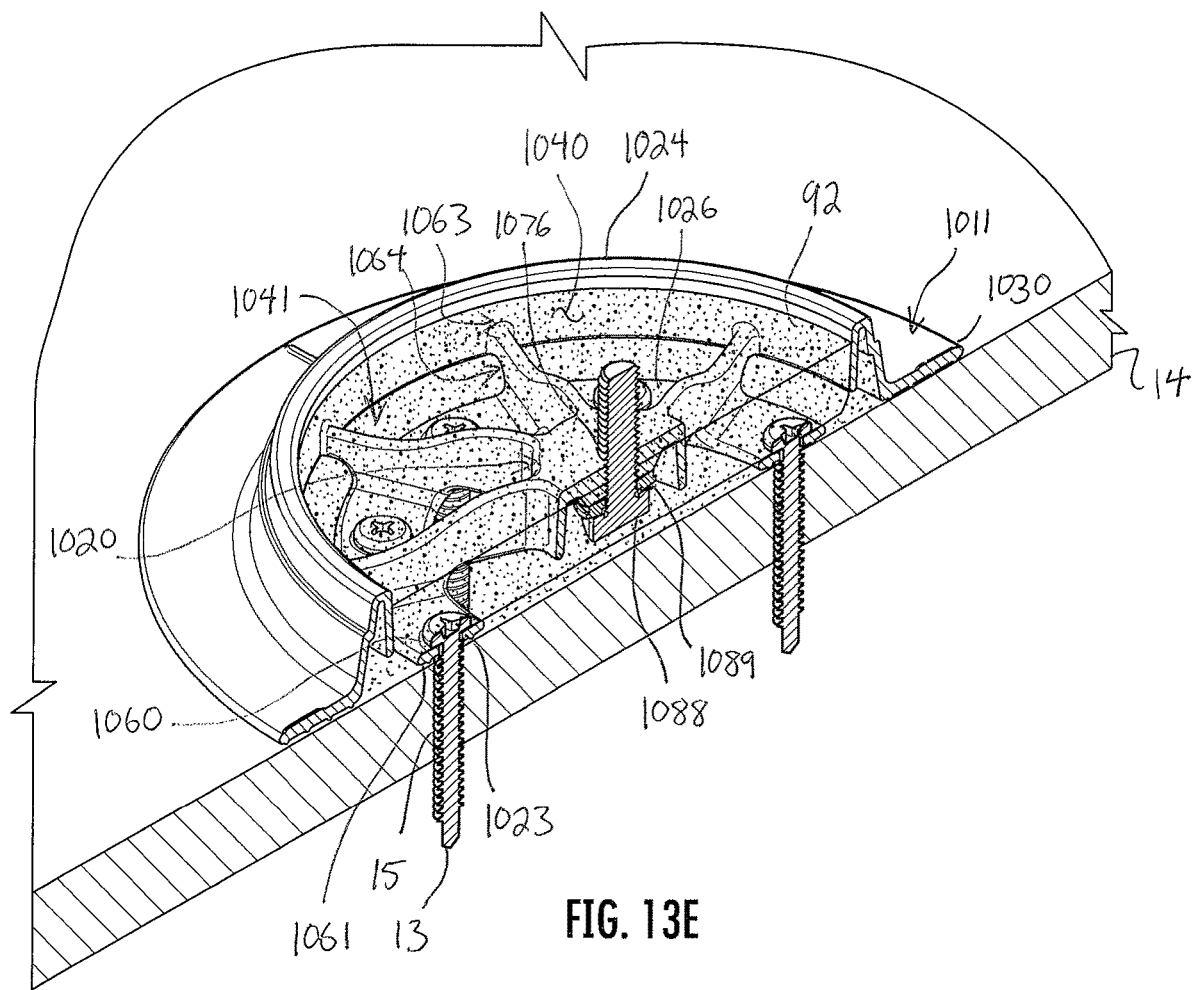
Figure 13F:
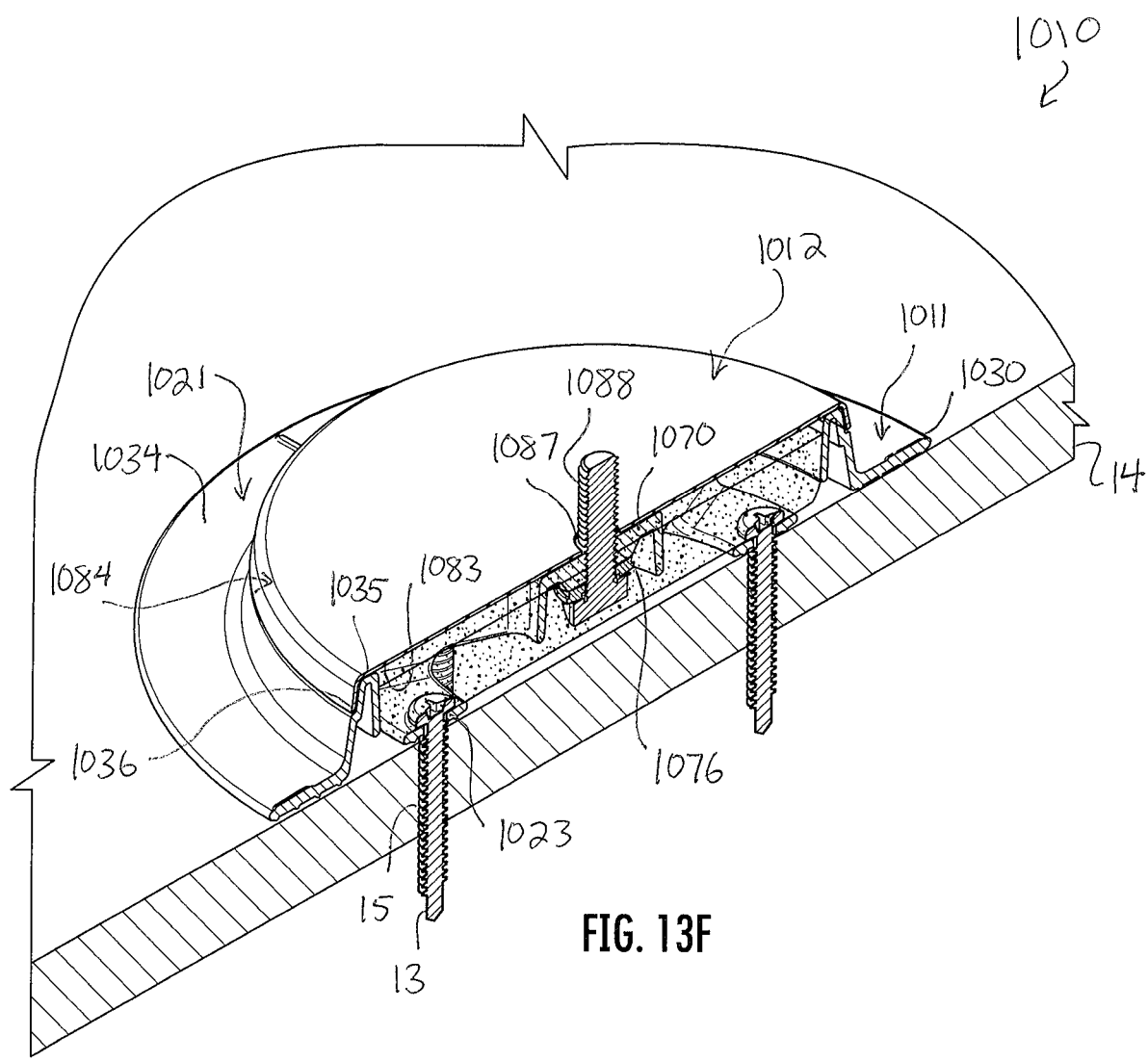

Turning now to FIGS. 13D-13F, in operation, the device 1010 is useful for providing a mount for a rack on a roof 14 and for sealing roof penetrations 15 made through the roof 14, which are necessary to securely attach the device 1010 to the roof 14. The roof penetrations 15 are formed, such as with a drill, through the roof 14 and potentially other roof structures (shingles, underlayment, wood decking, moisture barriers, rafters, and other structures are collectively simplified here as the roof 14). If there are several roof penetrations 15, a pattern is used to ensure each is located properly with respect to the other. Once the roof penetrations 15 are formed, the base 1011 is prepared by placing a bolt 1088 through the body 1073 of the hub 1020 in an inverted position. The bolt 1088 is threadably engaged with the bore 1076 and is seated against the underside 1077 of the hub 1020. The base 1011 is then placed atop the roof, as in FIG. 13D. The base 1011 is aligned so that each bore 1023 in the mount plate 1026 is registered with a respective roof penetration 15. The fasteners 13 are then applied to the bores 1023. In other embodiments, the fasteners 13 are self-tapping or self-drilling fasteners, and it is not necessary to drill holes; rather, the base 1011 is placed over a desired location on the roof 14 and then the fasteners 13 are applied into the roof 14. Each fastener 13 has a head 90 and a long shank 91. Each fastener 13 is threadably engaged with the roof 14 until the head 90 is seated in the seat 1056 of the mount plate 1026 and the shank 91 passes below the seat 1056, penetrating the roof 14 and forming into the roof penetration 15. The head 90 is seated in flush and direct contact with the top 1060 of the seat 1056, and an unthreaded portion of the shank 91 just below the head 90 fills the bore 1023 snugly. When all fasteners 13 are engaged in this manner, the base 1011 is securely fixed to the roof 14.

In some embodiments, an o-ring, foam ring, adhesive sealant, or other form of gasket or sealing member is applied to the channel 1037 on the underside of the base 1011 before the base 1011 is secured according to the above. This gasket creates a first seal between the base 1011 and the roof 14, just inboard from the outer edge 1030. This first seal is effective at preventing water, moisture, and other environmental ingress at the annulus 1034. Use of a gasket is optional, however, and not necessary to ensure an environmental seal between the base 1011 and the roof 14.

Turning now to FIG. 13E, once the base 1011 is securely fixed to the roof 14, a flowable sealant 92 is applied to the reservoir 1040. The sealant 92 is slowly applied to the reservoir 1040 until the sealant 92 nearly reaches the top 1024 of the base 1011. By slowly filling the sealant 92, the sealant 92 can flow across the portion of the roof 14 covered by the base 1011, surrounding the roof penetrations 15. Because the roof penetrations 15 are under the bores 1023 in the mount plate 1026, the roof penetrations 15 are under the mount plate 1026. The sealant 92 entirely fills the bottom of the reservoir 1040, flowing through the cavities 1063 and 1064 and through the gaps 1041 and over the mount plate 1026. This forms an environmental seal between the base 1011 and the roof 14 which prevents environmental ingress through the roof 14.

By filling the sealant 92 to just below the top 1024, the heads 90 of the fasteners 13 are covered. Because the seats 1056 are disposed below the top 1024 of the base 1011, the seats 1056 and the heads 90 and shanks 91 of the fasteners 13 received in them are covered. This increases the surety of the environmental seal. Further, by filling the reservoir with sealant 92 until the heads 90 are covered, the installer performing the work receives visual confirmation: when the heads 90 are no longer visible, the installer can be sure the reservoir 1040 is adequately filled.

The above defines an installed condition of the device 1010. This installed condition is sufficient to form an environmental seal over the roof penetrations 15. However, an additional step may also be completed. FIG. 13F illustrates the cap 1012 applied to the base 1011. The installer registers the cap 1012 with the base 1011, so that the lip 1084 is registered with the seat 1036 at the top of the ridge 1035 of the base 1011, and then moves the cap 1012 downward onto the base 1011 so that the lip 1084 is snugly received in the seat 1036. When so placed, the lower surface 1083 of the cap 1012 is received in direct and continuous contact with the flat top 1070 of the hub 1020, and the hole 1087 and the bore 1076 are aligned. The bolt 1088 is then passed through the hole 1087 and is threadably engaged with the bore 1076. When a nut is engaged to the bolt 1088, or when the rack or other hardware is secured on the bolt 1098, the bolt 1098 is tightened, the cap 1012 is compressed onto the base 1011, and the lip 1084 and seat 1036 form an environmental seal preventing moisture and other ingress into the device 1010. Of course, the installer can also simply press the cap 1012 down onto the base 1011 to form the environmental seal. The cap 1012 also serves to deflect rain, snow, and other moisture onto the ridge 1035 and annulus 1034, from which it will flow onto the roof 14. In these ways, when the cap 1012 is moved onto the base 1011, the cap 1012 and the perimeter structure 1021 of the base 1011 cooperate to form an environmental seal around the roof penetrations 15.

Preferred embodiments are fully and clearly described above so as to enable one having skill in the art to understand, make, and use the same. Those skilled in the art will recognize that modifications may be made to the description above without departing from the scope and spirit of the specification, and that some embodiments include only those elements and features described, or a subset thereof. To the extent that modifications do not depart from the scope and spirt of the specification, they are intended to be included within the scope and spirit thereof.

What is claimed is:

1. A roof-mounting device for covering a roof penetration in a roof, the roof-mounting device comprising:
    a base including a hub, an outer perimeter structure, an open top, and an open bottom;
    an internal reservoir in communication with the open top and the open bottom;
    the hub and the outer perimeter structure are separated from each other by the internal reservoir and by ribs extending through the internal reservoir from the hub outward to the perimeter structure; and
    a bore for receiving a fastener is formed into one of the ribs for fastening the roof-mounting device at the roof penetration.

2. The roof-mounting device of claim 1, wherein the bore is formed into a seat in one of the ribs.

3. The roof-mounting device of claim 2, wherein the seat is below the top of the base.

4. The roof-mounting device of claim 2, wherein the hub has an underside, and the underside is above the seat in one of the ribs.

5. The roof-mounting device of claim 1, further comprising a cap which, when moved onto the base, cooperates with the base to form an environmental seal over the roof penetration.

6. The roof-mounting device of claim 5, further comprising a bore in the hub which, when the cap is moved onto the base, is registered with a hole through the cap.

7. The roof-mounting device of claim 5, wherein the base and the cap each have an elongated shape.

8. The roof-mounting device of claim 1, further comprising gaps between the ribs, wherein the gaps define notches in the hub and in the outer perimeter structure which continue the internal reservoir under the hub and under the outer perimeter structure.

9. A roof-mounting device for covering a roof penetration in a roof, the roof-mounting device comprising:
    a base including a hub, an outer perimeter structure, and an internal reservoir extending therebetween;
    the hub and the outer perimeter structure are separated from each other by the internal reservoir and by ribs extending through the internal reservoir from the hub outward to the outer perimeter structure;
    a bore formed through the hub to receive a first fastener for mounting an object above the mounting device; and
    seats disposed in at least one of the hub, the ribs, and the outer perimeter, and bores formed through the seats to receive downwardly-directed second fasteners for fastening the roof-mounting device at the roof penetration;
    wherein the hub is above the seats.

10. The roof-mounting device of claim 9, wherein an underside of the hub is above the seats.

11. The roof-mounting device of claim 10, wherein the underside of the hub and the seats are both within the internal reservoir.

12. The roof-mounting device of claim 10, wherein the bore extends through the underside of the hub to receive the first fastener in an upwardly-directed orientation.

* * * * *